(12) United States Patent
Suh et al.

(10) Patent No.: US 10,558,330 B2
(45) Date of Patent: Feb. 11, 2020

(54) MOBILE TERMINAL PERFORMING METHOD OF REGISTERING AND SEARCHING RECIPE OF BEVERAGE MADE BY BEVERAGE-MAKING APPARATUS AND RECORDING MEDIUM RECORDING PROGRAM PERFORMING THE METHOD

(71) Applicant: LG ELECTRONICS INC., Seoul (KR)

(72) Inventors: Mina Suh, Seoul (KR); Hyungsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 27 days.

(21) Appl. No.: 15/806,398

(22) Filed: Nov. 8, 2017

(65) Prior Publication Data
US 2018/0129380 A1 May 10, 2018

(30) Foreign Application Priority Data
Nov. 10, 2016 (KR) .......................... 10-2016-0149576

(51) Int. Cl.
*G06F 3/0482* (2013.01)
*G06F 16/248* (2019.01)
(Continued)

(52) U.S. Cl.
CPC ............ *G06F 3/0482* (2013.01); *A47J 31/44* (2013.01); *G05B 15/02* (2013.01); *G06F 16/248* (2019.01);
(Continued)

(58) Field of Classification Search
CPC combination set(s) only.
See application file for complete search history.

(56) References Cited

U.S. PATENT DOCUMENTS 8,062,684 B2 * 11/2011 Gutwein ................ A23F 5/243
426/231
8,335,796 B2 * 12/2012 Maeda ............... G06Q 30/0601
707/778
(Continued)

FOREIGN PATENT DOCUMENTS

EP         2759991         7/2014
KR    20110035380         4/2011
(Continued)

OTHER PUBLICATIONS

Extended European Search Report in European Application No. 17200813.8, dated Dec. 13, 2017, 8 pages (with English translation).

*Primary Examiner* — Maikhanh Nguyen
(74) *Attorney, Agent, or Firm* — Fish & Richardson P.C.

(57) ABSTRACT

A mobile terminal includes a wireless communication unit configured to communicate with a beverage-making apparatus; a display unit; an input unit configured to receive a recipe input request for inputting information about a recipe of a beverage for the beverage-making apparatus; and at least one processor. The at least one processor is configured to: in response to the recipe input request, display a recipe input interface for inputting the information about the recipe of the beverage; and based on displaying the recipe input interface, receive recipe information for the beverage through the displayed recipe input interface.

16 Claims, 41 Drawing Sheets

(51) Int. Cl.
   *G06F 16/9535*   (2019.01)
   *A47J 31/44*     (2006.01)
   *G05B 15/02*     (2006.01)
   *G06F 17/21*     (2006.01)

(52) U.S. Cl.
   CPC ........ *G06F 16/9535* (2019.01); *G06F 17/218* (2013.01)

(56) References Cited

U.S. PATENT DOCUMENTS

| | | | | |
|---|---|---|---|---|
| 9,177,339 | B2 * | 11/2015 | Saranow | A45D 19/00 |
| 9,533,867 | B2 * | 1/2017 | Hortin | F25D 23/126 |
| 10,043,226 | B2 * | 8/2018 | Craparo | G06Q 10/0836 |
| 2005/0192869 | A1 * | 9/2005 | Maeda | G06Q 30/02 |
| | | | | 705/26.1 |
| 2009/0136632 | A1 * | 5/2009 | Gutwein | A23F 5/243 |
| | | | | 426/231 |
| 2009/0287644 | A1 * | 11/2009 | Crosby | G06F 19/3475 |
| 2013/0123973 | A1 * | 5/2013 | Saranow | A45D 19/00 |
| | | | | 700/233 |
| 2013/0149677 | A1 * | 6/2013 | Slone | G09B 19/0092 |
| | | | | 434/127 |
| 2013/0149678 | A1 * | 6/2013 | Tokuda | G09B 19/0092 |
| | | | | 434/127 |
| 2013/0149679 | A1 * | 6/2013 | Tokuda | G09B 19/0092 |
| | | | | 434/127 |
| 2015/0046877 | A1 | 2/2015 | Cuppari et al. | |
| 2016/0027132 | A1 * | 1/2016 | Craparo | G06Q 10/0836 |
| | | | | 705/15 |
| 2016/0055599 | A1 * | 2/2016 | Illy | G06Q 30/0621 |
| | | | | 705/15 |
| 2016/0090288 | A1 | 3/2016 | Givens, Jr. et al. | |
| 2016/0255991 | A1 | 9/2016 | Givens et al. | |
| 2016/0264395 | A1 * | 9/2016 | Hortin | F25D 23/126 |

FOREIGN PATENT DOCUMENTS

| | | |
|---|---|---|
| KR | 20160087175 | 7/2016 |
| KR | 20160124508 | 10/2016 |
| WO | 2016141293 | 9/2016 |

\* cited by examiner

MOBILE TERMINAL PERFORMING METHOD OF REGISTERING AND SEARCHING RECIPE OF BEVERAGE MADE BY BEVERAGE-MAKING APPARATUS AND RECORDING MEDIUM RECORDING PROGRAM PERFORMING THE METHOD

CROSS-REFERENCE TO RELATED APPLICATIONS

This application claims priority under 35 U.S.C. 119 and 365 to Korean Patent Application No. 10-2016-0149576, filed on Nov. 10, 2016, in the Korean Intellectual Property Office, the disclosure of which is incorporated herein by reference.

TECHNICAL FIELD

The present disclosure generally relates to a mobile terminal, and more particularly, to a mobile terminal that is communicative with a beverage-making apparatus to exchange information for making a beverage.

BACKGROUND

Various types of beverages are made via fermentation. Such beverages are typically made using ingredients that are combined and fermented to yield the resulting beverage. As an example, beer is an alcoholic beverage that is brewed by filtering wort, adding hops to the wort, and then fermenting the resulting wort mixture with yeast. Wort is typically made with malt, which is made from germinated barley.

Ingredients for brewing beer typically include water, malt, hops, yeast, flavor additives, and the like. The yeast is often referred to as leaven, and is typically added to malt to induce fermentation. The yeast may also facilitate the generation of alcohol and carbon dioxide (or carbonic acid). In some scenarios, flavor additives are added that improve the taste of beer, such as fruit, syrup, and vanilla bean additives.

SUMMARY

Implementations disclosed herein provide a mobile terminal configured to conveniently register recipe information regarding a beverage that is being brewed or completely brewed by a beverage-making apparatus.

In one aspect, a mobile terminal includes: a wireless communication unit configured to communicate with a beverage-making apparatus; a display unit; an input unit configured to receive a recipe input request for inputting information about a recipe of a beverage for the beverage-making apparatus; and at least one processor. The at least one processor is configured to: in response to the recipe input request, display a recipe input interface for inputting the information about the recipe of the beverage; and based on displaying the recipe input interface, receive recipe information for the beverage through the displayed recipe input interface.

In some implementations, the at least one processor is further configured to: receive the recipe input request while the beverage-making apparatus is making the beverage; and receive, through the recipe input interface, the recipe information for the beverage by receiving information regarding at least one of a name of the beverage, a recipe name, an image related to the beverage, or at least one ingredient included in a recipe for the beverage.

In some implementations, the at least one processor is configured to: based on at least one first ingredient that was previously input for the beverage, display, through the display unit, a selection interface displaying at least one recipe package, wherein a first recipe package among the at least one recipe package includes information regarding the previously input at least one first ingredient and information regarding at least one second ingredient, other than the at least one first ingredient, for the beverage; and based on a selection of the first recipe package among the at least one recipe package displayed in the selection interface, input the at least one second ingredient to the recipe input interface.

In some implementations, the information regarding the at least one first ingredient that was previously input for the beverage includes: information that was previously acquired by the mobile terminal from the beverage-making apparatus indicating that the at least one first ingredient was included in a beverage ingredient pack accommodated in the beverage-making apparatus when the beverage was made.

In some implementations, the at least one processor is further configured to: receive the recipe input request after the beverage-making apparatus finishes making the beverage; and receive, through the recipe input interface, the recipe information for the beverage including information regarding a recipe and information regarding at least one review of the beverage.

In some implementations, the information regarding the least one review of the beverage includes taste information regarding the beverage; and the at least one processor is further configured to: display a plurality of tags related to a plurality of tastes of the beverage; receive an input for selecting at least one tag among the displayed plurality of tags; and input, as the taste information, the at least one tag that was selected, based on the received input.

In some implementations, the at least one processor is configured to transmit the received recipe information to at least one computer that is communicative with the mobile terminal.

In another aspect, a mobile terminal includes: a wireless communication unit configured to communicate with at least one computer that stores a plurality of recipe information for a beverage-making apparatus; a display unit; a user input unit configured to receive a recipe search request; and at least one processor. The at least one processor is configured to: display, through the display unit, a selection interface in response to the received recipe search request; receive an input for selecting at least one characteristic among a plurality of characteristics displayed in the selection interface; and display a first recipe information stored on the at least one computer that includes at least some of the at least one characteristic that was selected, based on the received input.

In some implementations, the plurality of characteristics corresponds to a plurality of tags, and the selected at least one characteristic corresponds to at least one tag among the plurality of tags; and the at least one processor is configured to: search the plurality of recipe information stored on the at least one computer for at least one recipe information that includes the selected at least one tag; and display, through the display unit, the first recipe information including the at least some of the at least one tag, based on a result of the search.

In some implementations, the at least one processor is configured to: based on the recipe search request being an ingredient-based search request: display, through the display unit, the selection interface displaying a plurality of tags, each tag representing a corresponding ingredient for the beverage; and search the plurality of recipe information stored on the at least one computer for at least one recipe information that includes a respective ingredient corresponding to each tag of the selected at least one tag among the plurality of tags.

In some implementations, the at least one processor is configured to: based on the recipe search request being a taste-based search request: display, through the display unit, the selection interface displaying a plurality of tags, each tag representing a corresponding taste of the beverage; and search the plurality of recipe information stored on the at least one computer for at least one recipe information that includes a respective taste information corresponding to each tag of the selected at least one tag among the plurality of tags.

In some implementations, the at least one processor is configured to display, through the display unit, a plurality of second recipe information, each second recipe information including at least some of the selected at least one characteristic, and the plurality of recipe information are displayed in an order based on a number of characteristics, among the selected at least one characteristic, included in each of the plurality of recipe information.

In some implementations, the at least one processor is configured to: based on the recipe search request being an ingredient color-based search request: display the selection interface displaying a plurality of ingredient colors as the plurality of characteristics; receive the input for selecting at least one ingredient color among the plurality of displayed ingredient colors; and display, through the display unit, the first recipe information that corresponds to the selected ingredient color.

In some implementations, each of the plurality of recipe information stored on the at least one computer includes a review image of a corresponding beverage for the respective recipe information; and the at least one processor is configured to: acquire a first recipe information having a review image corresponding to the selected ingredient color; and display, through the display unit, the acquired first recipe information.

In another aspect, at least one non-transitory computer-readable recording medium is encoded with at least one computer program including instructions that, when executed, operate to cause a mobile terminal communicative with a beverage-making apparatus to perform operations including: receiving a recipe input request for inputting information about a recipe of a beverage for the beverage-making apparatus; displaying a recipe input interface for inputting the information about the recipe of the beverage; based on displaying the recipe input interface, receiving recipe information for the beverage through the displayed recipe input interface; and transmitting the received recipe information to at least one computer that is communicative with the mobile terminal.

In some implementations, receiving the recipe input request includes receiving the recipe input request for a beverage that is being made by the beverage-making apparatus; and the recipe information includes at least one of a name of the beverage, a recipe name, an image related to the beverage, or at least one ingredient included in a recipe for the beverage.

In some implementations, receiving the recipe information includes: based on at least one first ingredient that was previously input for the beverage, displaying a selection interface that displays at least one recipe package; and based on a selection of a first recipe package among the at least one recipe package displayed in the selection interface, receiving, as the recipe information, information regarding ingredients included in the selected first recipe package.

In some implementations, the operations further include: acquiring, by the mobile terminal and from the beverage-making apparatus, information indicating that the previously-input at least one first ingredient was included in a beverage ingredient pack accommodated in the beverage-making apparatus when the beverage was made.

In some implementations, receiving the recipe input request includes receiving a recipe input request for a beverage that has been completely made by the beverage-making apparatus; and receiving the recipe information includes receiving the information regarding a recipe and information regarding at least one review of the completely made beverage.

In some implementations, receiving the information regarding the at least one review of the beverage includes: displaying a plurality of tags corresponding to a plurality of tastes of the beverage; receiving an input for selecting at least one tag among the displayed plurality of tags; and receiving, as the information regarding the at least one review, taste information corresponding to the selected at least one tag.

In some scenarios, selected implementations disclosed herein may provide one or more advantages as described below.

According to some implementations, a user can conveniently register and manage recipe information on beverage being brewed or completely brewed by the beverage maker, using the mobile terminal.

Also, when taste information of the beverage, included in the recipe information, is available, the user can easily input the taste information using a plurality of tags related to taste of the beverage.

In addition, the mobile terminal can more effectively provide a beverage recipe searching function, using a tag representing taste or ingredient information of the beverage.

Further scope of applicability of the present disclosure will become apparent from the detailed description given hereinafter. However, it should be understood that the detailed description and specific examples are given by way of illustration only, and various changes and modifications within the spirit and scope of the disclosure may be made.

DETAILED DESCRIPTION

Implementations disclosed herein provide a mobile terminal configured to conveniently register recipe information regarding a beverage that is being brewed or completely brewed by a beverage-making apparatus.

Implementations also provide a mobile terminal configured to provide convenient searching of recipe information for beverages that can be produced using beverage-making apparatus.

In some implementations, a mobile terminal is configured to provide searching for a recipe in various manners using information regarding an ingredient or taste of beverage or properties of ingredients in the beverage, e.g., a color of wort for making beer.

One example of a beverage-making apparatus is a beer-maker, which may be used in homes. Typically, house beer may include a total of three steps, i.e., a wort producing step, a fermenting step, and a ripening step, and two weeks to three weeks may be required from the wort producing step to the ripening step. In some scenarios, a beer maker can be configured to conveniently regulate a temperature for beer fermentation.

Various types of beverages may be produced using a beverage-making apparatus. In order for a user to produce a beverage that is suitable for the user's taste, the user may search for a recipe of a beverage to be produced. In addition, the user may share a recipe of a produced beverage with other users, or store and manage recipe information. As such, some implementations disclosed herein provide for convenient registering of a recipe of beverage that is producible using a beverage-making apparatus.

Hereinafter, examples of some implementations of the present disclosure will be described in detail with reference to the accompanying drawings.

Some of the examples below describe a scenario in which the beverage-making apparatus is specifically a beer-making apparatus. However, implementations are not limited thereto, and may be implemented as any suitable beverage making apparatus that utilizes fermentation.

Figure 1:
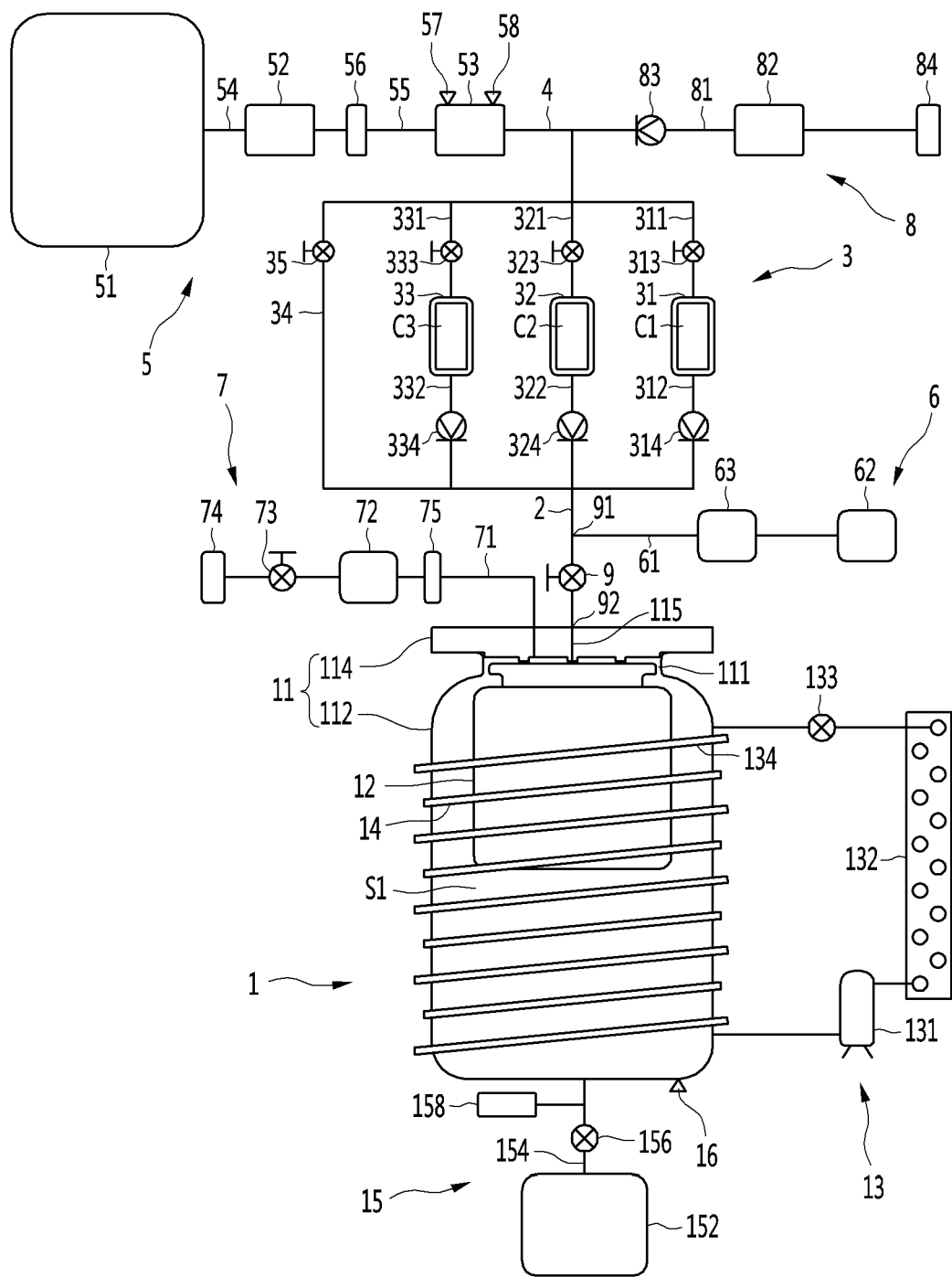
FIG. 1 is a diagram illustrating an example of an entire configuration view of a beverage-making apparatus according to some implementations.

FIG. 1 is an entire configuration view of a beverage maker according to an implementation.

The beverage making apparatus, as shown in FIG. 1, may include a fermentation module 1, an ingredient supplier 3 (or simply, supplier 3) connected to the fermentation module 1 through a main channel 2 (also referred to as main flow path 2), a water supply module 5 connected to the supplier 3 through a water supply channel 4 (also referred to as water supply flow path 4), and a beverage extractor 6 that allows a beverage fermented in the fermentation module 1 to be extracted to the outside.

The fermentation module 1 includes a container, for example fermentation tank assembly 11, having a space S1 formed therein. The container may include a container body, such as fermentation tank 112, and a container cover, such as fermentation tank cover 114.

In the example of FIG. 1, the fermentation tank assembly 11 includes a fermentation tank 112 has an opening 111 formed at an upper portion thereof, the fermentation tank 112 having the space S1 formed therein, and a fermentation tank cover 114 covering the opening 111.

The fermentation tank 112 may be configured as an assembly of a plurality of members.

The fermentation tank cover 114 is used to seal the inside of the fermentation tank 112, and may be disposed at an upper portion of the fermentation tank 112 to cover the opening 111. A main flow path connecting part 115 connected to the main flow path 2 may be formed in the fermentation tank cover 114.

In addition, the fermentation module 1 may further include a removable beverage ingredient pack 12 that holds at least some of the ingredients for making the beverage. As shown in the example of FIG. 1, the beverage ingredient pack 12 may be a beverage ingredient pack that is inserted and accommodated in the fermentation tank assembly 11.

In this example, the beverage ingredient pack 12 may be a pack in which ingredients for brewing a beverage are accommodated. The following description will focus on the scenario of a beverage brewing pack 12 as the beverage ingredient pack, although implementations may be applied to any suitable beverage ingredient pack utilized for fermentation.

The beverage brewing pack 12 may be formed smaller than the space S1 formed in the fermentation tank assembly 11. The beverage brewing pack 12 may be inserted and accommodated in the fermentation tank assembly 11 in a state in which the ingredients are accommodated therein. The beverage brewing pack may be inserted into the fermentation tank 112 to be accommodated in the fermentation tank 112 in a state in which the opening 111 of the fermentation tank 112 is opened. The fermentation tank cover 114 may cover the opening 111 of the fermentation tank 112 after the beverage brewing pack 12 is inserted into the fermentation tank 112. The beverage brewing pack 12 may assist the ingredients to be fermented in a state in which the beverage brewing pack 12 is accommodated in the space S1 sealed by the fermentation tank 112 and the fermentation tank cover 114. The beverage brewing pack 12 may be expanded by a pressure therein while the beverage is being brewed.

As an example, in the case where the beverage is beer, the ingredients for brewing the beer may include water, malt, yeast, hops, flavor additives, and the like.

The beverage maker may include both of the supplier 3 and the beverage ingredient pack 12, and the ingredients for brewing the beverage may be distributed and accommodated in the supplier 3 and the beverage ingredient pack 12. Some ingredients among the ingredients for brewing the beverage may be accommodated in the beverage ingredient pack 12, and the other ingredients may be accommodated in the supplier 3. The other ingredients accommodated in the supplier 3 may be supplied to the beverage ingredient pack 12 together with water supplied from the water supply module 5, and be mixed with the ingredients accommodated in the beverage ingredient pack 12.

A main ingredient essential to brew the beverage may be accommodated in the beverage ingredient pack 12, and additives added to the main ingredient may be accommodated in the supplier 3. In this case, the additives accommodated in the supplier 3 may be mixed with the water supplied from the water supply module 5 to be supplied to the beverage ingredient pack 12, and be mixed with the main ingredient accommodated in the beverage ingredient pack 12.

The main ingredient accommodated in the beverage ingredient pack 12 is an ingredient having a larger volume than the other ingredients, and may be, in the case of beer, the malt among the malt, the yeast, the hops, and the flavor additives. In addition, the additives accommodated in the supplier 3 may be the other ingredients except the malt among the ingredient for brewing the beer, and be the yeast, the hops, the flavor additives, and the like.

Meanwhile, the beverage maker does not include both of the beverage ingredient pack 12 and the supplier 3 as described above, but may include only the supplier 3 without any separate beverage ingredient pack 12. All of the ingredients for brewing the beverage may be accommodated in the supplier 3. In this case, all of the ingredients accommodated in the supplier 3 may be supplied to the inside of the fermentation tank assembly 11 together with the water supplied from the water supply module 5. The main ingredient and the additives may be accommodated together in the supplier 3. The main ingredient and additives, which are accommodated in the supplier 3, may be simultaneously supplied to the inside of the fermentation tank assembly 11 or be sequentially supplied with a time difference.

In addition, the beverage maker does not include any separate beverage ingredient pack 12, but may directly inject some ingredients among the ingredients for brewing the beverage into the fermentation tank assembly 11 and allow the other ingredients for brewing the beverage to be accommodated in the supplier 3. In this case, a user may directly inject the main ingredient into the fermentation tank assembly 11, and the additives may be accommodated in the supplier 3. The additives accommodated in the supplier 3 may be mixed with the water supplied from the water supply module 5, and be mixed with the main ingredient previously injected into the fermentation tank assembly 11.

In addition, the beverage maker does not include the supplier 3, but may include the beverage ingredient pack 12. In this case, the main ingredient may be accommodated in the beverage ingredient pack 12, and the user may directly inject the additives into the beverage ingredient pack 12.

In addition, the beverage maker does not include both of the supplier 3 and the beverage ingredient pack 12, but the user may directly inject the main ingredient and the additives simultaneously or with a time difference into the fermentation tank assembly 11.

When the beverage maker includes both of the supplier 3 and the beverage ingredient pack 12, the beverage can be more conveniently brewed. Hereinafter, the case where the beverage maker includes both of the supplier 3 and the beverage ingredient pack 12 is described as an example. However, it will be apparent that the present disclosure is not limited to the case where the beverage maker includes both of the supplier 3 and the beverage ingredient pack 12.

The ingredients injected into the beverage ingredient pack 12 may be fermented as time elapses. The beverage that has been completely brewed in the beverage ingredient pack 12 may flow in the main flow path 2 through the main flow path connecting part 115, and flow from the main flow path 2 to the beverage extractor 6 to be extracted from the beverage extractor 6.

The fermentation module 1 may further include a temperature controller that changes a temperature of the fermentation tank assembly 11. As the temperature controller heats or cools the fermentation tank assembly 11, the temperature of the fermentation tank assembly 11 can be controlled to an optimum temperature for brewing the beverage.

The temperature controller may include a refrigeration cycle apparatus 13 including a compressor 131, a condenser 132, an expansion device 133, and an evaporator 134, and any one of the condenser 132 and the evaporator 134 may be disposed at the fermentation tank assembly 11.

When the condenser 132 is disposed in contact with the fermentation tank 112, the refrigeration cycle apparatus 13 may control a temperature of the fermentation tank 112 by heating the fermentation tank 112. In this case, the condenser 132 may be disposed in contact with the outer surface of the fermentation tank 112. The condenser 132 may include a condensing tube wound around the outer surface of the fermentation tank 112.

When the evaporator 134 is disposed in contact with the fermentation tank 112, the refrigeration cycle apparatus 13 may control the temperature of the fermentation tank 112 by cooling the fermentation tank 112. In this case, the evaporator 134 may be disposed in contact with the outer surface of the fermentation tank 112. The evaporator 134 may include an evaporating tube wound around the outer surface of the fermentation tank 112. The evaporating tube may be accommodated between the fermentation tank 112 and a heat insulating wall 102 (see FIGS. 3 and 4), and cool the inside of a heat insulating space S2 heat-insulated by the heat insulating wall 102.

The temperature controller may further include a heater 14 that heats the fermentation tank assembly 11. The heater 14 may be disposed in contact with the outer surface of the fermentation tank 112, and be configured as a heater that generates heat when power is applied thereto. The heater 14 may be configured as a line heater, and be wound around the outer surface of the fermentation tank 112.

The refrigeration cycle apparatus 13 may be configured as a heat pump. The refrigeration cycle apparatus 13 may include a flow path switching valve. The flow path switching valve may be configured as a four-way valve. The flow path switching valve may be connected to each of an inlet flow path of the compressor 131 and an outlet flow path of the compressor 131. The flow path switching valve may be connected to the condenser 132 through a condenser connection flow path, and be connected to the evaporator 134 through an evaporator connection flow path.

When the fermentation tank 112 is cooled, the flow path switching valve may guide a refrigerant compressed by the compressor 131 to the condenser 132 and guide the refrigerant discharged from the evaporator 134 to the compressor 131.

When the fermentation tank 112 is heated, the flow path switching valve may guide the refrigerant compressed by the compressor 131 to the evaporator 134 and guide the refrigerant discharged from the condenser 132 to the compressor 131.

The beverage maker may include a beverage extraction pressurizing device 15 that injects air between the beverage ingredient pack 12 and the fermentation tank assembly 11. In a state in which the beverage ingredient pack 12 is accommodated in the fermentation tank assembly 11, the beverage extraction pressurizing device 15 may inject air between the beverage ingredient pack 12 and the fermentation tank assembly 11, and the air injected into the fermentation tank assembly 11 may pressurize the beverage ingredient pack 12. The beverage in the beverage ingredient pack 12 may be pressurized by the air, and flow in the main flow path 2 by passing through the main flow path connecting part 115. The beverage flowing in the main flow path 2 from the beverage ingredient pack 12 may be extracted to the outside through the beverage extractor 6.

That is, in the beverage maker, if the beverage is completely brewed, the beverage in the beverage ingredient pack 12 may be extracted through the beverage extractor 6 in a state in which the beverage ingredient pack 12 is not taken out of the fermentation tank assembly 11 but located in the fermentation tank assembly 11.

The beverage extraction pressurizing device 15 may include an air pump 152 that pumps air and an air supply flow path 154 that connects the air pump 152 and the inside of the fermentation tank assembly 11. The beverage extraction pressurizing device 15 may further include an air control valve 156 installed in the air supply flow path 154. The beverage extraction pressurizing device 15 may further include an air relief valve 158 provided to the air supply flow path 154. The air relief valve 158 may be installed posterior to the air control valve 156 in an air supply direction in the air supply flow path 154.

The air control valve 156 may be opened only when the beverage is extracted to allow air to be introduced into the fermentation tank assembly 11, and maintain a closed state while the beverage is not being extracted.

The beverage maker may further include a temperature sensor 16 that measures a temperature of the fermentation tank assembly 11. The temperature sensor 16 may be installed to measure a temperature of the fermentation tank 112.

Hereinafter, the supplier 3 will be described as follows.

The supplier 3 may be connected to a water supply heater 53 through the water supply flow path 4, and be connected to the fermentation tank assembly 11 through the main flow path 2.

The supplier 3 may accommodate ingredients required to brew the beverage therein, and be configured to allow water supplied from the water supply module 5 to pass therethrough. For example, in the case of beer, the ingredients accommodated in the supplier 3 may be yeast, hops, flavor additives, and the like.

The ingredients accommodated in the supplier 3 may be directly accommodated in an ingredient accommodation part formed in the supplier 3. At least one ingredient accommodation part may be formed in the supplier 3. A plurality of ingredient accommodation parts may be formed in the supplier 3. In this case, the plurality of ingredient accommodation parts may be formed to be divided from one another.

Meanwhile, the ingredients accommodated in the supplier 3 may be accommodated in a capsule, and at least one capsule accommodation part in which the capsule is accommodated may be formed in the supplier 3. When the ingredients are accommodated in the capsule, the supplier 3 may be configured such that the capsule is mountable and extractable. The supplier may be configured as a capsule kit assembly in which the capsule is separably accommodated.

Each of the main flow path 2 and the water supply flow path 4 may be connected to the supplier 3. The water supplied through the water supply flow path 4 may be mixed with the ingredients by passing through the ingredient accommodation part or the capsule. The ingredients accommodated in the ingredient accommodation part or the capsule may flow in the main flow path 2 together with the water.

A plurality of different kinds of additives may be separated from one another to be accommodated in the supplier 3. The plurality of additives accommodated in the supplier 3 may be yeast, hops, and flavor additives, and be separated from one another to be accommodated in the supplier 3.

When a plurality of ingredient accommodation parts are formed in the supplier 3, each of the plurality of ingredient accommodation parts may be connected to the water supply flow path through a supplier entrance flow path, and be connected to the main flow path 2 through a supplier exit flow path.

When a plurality of capsule accommodation parts are formed in the supplier 3, each of the plurality of capsule accommodation parts may be connected to the water supply flow path 4 through the supplier entrance flow path, and be connected to the main flow path 2 through the supplier exit flow path.

The ingredient accommodation part of the supplier 3 and the capsule accommodation part of the supplier 3 may be the substantially same component. When the capsule is inserted into the supplier 3 in a state in which the ingredients are accommodated in the capsule, the component may be referred to as the capsule accommodation part. When the ingredients are directly accommodated in the supplier 3 in a state in which the ingredients are not contained in the capsule, the component may be referred to as the ingredient accommodation part. Since the ingredient accommodation part and the capsule accommodation part may be the substantially same component, it will be described below that, for convenience of description, the capsule accommodation part is formed in the supplier 3.

The capsule accommodation part in which a capsule containing additives is attachably/detachably accommodated may be formed in the supplier 3. The supplier 3 may be connected to the water supply flow path 4 through the supplier entrance flow path, and be connected to the main flow path 2 through the supplier exit flow path.

An opening/closing valve that opens/closes the supplier entrance flow path may be installed in the supplier entrance flow path.

A check valve that blocks a fluid of the main flow path 2 from flowing backward to the capsule accommodation part may be installed in the supplier exit flow path.

A plurality of capsule accommodation parts 31, 32, and 33 may be formed in the supplier 3. The plurality of capsule accommodation parts 31, 32, and 33 may be formed to be divided from one another. The plurality of capsule accommodation parts 31, 32, and 33 may be connected to supplier entrance flow paths and supplier exit flow paths, respectively.

Hereinafter, a first additive, a second additive, and a third additive may be accommodated in the supplier 3. The first additive may be yeast, the second additive may be hop, and the third additive may be a flavor additive.

The supplier 3 may include a first capsule accommodation part 31 in which a first capsule C1 containing the first additive is accommodated, a second capsule accommodation part 32 in which a second capsule C2 containing the second additive is accommodated, and a third capsule accommodation part 33 in which a third capsule C3 containing the third additive is accommodated.

A first supplier entrance flow path 311 that guides water or air to the first capsule accommodation part 31 may be connected to the first capsule accommodation part 31, and a first supplier exit flow path 312 through which water discharged from the first capsule accommodation part 31, a mixture of the water and the first additive, and air are guided may be connected to the first capsule accommodation part 31. A first opening/closing valve 313 that opens/closes the first supplier entrance flow path 311 may be installed in the first supplier entrance flow path 311. A first check valve 314 that blocks the fluid of the main flow path 2 from flowing backward to the first capsule accommodation part 31 while allowing a fluid of the first capsule accommodation part 31 to flow in the main flow path 2 may be installed in the first supplier exit flow path 312. Here, the fluid may include the water discharged from the first capsule accommodation part 31, the mixture of the water and the first additive, and the air.

A second supplier entrance flow path 321 that guides water or air to the second capsule accommodation part 32 may be connected to the second capsule accommodation part 32, and a second supplier exit flow path 322 through which water discharged from the second capsule accommodation part 32, a mixture of the water and the second additive, and air are guided may be connected to the second capsule accommodation part 32. A second opening/closing valve 323 that opens/closes the second supplier entrance flow path 321 may be installed in the second supplier entrance flow path 321. A second check valve 324 that blocks the fluid of the main flow path 2 from flowing backward to the second capsule accommodation part 32 while allowing a fluid of the second capsule accommodation part 32 to flow in the main flow path 2 may be installed in the second supplier exit flow path 322. Here, the fluid may include the water discharged from the second capsule accommodation part 32, the mixture of the water and the second additive, and the air.

A third supplier entrance flow path 331 that guides water or air to the third capsule accommodation part 33 may be connected to the third capsule accommodation part 33, and a third supplier exit flow path 332 through which water discharged from the third capsule accommodation part 33, a mixture of the water and the third additive, and air are guided may be connected to the third capsule accommodation part 33. A third opening/closing valve 323 that opens/closes the third supplier entrance flow path 331 may be installed in the third supplier entrance flow path 331. A third check valve 334 that blocks the fluid of the main flow path 2 from flowing backward to the third capsule accommodation part 33 while allowing a fluid of the third capsule accommodation part 33 to flow in the main flow path 2 may be installed in the third supplier exit flow path 332. Here, the fluid may include the water discharged from the third capsule accommodation part 33, the mixture of the water and the third additive, and the air.

The beverage maker may include a bypass flow path 34 that enables the water supplied from the water flow path 4 to be supplied to the main flow path 2 by bypassing the capsule accommodation parts 31, 32, and 33.

The bypass flow path 34 may be connected to the water supply flow path 4 and the main flow path 2, and water or air of the water flow path 4 may be guided to the bypass flow path 34 to flow in the main flow path 2 by bypassing the capsule accommodation parts 31, 32, and 33.

The bypass flow path 34 may be connected in parallel to flow paths of the first capsule accommodation part 31, the second capsule accommodation part 32, and the third capsule accommodation part 33.

A bypass valve 35 that opens/closes the bypass flow path 34 may be installed in the bypass flow path 34.

The beverage maker may include a main supply flow path that guides the water, the ingredients of the beverage, or the air to the fermentation tank assembly 11 therethrough.

When the beverage maker includes both of the supplier 3 and the water supply module 5, the main supply flow path may include all of the main flow path 2, the bypass flow path 34, and the water supply flow path 4. In this case, the main supply flow path may supply all of the water, the air, and the ingredients of the beverage to the fermentation tank assembly 11.

The beverage maker includes the supplier 3, but may not include the water supply module 5. In this case, the main supply flow path may include all of the main flow path 2, the bypass flow path 34, and the water supply flow path 4. The water supply flow path 4 may be directly connected to a water faucet or include a water supply tube that is connected to the water faucet through a separate connection hose to be supplied with external water. The water supply tube may be supplied with external water to supply the external water to the bypass flow path 34 or the supplier 3. That is, the main supply flow path may supply all of the water, the air, and the ingredients of the beverage to the fermentation tank assembly 11 therethrough.

The beverage maker includes the water supply module 5, but may not include the supplier 3. In this case, the main supply flow path may include the main flow path 2, and the main flow path 2 may be directly connected to the water supply module 5. In addition, an air injection flow path 81 of an air injector 8 may be connected to the main flow path 2.

When the beverage maker includes the water supply module 5 but does not include the supplier 3, the main supply flow path does not require a separate water supply flow path 4 or bypass flow path 34 that connects the water supply module 5 and the supplier 3, and the main flow path 2 may be directly supplied from the water supply module 5. In addition, the air injection flow path 81 of the air injector 8 may be connected to a portion located between the water supply module 5 and a main valve 9 in the main flow path 2.

When the beverage maker includes the water supply module 5 but does not include the supplier 3, water of the water supply module 5 may be supplied to the fermentation tank assembly 11 through the main flow path 2, and air of the air injector 8 may be supplied to the fermentation tank assembly 11 through the main flow path 2. That is, the main flow path may supply water and air to the fermentation tank assembly 11.

The beverage maker may not include both of the supplier 3 and the water supply module 5. In this case, the main supply flow path may include the main flow path 2, and the main flow path 2 may be directly connected to a water faucet or include a water supply tube that is connected to the water faucet through a separate connection hose to be supplied with external water. The water supply tube may be supplied with external water to supply the external water to the fermentation tank assembly 11.

When the beverage maker does not include both of the supplier 3 and the water supply module 5, the main supply flow path does not require a separate water supply flow path 4 or bypass flow path 34 that connects the water supply module 5 and the supplier 3, and the main flow path 2 may be directly supplied from the water supply module 5. In this case, the air injection flow path 81 of the air injector 8 may be connected to the main flow path 2, and be connected prior to the main valve 9 in the main flow path 2. That is, the main supply flow path may supply water and air to the fermentation tank assembly 11.

Hereinafter, the case where the beverage maker includes all of the main flow path 2, the water supply flow path 4, and the bypass flow path 34 will be described as an example.

The main flow path 2 may be connected to the first supplier exit flow path 312, the second supplier exit flow path 322, the third supplier exit flow path 332, and the bypass flow path 34. The main flow path 2 may include a common tube connected to the fermentation tank assembly 11 and a combination tube connected to the first supplier exit flow path 312, the second supplier exit flow path 322, the third supplier exit flow path 332, the bypass flow path 34 and the common tube.

The main flow path 2 may be connected to the fermentation tank assembly 11, and be connected to the fermentation tank cover 114 in the fermentation tank assembly 11.

The water supply flow path 4 may be connected to the first supplier entrance flow path 311, the second supplier entrance flow path 321, the third supplier entrance flow path 331, and the bypass flow path 34.

The water supply flow path 4 may include a common tube connected to the water supply module 5, and a plurality of branch tubes branching off from the common tube, the plurality of branch tubes being connected to the first supplier entrance flow path 311, the second supplier entrance flow path 321, the third supplier entrance flow path 331, and the bypass flow path 34.

The water supply module 5 may include a water tank 51 containing water, a water supply pump 52 that pumps the water of the water tank 51, and the water supply heater 53 that heats the water pumped by the water supply pump 52.

A water tank outlet flow path 54 may be connected to the water tank 51, and the water supply pump 52 may be connected to the water tank outlet flow path 54.

A water supply pump outlet flow path 55 may be connected to the water supply pump 52, and the water supply heater 53 may be connected to the water supply pump outlet flow path 55.

A flow meter 56 that measures a flow rate of the water supply pump outlet flow path 55 may be installed in the water supply pump outlet flow path 55.

The water supply heater 53 may be a mold heater, and include a heater case through which the water pumped by the water supply pump 52 passes, and a heater installed in the heater case to heat water introduced into the heater case. A thermistor 57 that measures a temperature of the water supply heater 53 may be installed in the water supply heater 53. In addition, a thermal fuse 58 that cuts off current applied to the water supply heater 53 as a circuit is interrupted when the temperature of the water supply heater 53 is high.

When the water supply pump 52 is driven, water of the water tank 51 may be guided to the water supply heater 53 through the water tank outlet flow path 54, the water supply pump 52, and the water supply pump outlet flow path 55. The water guided to the water heater 53 may be heated by the water supply heater 53 and then guided to the water supply flow path 4.

The beverage extractor 6 may be connected to the main flow path 2. The beverage extractor 6 may include a beverage extraction flow path 61 connected to the main flow path 2, the beverage extraction flow path 61 allowing the beverage of the main flow path 2 to be guided therethrough. The beverage extractor 6 may further include a beverage extraction valve 62 connected to the beverage extraction flow path 61.

An anti-foaming path 63 may be provided in the beverage extraction flow path 61, and foam of the beverage flowing from the main flow path 2 to the beverage extraction flow path 61 may be minimized by passing through the anti-foaming path 63. A mesh, etc., through which foam is filtered, may be provided in the anti-foaming path 63.

The beverage extraction valve 62 may include a lever manipulated by the user and a tap valve having a micro switch that detects a manipulation of the user.

Meanwhile, the beverage maker may further include a gas discharger that discharges gas in the fermentation module 1 to the outside.

The gas discharger 7 may include a gas extraction flow path 71 connected to the fermentation module 1 and a pressure sensor 72 installed in the gas extraction flow path 71. The gas discharger 7 may further include a gas extraction valve 73 that opens/closes the gas extraction flow path 71. The gas discharger 7 may further include an air filter 74 through which gas passing through the gas extraction valve 73 passes.

The gas extraction flow path 71 may be connected to the fermentation tank assembly 11, particularly, the fermentation tank cover 114.

The gas extraction valve 73 may be turned on when air is injected into the beverage ingredient pack 12, to be opened. The beverage maker may allow malt and water to be uniformly mixed together by injecting air into the beverage ingredient pack 12. As such, in the case of beer making, bubbles generated from the liquid malt may be discharged to the outside at an upper portion of the beer brewing pack 12 through the gas extraction flow path 71 and the gas extraction valve 73.

The gas extraction valve 73 may be opened to detect a fermentation degree during a fermentation process. The gas in the beverage brewing pack 12 may flow in the pressure sensor 72. The pressure sensor 72 may sense a pressure of the gas discharged from the beverage brewing pack 12.

The pressure sensor 72, the gas extraction valve 73, and the air filter 74 may be sequentially disposed in a gas discharge direction in the gas extraction flow path 71.

The gas discharger 7 may further include a gas discharge relief valve 75 provided in the gas extraction flow path 71. The gas discharge relief valve 75 may be installed prior to the pressure sensor 72 in the gas discharge direction.

The beverage maker may further include the air injector 8 connected to at least one of the main flow path 2 and the water supply flow path 4 to inject air.

When the air injector 8 is connected to the water supply flow path 4, air may be injected into the supplier 3 through the water supply flow path 4. The air injected into the water supply flow path 4 may sequentially pass through the supplier 3 and the main flow path 2 and then be injected into the beverage brewing pack 12. When the air injector 8 is connected to the water supply flow path 4, air may be injected into the beverage brewing pack 12 through the water supply flow path 4, the bypass flow path 34, and the main flow path 2. The air injector 8 may supply the air to the ingredients in the beverage brewing pack 12.

When the air injector 8 is connected to the water supply flow path 4, air may be injected into the capsule accommodation parts 31, 32, and 33 through the water supply flow path 4, remaining water or sludge in the capsules C1, C2, and C3 and the capsule accommodation parts 31, 32, and 32 may flow in the main flow path 2, and the capsules C1, C2, and C3 and the capsule accommodation parts 31, 32, and 32 may be cleanly maintained.

The air injector 8 may include the air injection flow path 81 connected to the water supply flow path 4 and an air injection pump 82 that pumps air to the air injection flow path 81.

The air injector 8 may further include a check valve 83 that blocks the water of the water supply flow path 4 from being introduced into the air injection pump 82 through the air injection flow path 81. The check valve 83 may be installed posterior to the air injection pump 82 in an air injection direction.

The air injector 8 may further include an air filter 84 connected to the air injection flow path 81, the air filter 84 being installed prior to the air injection pump 82 in the air injection direction.

When the air injection pump 82 is driven, dust, etc. in air may be filtered by the air filter 84, and the air passing through the air filter 84 may be flowed by the air injection pump 82 to flow in the water supply flow path 4.

The beverage maker may further include the main valve 9 that opens/closes the main flow path 2.

The main valve 9 may be installed, in the main flow path 2, between a connection part 91 of the main flow path 2 and the beverage extraction flow path 61 and a connection part 92 of the main flow path 2 and the fermentation tank assembly 11.

The main valve 9 may be opened when hot water is injected into the beverage ingredient pack 12, to open the main flow path 2. The main valve 9 may be closed while the fermentation tank assembly 11 is cooled, to close the main flow path 2. The main valve 9 may be opened when air is injected into the beverage ingredient pack 12, to open the main flow path 2. The main valve 9 may be opened when an additive is supplied to the inside of the beverage ingredient pack 12, to open the main flow path 2. The main valve 9 may be closed while ingredients are being fermented, to close the inside of the beverage ingredient pack 12. The main valve 9 may be closed when the beverage is ripened and kept, to close the inside of the beverage ingredient pack 12. The main valve 9 may be opened when the beverage is extracted from the beverage extractor 6, to open the main flow path 2.

Figure 2:
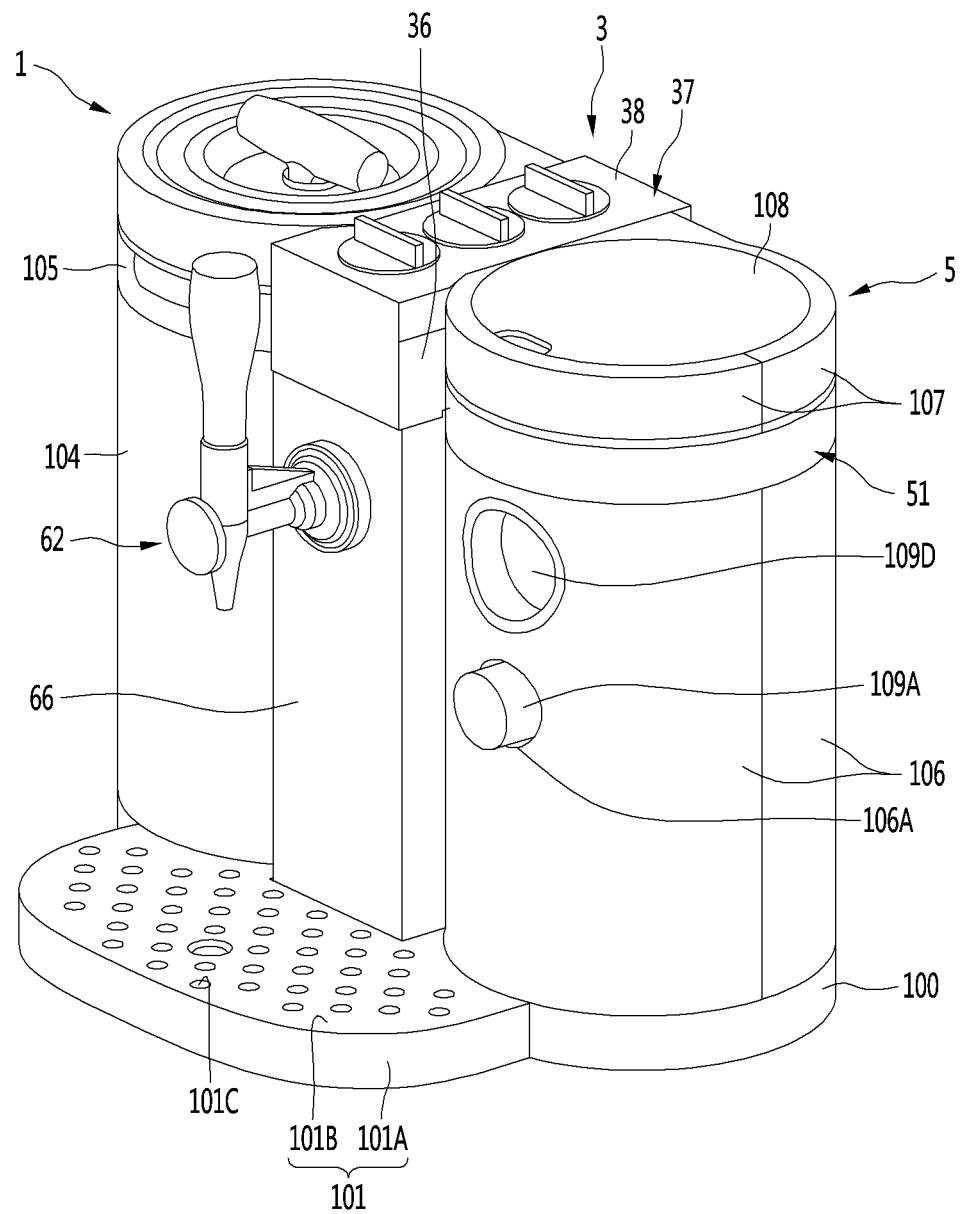
FIG. 2 is a diagram illustrating an example of a perspective view of the beverage-making apparatus according to some implementations.
Figure 3:
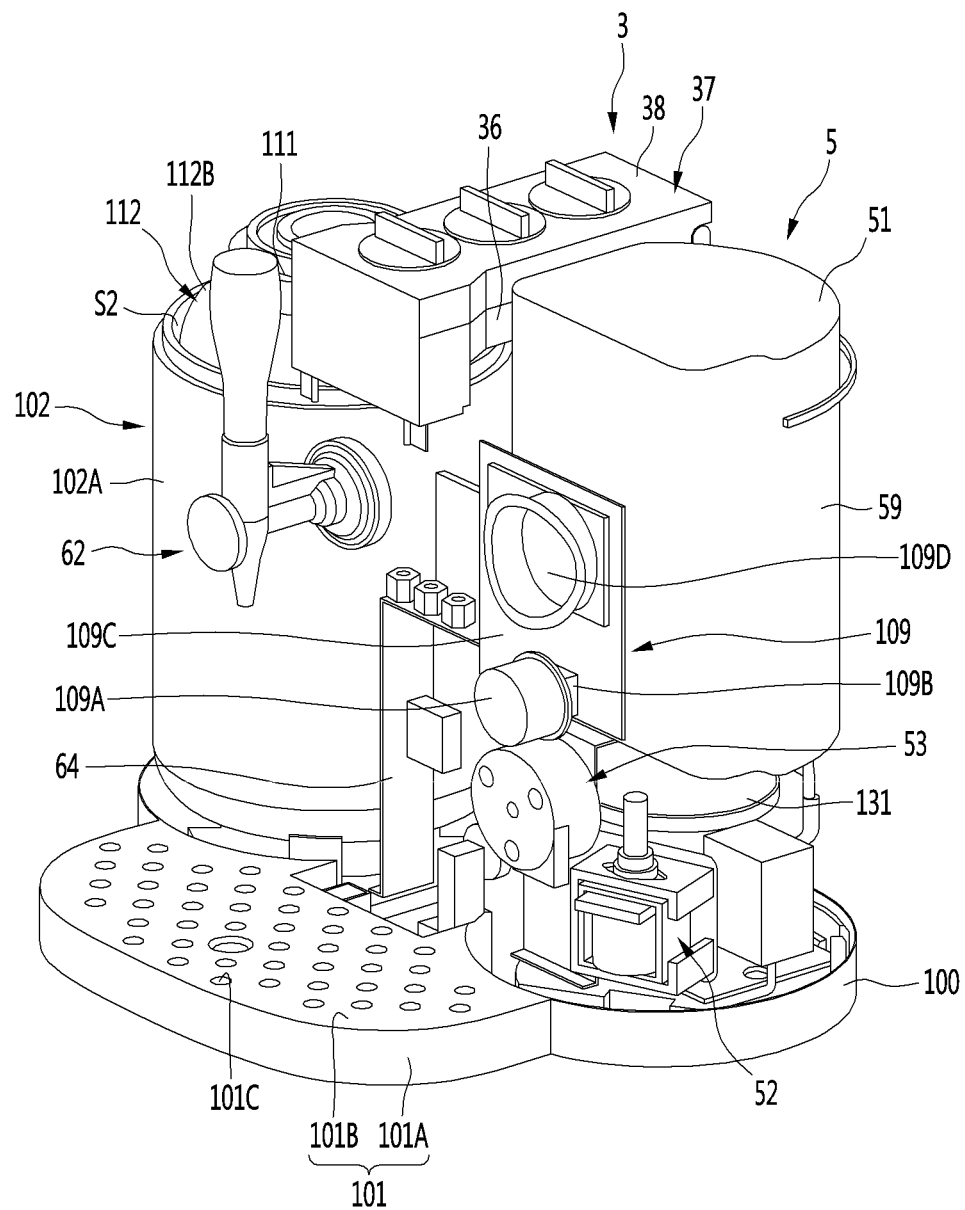
FIG. 3 is a diagram illustrating an example of a perspective view illustrating an inside of the beverage-making apparatus according to some implementations.
Figure 4:
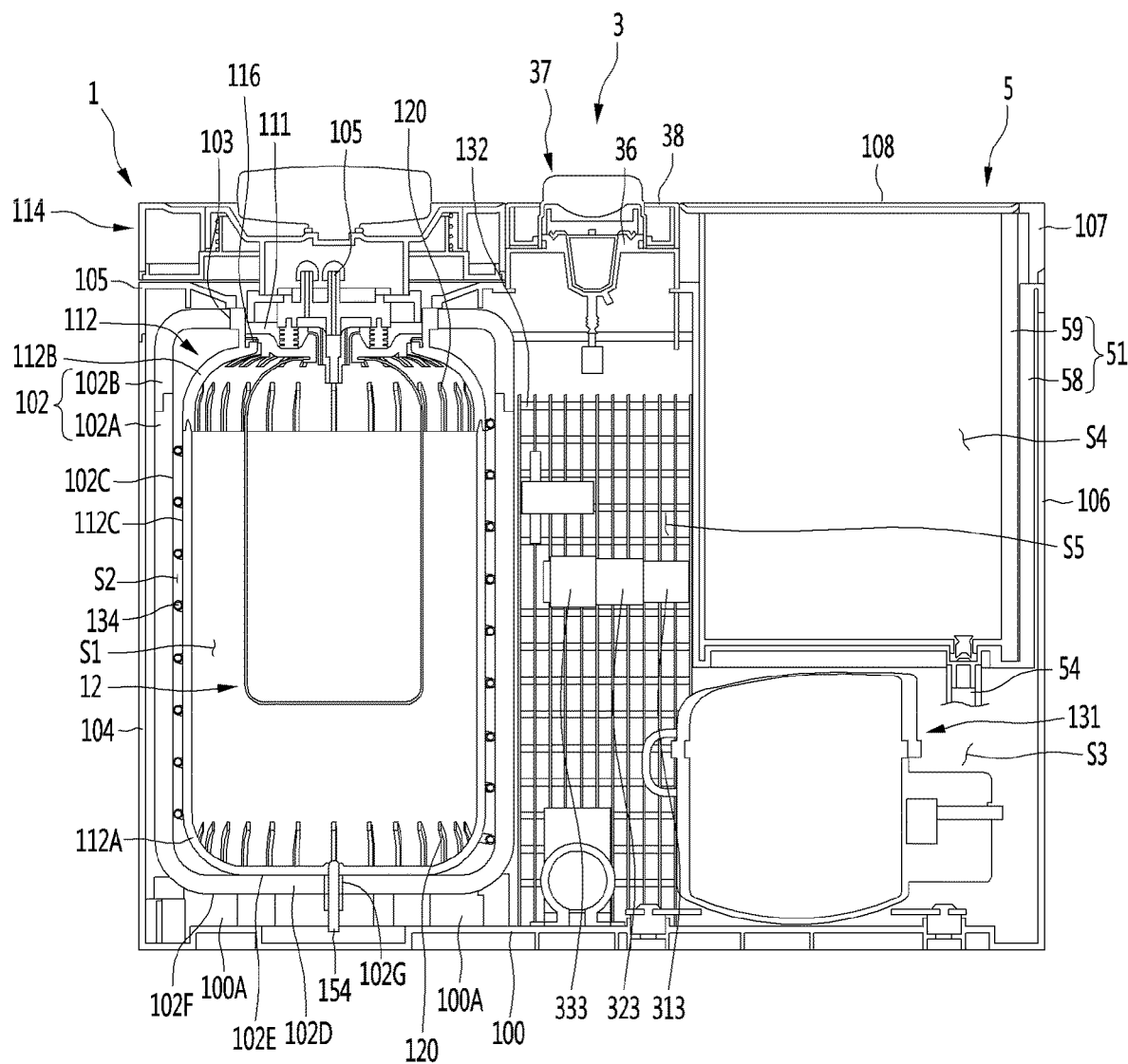
FIG. 4 is a diagram illustrating an example of a front view illustrating an inside of the beverage-making apparatus according to some implementations.

FIG. 2 is a perspective view of the beverage maker according to some implementations. FIG. 3 is a perspective view illustrating an inside of the beverage maker according to some implementations. FIG. 4 is a front view illustrating an inside of the beverage maker according to some implementations.

The beverage maker may further include a base 100. The base 100 may form a bottom appearance of the beverage maker, and support the fermentation tank assembly 11, the compressor 131, the water supply heater 53, the water supply pump 52, the water tank 51, and the like, which are located at the top side thereof.

The beverage maker may further include a beverage container 101 configured to receive and keep beverage dropping from the beverage extraction valve 62. The beverage container 101 may be integrally formed with the base 100 or be coupled to the base 100.

The beverage container 101 may include a container body 101A having a space in which the beverage dropping from the beverage extraction valve 62 is accommodated. The beverage container 101 may include a container top plate 101B disposed at the top surface of the container body 101A to cover the space in the container body 101A.

The container body 101A may be formed to protrude forward at a front portion of the base 100. The top surface of the container body 101A may be opened.

Holes 101C through which the beverage drops into the container body 101A may be formed in the container top plate 101B.

Beverage dropping around a beverage container in the beverage dropping from the beverage extraction valve 62 may drop to the container top plate 101B, and be temporarily kept inside the beverage container 101 through the holes 101C of the container top plate 101B. Thus, surroundings of the beverage maker can be cleanly maintained.

The fermentation tank 112, as shown in FIG. 4, may include a lower fermentation tank 112A of which top surface is opened, the lower fermentation tank 112A having a space formed therein, and an upper fermentation tank 112B disposed at the top of the lower fermentation tank 112A, the upper fermentation tank 112B having the opening 111 formed in the top surface thereof.

A seat part 116 on which the beverage ingredient pack 12 is mounted may be provided in the fermentation tank 112. The seat part 116 may be provided to protrude from the opening 111, and a circumferential part of the beverage ingredient pack 12 may be mounted on the seat part 116.

The beverage maker may include the heat insulating wall 102 surrounding both of the fermentation tank 112 and the evaporator 134.

The heat insulating wall 102 may be formed of polystyrene foam or the like, which has high heat insulation performance and can absorb vibration.

A heat insulating wall opening 103 may be formed at an upper portion of the heat insulating wall 102, and the heat insulating space S2 may be formed inside the heat insulating wall 102.

The heat insulating wall 102 may be configured as an assembly of a plurality of members. The heat insulating wall 102 may include a lower heat insulating wall 102A of which top surface is opened, the lower heat insulating wall 102A having a space formed therein, and an upper heat insulating wall 102B disposed at the top of the lower heat insulating wall 102A, the upper heat insulating wall 102B having the heat insulating wall opening 103 formed in the top surface thereof.

The heat insulating wall 102 having the lower heat insulating wall 102A and the upper heat insulating wall 102B may surround the circumferential and bottom surfaces of the fermentation tank 112.

The heat insulating wall opening 103 of the heat insulating wall 102 may surround an upper portion of the fermentation tank 112. The heat insulating wall opening 103 of the heat insulating wall 102 may surround the outer surface of a portion at which the heat insulating wall opening 103 is formed in the fermentation tank 112.

An inner surface 102C of the heat insulating wall 102 may have a larger diameter than an outer surface 112C of the fermentation tank 112, and a gap may be formed between the inner surface 102C of the heat insulating wall 102 and the outer surface 112C of the fermentation tank 112. Air may be filled in the gap, and the air between the inner surface 102C of the heat insulating wall 102 and the outer surface 112C of the fermentation tank 112 may heat-insulate the fermentation tank 112. The gap between the inner surface 102C of the heat insulating wall 102 and the outer surface 112C of the fermentation tank 112 may be a space in which the evaporator 134 is accommodated, and simultaneously be a space that can minimize a change in temperature of the fermentation tank 112.

The fermentation tank 112 may be mounted on a top surface 102E of a bottom plate part 102D of the heat insulating wall 102, and be supported by the top surface 102E of the bottom plate part 102D of the heat insulating wall 102.

A bottom surface 102F of the bottom plate part 102D of the heat insulating wall 102 may be placed on a heat insulating wall supporter 100A formed on the top surface of the base 100.

An air supply flow path through-hole 102G through which the air supply flow path 154 passes may be formed in the bottom plate part 102D of the heat insulating wall 102. The air supply flow path through-hole 102G may form at least part of a channel that is communicative with a space that is formed in the interior of the container body between a wall of the container body and the beverage ingredient pack 12 mounted inside the container body. Air that is supplied through this channel may exert pressure on the flexible beverage ingredient pack 12, causing the manufactured beverage to be extracted. At least a portion of the air supply flow path 154 may be formed through the heat insulating wall 102, and be connected to the fermentation tank 112.

Meanwhile, the evaporator 134 may be an evaporating tube wound around the outer surface of the fermentation tank 112 to be located in the gap. The evaporator 134 may be in contact with each of the outer surface 112C of the fermentation tank 112 and the inner surface 102C of the heat insulating wall 102. The evaporator 134 may be supported by the heat insulating wall 102.

The evaporator 134 may include an extending tube extending to the outside of the heat insulating wall 102 by passing through an evaporating tube through-hole formed in the heat insulating wall 102.

The beverage maker may include a heat insulating wall cover 104 and 105 surrounding the circumferential and top surfaces of the heat insulating wall 102.

The heat insulating wall cover 104 and 105 may be configured as one cover, and be configured as an assembly of a plurality of covers.

The heat insulating wall cover 104 and 105 may include a lower heat insulating wall cover 104 of which bottom surface is opened, the lower heat insulating wall cover 104 surrounding the outer circumferential surface of the heat insulating wall 102, and an upper heat insulating wall cover 105 disposed at the top of the lower heat insulating wall cover 104, the upper heat insulating wall cover 105 covering the top surface of the heat insulating wall 102.

A lower portion of the lower heat insulating wall cover 104 may be placed on the base 100.

A lower portion of the upper heat insulating wall cover 105 may be placed on the top end of the lower heat insulating wall cover 104.

The heat insulating wall cover 104 and 105 may protect the heat insulating wall 102, and form a portion of the appearance of the beverage maker.

The heat insulating wall cover 104 and 105 may surround the entire circumferential surface of the heat insulating wall 102, and surround only a portion of the circumferential surface of the heat insulating wall 102.

A side opening may be formed in a surface of the heat insulating wall cover 104 and 105, which faces the water tank 51. The extending tube of the evaporator 134 may be disposed to pass through the side opening. The extending tube of the evaporator 134 may extend to an accommodation space S5 shown in FIG. 4, which will be described later, by passing through the side opening of the heat insulating wall cover 104 and 105.

Meanwhile, the water tank 51 may be spaced apart from the base 100 at the top side of the base 100. The water tank 51 may be spaced apart from the base 100 in the vertical direction. A space S3 in which at least one of the compressor 131, the water supply heater 53, and the water supply pump 52 is to be accommodated may be formed between the water tank 51 and the base 100. In addition, the water tank 51 may be spaced apart from the heat insulating wall 102 in the horizontal direction.

The beverage maker may include a water tank supporter 106 supporting the water tank 51 to be spaced apart from the base 100. The water tank supporter 106 may be disposed at the base 100, and support the water tank 51 to be spaced apart from the base 100 at the top side of the base 100. The bottom end of water tank supporter 106 may be placed on the base 100, and the water tank 51 may be placed at an upper portion of the water tank supporter 106.

The water tank supporter 106 may be configured such that a plurality of supporter members are coupled in a hollow cylindrical shape. A side opening may be formed in a surface of the water tank supporter 106, which faces the heat insulating wall 102.

The water tank 51 may include an outer water tank 58, and an inner water tank 59 accommodated in the outer water tank 58, the inner water tank 59 in which a space S4 having water accommodated therein is formed.

The outer water tank 58 may be placed at an upper portion of the water tank supporter 106, and the bottom surface of the outer water tank 58 may be spaced apart from the top surface of the base 100. The space S3 in which at least one of the compressor 131, the water supply heater 53, and the water supply pump 52 is to be accommodated may be formed between the outer water tank 58 and the base 100.

The outer water tank 58 may have a vessel shape of which top surface is opened, and protect the inner water tank 59 by surrounding the outer circumferential and bottom surfaces of the inner water tank 59 located therein.

The inner water tank 59 may be inserted into the outer water tank 58, and be supported by the outer water tank 58.

The beverage maker may further include a water tank protector 107 disposed at the top side of the outer water tank 58 to surround an upper outer circumferential surface of the inner water tank 59. The water tank protector 107 may be disposed to surround the entire or a portion of the upper outer circumferential surface of the inner water tank 59. The water tank protector 107 may be configured such that a plurality of protector members are coupled in a ring shape.

The beverage maker may further include a water tank lid 108 coupled to the water tank 51 or the water tank protector 107 to cover the top surface of the water tank 51. One side of the water tank lid 108 may be rotatably connected to the water tank 51 or the water tank protector 107. The water tank lid 108 may be separably mounted on the top surface of the water tank 51 or the water tank protector 107.

Meanwhile, at least one of the compressor 131, the water supply heater 53, and the water supply pump 52 may be disposed between the base 100 and the water tank 51.

The condenser 132 may be disposed to face at least one of the space between the heat insulating wall 102 and the water tank 51, and the heat insulating wall 102.

The supplier 3 may be disposed between the fermentation tank cover 114 and the water tank 51. In this case, the beverage maker may be compactly manufactured as compared with when the supplier 3 is located at a position except the space between the fermentation tank cover 114 and the water tank 51, and the supplier 3 may be protected by the fermentation tank cover 114 and the water tank 51.

As shown in FIG. 4, one side of the supplier 3 may be mounted on the outer water tank 58, and the other side of the supplier 3 may be mounted on the heat insulating wall cover 104 and 105. The supplier 3 may be vertically spaced apart from the base 100 at the top side of the base 100.

The supplier 3 may include a capsule accommodation body 36 having the capsule accommodation part in which the capsules C1, C2, and C3 shown in FIG. 1 are attachably/detachably accommodated, and a lid module 37 covering the capsule accommodation part.

One side plate facing the water tank 51 among left and right side plates of the capsule accommodation body 36 may be mounted on a mounting part formed in the outer water tank 58 to be supported by the outer water tank 58.

The other side plate facing the fermentation tank cover 114 among the left and right side plates of the capsule accommodation body 36 may be mounted on the heat insulating wall cover 104 and 105, and be supported by the heat insulating wall cover 104 and 105.

The lid module 37 may include a lid 38 covering the capsule accommodation body 36. The lid 38 may be slidingly disposed at the capsule accommodation body 36 or be rotatably connected to the capsule accommodation body 36. The lid 38 may be hinge-connected to the capsule accommodation body 36.

The supplier 3 may be installed to be located at an approximately central upper portion of the beverage maker, and the user may easily mount or separate the capsules C1, C2, and C3 by upwardly rotating the lid module 37 of the supplier 3.

The accommodation space S5 in which a plurality of parts are to be accommodated may be formed in the beverage maker. Here, the accommodation space S5 may be a space that becomes a space between the heat insulating wall 102 and the water tank 51 in the left-right direction and becomes a space between the supplier 3 and the base 100 in the top-bottom direction.

In the beverage maker, a plurality of parts are preferably accommodated in the accommodation space S5. In this case, the beverage maker may become compact. The plurality of parts accommodated in the accommodation space S5 may be protected by being surrounded by the heat insulating wall 102, the water tank 51, the base 100, the supplier 3, the condenser 132, and a center cover 66 which will be described later.

The opening/closing valves 313, 323, and 333 installed in the supplier entrance flow paths 311, 321, and 331 shown in FIG. 1 to open/close the supplier entrance flow paths 311, 321, and 331, as shown in FIG. 4, may be located under the capsule accommodation body 36.

The opening/closing valves 313, 323, and 333 may be installed in a bracket 64 (see FIG. 3) disposed at the base 100.

The bracket 64 may be disposed to be located at a side of the heat insulating wall 102, and the opening/closing valves 313, 323, and 333 may be installed to be located between the heat insulating wall 102 and the water tank 51 by the bracket 64. The opening/closing valves 313, 323, and 333 may be located between the heat insulating wall 102 and the water tank 51 in the left-right direction, and be located between the base 100 and the supplier 3 in the top-bottom direction.

The beverage maker may further include the center cover 66 covering the front of the opening/closing valves 313, 323, and 333.

The center cover 66, as shown in FIG. 2, may be disposed to cover between the heat insulating wall cover 104 and the water tank supporter 106 in the left-right direction and cover between the supplier 3 and the base 100 in the top-bottom direction. The rear surface of the center cover 66 may face the condenser 132 in the front-rear direction, and protect a plurality of parts.

In addition, a front portion of the supplier 3 may be placed on the top end of the center cover 66, and the supplier 3 may be supported by the center cover 66.

Meanwhile, the beverage extraction valve 62 may be mounted to the center cover 66. The beverage extraction valve 62 may be mounted to protrude forward from the center cover 66. The beverage extraction valve 62 may be mounted to the center cover 66 to be located at the top side of the beverage container 101.

The beverage maker may include a controller 109 that controls the beverage maker.

The controller 109 may include a main PCB 109C.

The controller 109 may include a wireless communication element that performs wireless communication with a wireless communication device such as a remote controller or a portable terminal. The wireless communication element, such as a Wi-Fi module or a Bluetooth module, is not limited to its kind as long as it can perform wireless communication with a remote controller or a wireless communication device. The wireless communication element may be mounted on the main PCB 109C or a display PCB which will be described later.

The controller 109 may include an input unit that receives a command related to the manufacturing of the beverage maker. The input unit may be any suitable mechanical and/or electronic input unit. For example, the input unit may include a rotary knob 109A and a rotary switch 109B switched by the rotary knob 109A. A knob hole 106A through which the rotary knob 109A rotatably passes may be formed at one side of the water tank supporter 106. The rotary knob 109A may be disposed such that at least one portion of the rotary knob 109A is exposed to the outside. The rotary switch 109B may be mounted on the main PCB 109C. As another example, the input unit may include a touch screen that receives a command of the user in a touch scheme. The touch screen may be provided in a display 109D which will be described later. The user may input a command through the remote controller or the wireless communication device, and the controller 109 may receive the command of the user through the wireless communication element.

The controller 109 may include the display 109D that displays various information of the beverage maker. The display 109D may include a display element such as LCD, LED, or OLED. The display 109D may include the display PCB on which the display element is mounted. The display PCB may be mounted on the main PCB 109C or be connected to the main PCB 109C through a separate connector.

The display 109D may display information that has been input through the input unit.

The display 109D may display information of the beverage brewing pack 12 and information on a fermentation time of beverage ingredients, a beverage completion time, or the like. The fermentation time of the beverage ingredients or the beverage completion time may be changed depending on kinds of the beverage ingredients contained in the beverage brewing pack 12. If beverage brewing pack 12 approaches the fermentation tank assembly 11, the controller 109 may acquire information from the beverage brewing pack 12 through a communication module such as NFC.

In some implementations, a compact chip in which various information related to the beverage ingredients may be attached in the shape of a sticker, etc. to the beverage brewing pack 12, and the chip and an NFC tag that transmits/receives data may be installed in the beverage maker. In such implementations, the NFC tag may be mounted on the fermentation tank assembly 11, the main PCB 109C, or the display PCB. When the NFC tag is mounted on the fermentation tank assembly 11, the NFC tag may be mounted on the opening 111 of the fermentation tank 112 or the fermentation tank cover 114. The NFC tag may be connected to the controller 109 through a data line.

If the beverage brewing pack 12 is accommodated in the fermentation tank assembly 11, the controller 109 may acquire information of the beverage brewing pack 12 from a chip provided in the beverage brewing pack 12.

In some implementations, when the NFC tag is installed on the display PCB, the NFC tag may be installed at a front portion of the beverage maker. If the beverage brewing pack 12 comes close to the front portion of the beverage maker by the user, the controller 109 may acquire information related to beverage-making ingredients from the beverage brewing pack 12.

The controller 109 may transmit the information acquired from the NFC tag to the display 109D or the wireless communication device, and the display 109D or the wireless communication device may display kinds of beverage ingredients, a total fermentation time, a beverage completion time, or the like.

In some implementations, the controller 109 may acquire information related to beverage-making ingredients from the wireless communication device through the wireless communication element. The wireless communication device may receive the information related to the beverage-making ingredients from the user, or acquire the information related to the beverage-making ingredients from the beverage brewing pack 12 using an NFC communication module. The wireless communication device may transmit the acquired information to the beverage-making apparatus.

The display 109D may display various information related to brewing of beverage while the beverage is being brewed. The controller 109 may be connected to the temperature sensor 16. The controller 109 may transmit information on a temperature sensed by the temperature sensor 16 to the display 109D or the wireless communication device, and the display 109D or the communication device may display the temperature sensed by the temperature sensor 16 through a numerical value, a graph, or the like.

The display 109D may display a completion degree of the beverage, an amount of carbonic acid contained in the beverage, or the like through a numerical value, a graph, or the like while the beverage is being brewed.

The display 109D may differently display a completion degree of the beverage in primary fermentation and a completion degree of the beverage in secondary fermentation. The amount of carbonic acid in the beverage of the beverage brewing pack 12 may be gradually increased as time elapses. The controller 109 may detect a pressure in the beverage brewing pack 12 through the pressure sensor 72, and detect a temperature of the fermentation tank assembly 11 through the temperature sensor 16. The controller 109 may calculate an amount of carbonic acid using the detected pressure and temperature according to a preset equation or table. The controller 109 may transmit information on the calculated amount of carbonic acid to the display 109D or the wireless communication device, and at least one of the display 109D and the wireless communication device may display the calculated amount of carbonic acid.

The display 109D may display a remaining amount of the beverage after the beverage is completely brewed.

If the secondary fermentation which will be described later is ended, the controller 109 may determine that the beverage has been completely brewed.

The controller 109 may add up at least one of a time required to turn on the micro switch, a time required to drive the air pump 152, and a time required to turn on the main valve 9 after the beverage is completely brewed. The controller 109 may calculate an extraction amount of the beverage according to the added-up time, and calculate a remaining amount of the beverage from the calculated extraction amount. The controller 109 may transmit information on the remaining amount of the beverage to the display 109D or the wireless communication device, and at least one of the display 109D and the wireless communication device may display the remaining amount of the beverage.

Figure 5:
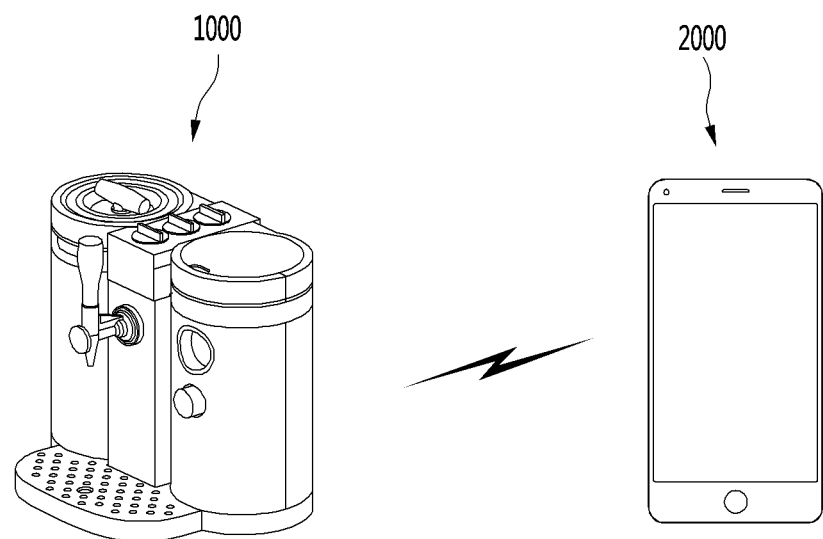
FIG. 5 is a diagram illustrating an example of a system including a beverage-making apparatus and a mobile terminal connected to the beverage-making apparatus according to some implementations.

FIG. 5 is a diagram illustrating an example of a system including a beverage-making apparatus and a mobile terminal connected to the beverage-making apparatus according to an implementation.

Referring to FIG. 5, the system may include a beverage-making apparatus 1000 and a mobile terminal 2000 connected to the beverage-making apparatus 1000. The beverage-making apparatus 1000 shown in FIG. 5 may correspond, for example, to the beverage-making apparatus described in FIGS. 1 to 4.

The beverage-making apparatus 1000 and the mobile terminal 2000 may be connected through wireless communications, for example through a wireless communication protocol. The wireless communication protocol may be, for example, Wi-Fi, Bluetooth, ZigBee, or any other suitable wireless communication protocol. As other examples, the mobile terminal 2000 may communicate with the beverage-making apparatus 1000 using short-range wireless communication signals, or may indirectly communicate via an intermediate device, such as a relay or a router.

The beverage-making apparatus 1000 may transmit various information related to the beverage-making apparatus 1000 to the mobile terminal 2000. The various information may include, for example, information related to an on/off state of the beverage-making apparatus 1000, information related to a type of the beverage-making apparatus 1000, information related to beverage ingredients acquired from the beverage brewing pack 12 and/or supplier 3 of apparatus 1000, beverage brewing information based on beverage ingredients of the apparatus 1000, and/or beverage maintenance or storage information related to the apparatus 1000.

The mobile terminal 2000 may store one or more programs, such as applications, that when executed by one or more processors, perform operations of providing brewing information regarding the beverage-making apparatus 1000. For example, if the stored application is executed, the mobile terminal 2000 may display information received from the beverage-making apparatus 1000, such as information regarding ingredients or recipes for making a beverage using apparatus 1000, or remotely control an operation of the beverage-making apparatus 1000 based on the displayed information.

The mobile terminal 2000 may include, for example, a cellular phone, a smart phone, a laptop computer, a terminal for digital broadcast, a personal digital assistant (PDA), a portable multimedia player (PMP), a navigation system, a tablet PC, an ultrabook, a wearable device (e.g., a smartwatch, a smart glass, or a head mounted display (HMD)), and the like. An example of a configuration of the mobile terminal 2000 will be described with reference to FIG. 6.

Figure 6:
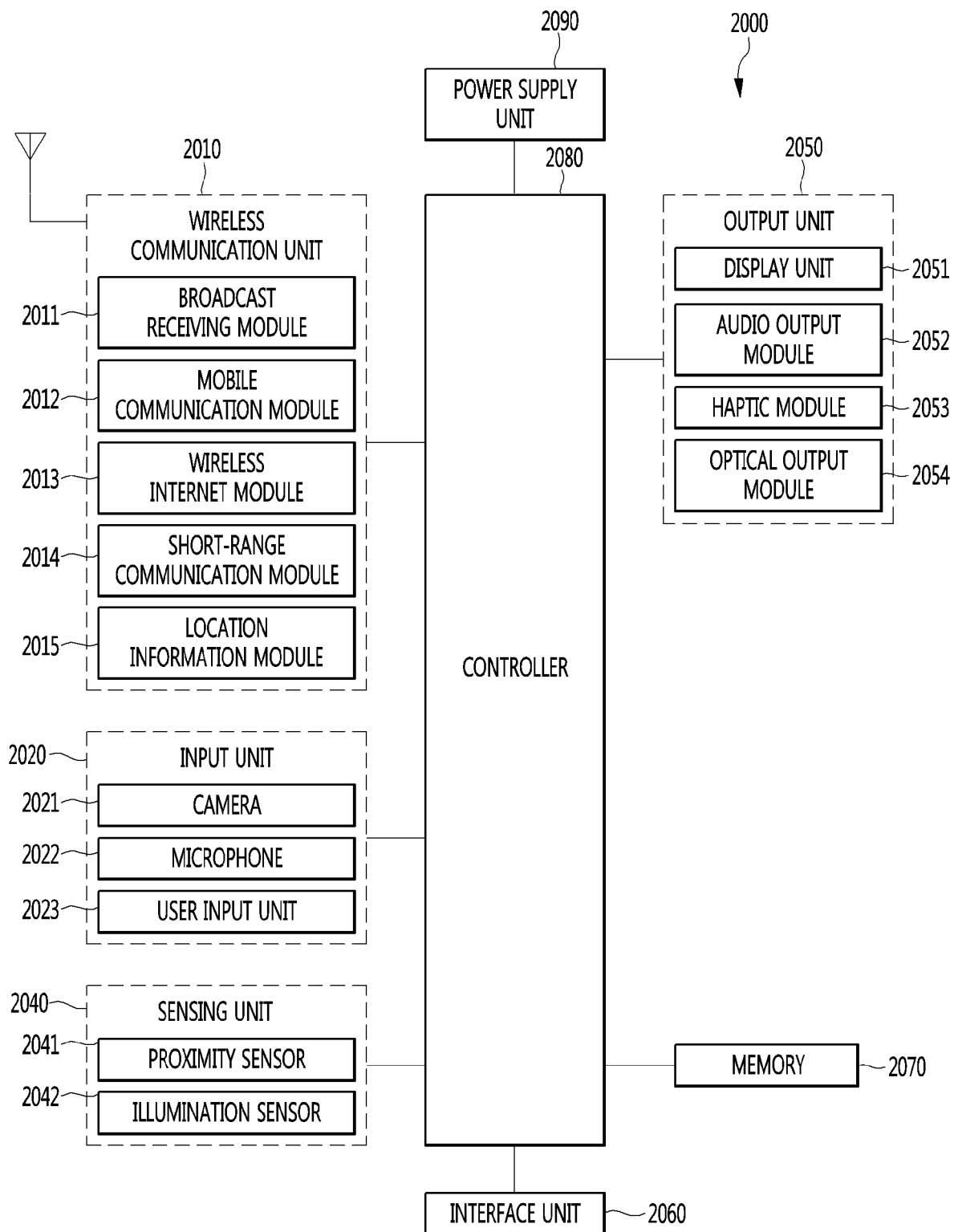
FIG. 6 is a block diagram illustrating an example of a mobile terminal according to some implementations.

FIG. 6 is a schematic block diagram of an example of a mobile terminal according to an implementation.

In this example, the mobile terminal 2000 is shown having components such as a wireless communication unit 2010, an input unit 2020, a sensing unit 2040, an output unit 2050, an interface unit 2060, a memory 2070, a controller 2080, and a power supply unit 2090. However, not all implementations of the present disclosure necessarily implement all of the illustrated components in FIG. 6, and greater or fewer components may alternatively be implemented.

Referring to FIG. 6, the mobile terminal 2000 is shown having wireless communication unit 2010. The wireless communication unit 2010 includes one or more components which enable wireless communication between the mobile terminal 2000 and other devices, such as the beverage-making apparatus 1000 or other devices on a wireless communication system or network with which the mobile terminal 2000 is communicative.

In this example, the wireless communication unit 2010 includes one or more modules which enable communications, e.g., wireless communications between the mobile terminal 2000 and a wireless communication system, communications between the mobile terminal 2000 and another device or mobile terminal, and/or communications between the mobile terminal 2000 and an external server. Further, the wireless communication unit 2010 includes one or more modules which connect the mobile terminal 2000 to other devices. To facilitate such communications, in the example of FIG. 6, the wireless communication unit 2010 includes one or more of a broadcast receiving module 2011, a mobile communication module 2012, a wireless Internet module 2013, a short-range communication module 2014, and a location information module 2015.

The mobile terminal 2000 in FIG. 6 also implements an input unit 2020, which includes a camera 2021 for obtaining images or video, a microphone 2022, which is one type of audio input device for inputting an audio signal, and a user input unit 2023 (for example, a touch key, a push key, a mechanical key, a soft key, and the like) for allowing a user to input information. Data (for example, audio, video, image, and the like) is obtained by the input unit 2020 and may be analyzed and processed by controller 2080 according to device parameters, user commands, and combinations thereof.

The mobile terminal 2000 also includes a sensing unit 2040 that is implemented with one or more sensors configured to sense internal information of the mobile terminal 2000, the surrounding environment of the mobile terminal 2000, user information, and the like. For example, in FIG. 6, the sensing unit 2040 is shown having a proximity sensor 2041 and an illumination sensor 2042.

In some implementations, the sensing unit 2040 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 2021), a microphone 2022, a battery gauge, an environment sensor (for example, a barometer, a hygrometer, a thermometer, a radiation detection sensor, a thermal sensor, and a gas sensor, among others), a chemical sensor (for example, an electronic nose, a health care sensor, a biometric sensor, and the like), to name a few. The mobile terminal 2000 may be configured to utilize information obtained from sensing unit 2040, and in particular, information obtained from one or more sensors of the sensing unit 2040, and combinations thereof.

The mobile terminal 2000 also includes an output unit 2050 configured to output various types of information, such as audio, video, tactile output, and the like. In the example of FIG. 6, the output unit 2050 is shown having a display unit 2051, an audio output module 2052, a haptic module 2053, and an optical output module 2054.

The display unit 2051 may have an inter-layered structure or an integrated structure with a touch sensor in order to facilitate a touch screen. The touch screen may provide an output interface between the mobile terminal 2000 and a user, as well as providing a function as the user input unit 2023 which provides an input interface between the mobile terminal 2000 and the user.

The mobile terminal 2000 of FIG. 6 also implements an interface unit 2060, which serves as an interface with various types of external devices that can be coupled to the mobile terminal 2000. The interface unit 2060, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 2000 may perform assorted control functions associated with a connected external device, in response to the external device being connected to the interface unit 2060.

The mobile terminal 2000 also implements a memory 2070 that stores data to support various functions or features of the mobile terminal 2000. For instance, the memory 2070 may be configured to store application programs executed in the mobile terminal 2000, data or instructions for operations of the mobile terminal 2000, and the like. Some of these application programs may be downloaded from an external server via wireless communication. Other application programs may be installed within the mobile terminal 2000 at time of manufacturing or shipping, which is typically the case for basic functions of the mobile terminal 2000 (for example, receiving a call, placing a call, receiving a message, sending a message, and the like). It is common for application programs to be stored in the memory 2070, installed in the mobile terminal 2000, and executed by the controller 2080 to perform an operation (or function) for the mobile terminal 2000. Although the memory 2070 is shown in FIG. 6 as being a component that is separate and distinct from other components of FIG. 6, implementations are not limited thereto, and the memory 2070 may represent a collection of different memory elements that are implemented in different components of FIG. 6.

The mobile terminal 2000 also includes one or more processors, such as controller 2080, which functions to control overall operation of the mobile terminal 2000, in addition to the operations associated with the application programs. The controller 2080 may provide or process information or functions appropriate for a user by processing signals, data, information and the like, which are input or output by the various components depicted in FIG. 6, or activating application programs stored in the memory 2070.

As one example, the controller 2080 controls some or all of the components illustrated in FIGS. 1A-1C according to the execution of an application program that have been stored in the memory 2070. Although the controller 2080 is shown in FIG. 6 as being a component that is separate and distinct from other components of FIG. 6, implementations are not limited thereto, and the controller 2080 may represent a collection of different processors that are implemented in different components of FIG. 6.

The mobile terminal 2000 also includes a power supply unit 2090 that is configured to receive external power or provide internal power in order to supply appropriate power required for operating elements and components included in the mobile terminal 2000. In some implementations the power supply unit 2090 may include a battery, and the battery may be configured to be embedded in the terminal body, or configured to be detachable from the terminal body.

Various implementations described herein may be implemented in a computer-readable medium, a machine-readable medium, or similar medium using, for example, software, hardware, or any combination thereof.

The mobile terminal 2000 may perform operations, e.g., via an application, that controls operations of the beverage-making apparatus 1000 that is communicative to the mobile terminal 2000. The mobile terminal 2000 may also exchange various types of information with the beverage-making apparatus 1000 or various types of information related to a beverage that is produced by the beverage-making apparatus 1000. To perform such operations, the mobile terminal 2000 may execute an application downloaded from a computer, e.g., an external server, or may display interfaces that are generated by an application that is executed remotely by a computer.

For example, the controller 2080 of the mobile terminal 2000 may execute an installed application in response to an execution request of the application. As another example, the controller 2080 may perform operations in response to an application being executed remotely on a server. The controller 2080 may display various interfaces provided from the executed application through the display unit 2051. Two such examples of interfaces will be described below as examples of various interfaces that may be provided from the application.

Figure 7A:
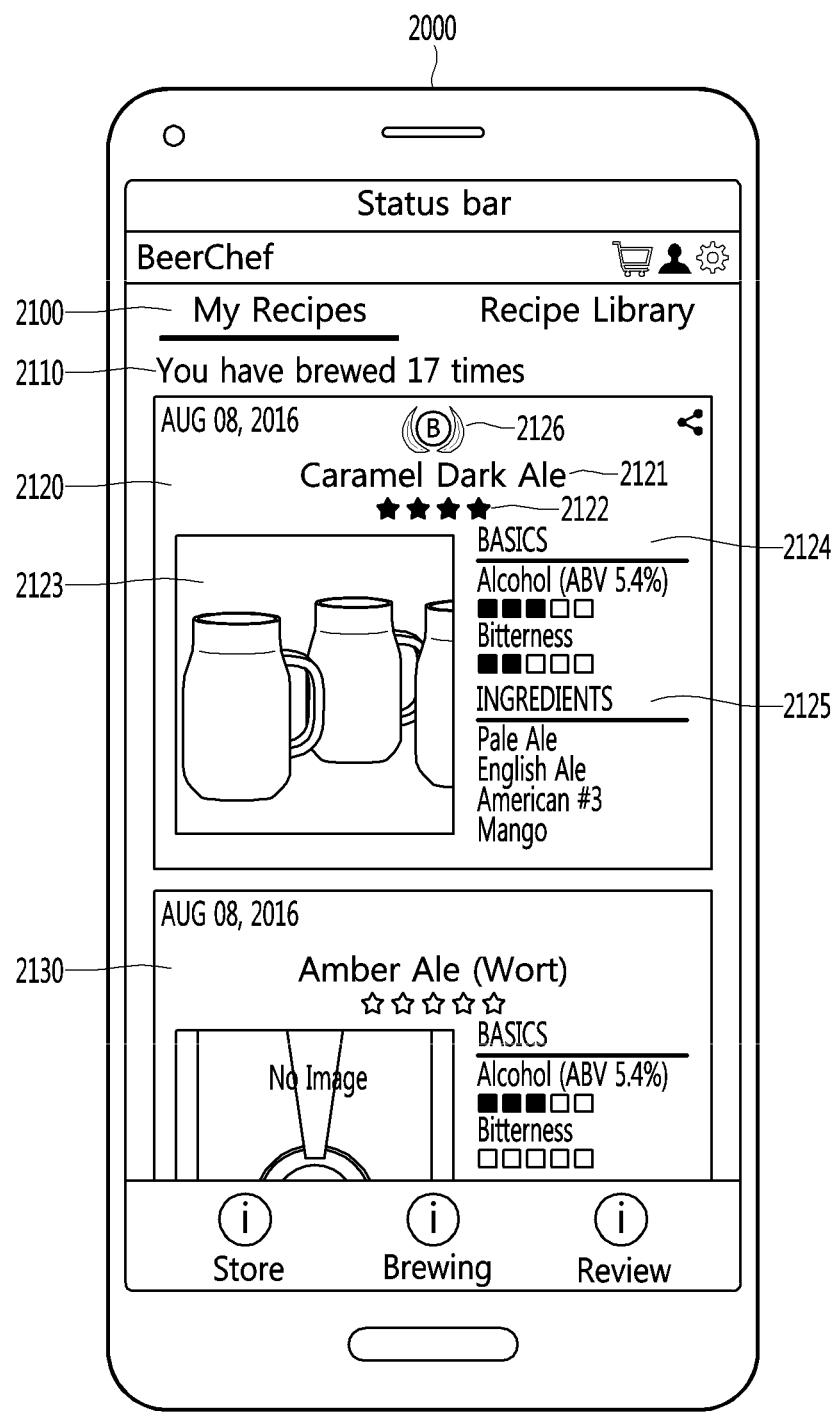
FIG. 7A is a diagram illustrating an example of a review interface including recipe information of a beverage that is produced using the beverage-making apparatus.
Figure 7B:
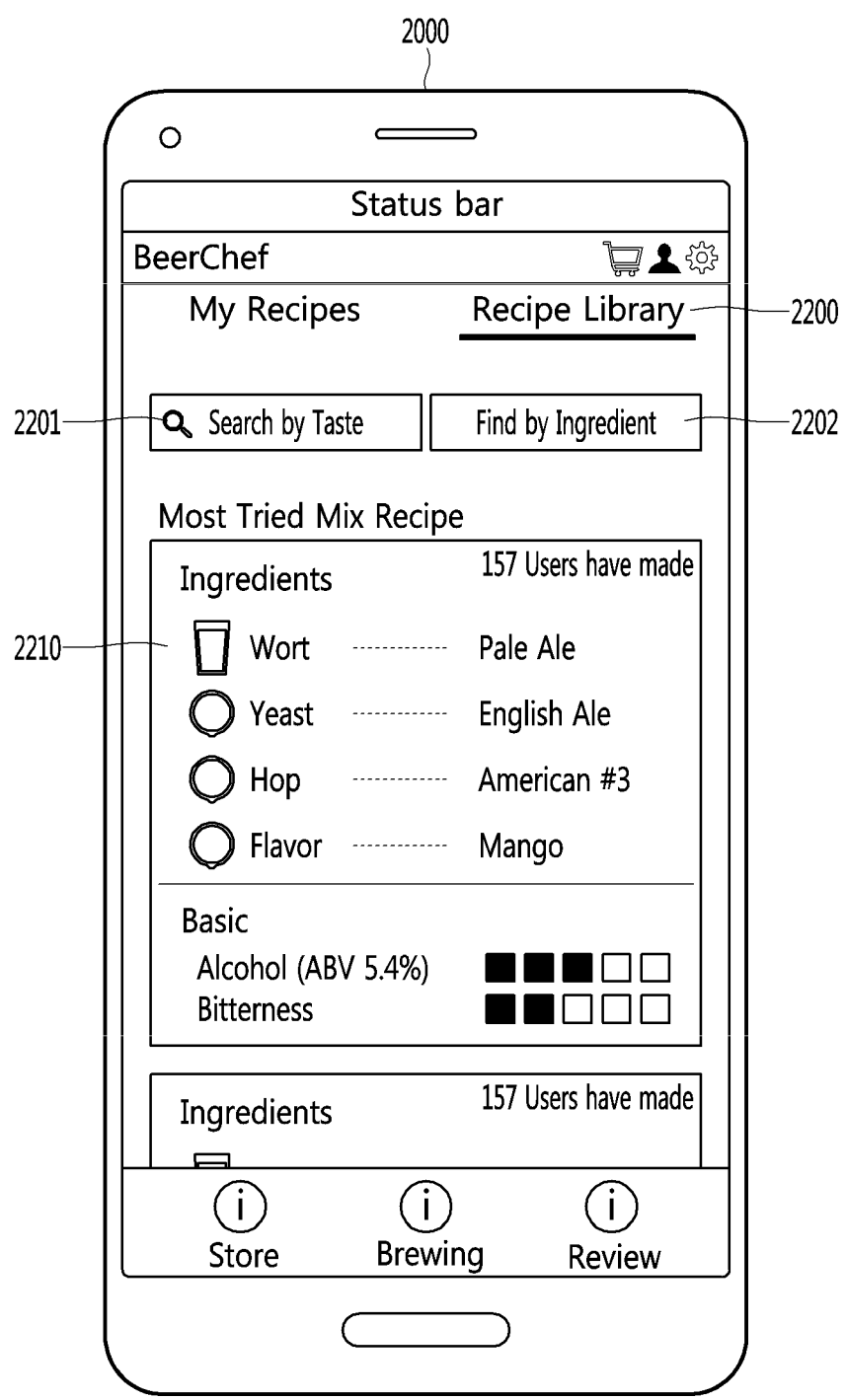
FIG. 7B is a diagram illustrating an example of a recipe search interface for a beverage produced using the beverage-making apparatus.

FIG. 7A is a diagram illustrating an example of an interface including historical recipe and/or ingredient information for a particular user of a beverage-making apparatus, and FIG. 7B is a diagram illustrating an example of an interface for searching through recipes of beverages produced using the beverage-making apparatus.

Referring to FIG. 7A, the controller 2080 of mobile terminal 2000 may display, through the display unit 2051, a user history interface 2100 including recipe and/or ingredient information of beverages for a user of the beverage making apparatus 1000. For example, the user history interface 2100 may include beverage making history information 2110 of a user, and lists 2120 and 2130 of beverages that have been made by the user.

The beverage making history information 2110 may include various types of information related to previous beverage-making operations, such as a number of times that a beverage has been made using the beverage maker 1000. Referring to the example of FIG. 7A, the beverage making history information 2110 shows that a user of the beverage-making apparatus 1000 has made a beverage 17 times in the past.

The lists 2120 and 2130 of beverages that have been produced may include information regarding beverages that have been produced using the beverage-making apparatus. In some implementations, if user history information regarding beverages is available, then the lists 2120 and 2130 may further include additional details regarding such user history information.

For example, referring to a first list 2120 in FIG. 7A, when user history information for a beverage has been registered, e.g., has been stored in a memory device external to the terminal 2000 and associated with the user, the first list 2120 may include various information regarding the beverage, such as a name 2121 of the beverage, a user's evaluation, e.g., a grade 2122, of the beverage, an image 2123 of the beverage, characteristic information 2124 (e.g., if the beverage is beer, then the characteristic information may include a strength of alcohol, a degree of bitter taste, etc.) regarding the beverage, and a beverage recipe 2125 (e.g., if the beverage is beer, then the recipe may include a wort, yeast, hops, and flavor additives) of the beverage.

In some implementations, the first list 2120 may further include an indicator, such as emblem 2126, that indicates one or more of the above types of information regarding the beverage. For example, the emblem 2126 may indicate a user's evaluation, e.g., a grade, of the brewed beverage, an evaluation of the beverage by other users, a number of times the beverage has been made, a quality of the beverage, etc.

Referring to the second list 2130, in scenarios in which user history information regarding the beverage has not been registered, e.g., has not been stored in a memory device external to the terminal 2000 and associated with the user, then the second list 2130 may instead display ingredient information (e.g., if the beverage is beer, then ingredient information may include wort information). Such ingredient information may relate to a beverage ingredient recognized by the beverage-making apparatus 1000, and may be displayed instead of user history information regarding a beverage itself. For example, the second list 2130 may display ingredient information, such as wort information for beer, instead of beverage information such as a name of the beverage, an image of the beverage, or recipe information of the beverage.

In some implementations, based on the ingredient information in the second list 2130, the controller 2080 of mobile terminal 2000 may receive a recipe of beverage and may register the received recipe, e.g., save the recipe to a memory device external to the terminal 2000 and associate the recipe with the user. This will be described later with reference to FIGS. 12A and 12B.

FIG. 7B illustrates an example of searching through a library of beverage recipes that can be made using the beverage-making apparatus 1000. Referring to FIG. 7B, the controller 2080 of mobile terminal 2000 may display, e.g., through the display unit 2051, a recipe search screen 2200 for searching a recipe of a beverage.

The search may be performed using various types of search queries. For example, the recipe search screen 2200 may include a taste-based search menu 2201 for searching a recipe based on taste of the beverage, and/or may include an ingredient-based search menu 2202 for searching a recipe based on an ingredient of the beverage.

If a search request is received through the search menus 2201 and 2202, the recipe search screen 2200 may display a search result list 2210 including a beverage recipe that matches the search request, e.g., which may be received from an external computer communicative with the mobile terminal 2000. The search result list 2210 may include recipe information of a beverage matched the search request. In some implementations, when a searching operation through the search menus 2201 and 2202 is not performed, the controller 2080 of mobile terminal 2000 may instead display, in the search result list 2210, a recommended recipe information, popular recipe information, or the like, e.g., which may be received from the external computer.

The search that is performed through the search interface 2200 in FIG. 7B may be conducted based on recipes or ingredients that have been registered by the user, and/or based on other recipes or ingredients that are available to be made using the beverage-making apparatus 1000.

Hereinafter, various examples of registering a recipe or ingredient of a beverage, performed through the mobile terminal 2000, will be described with reference to FIGS. 8 to 13E.

Figure 8:
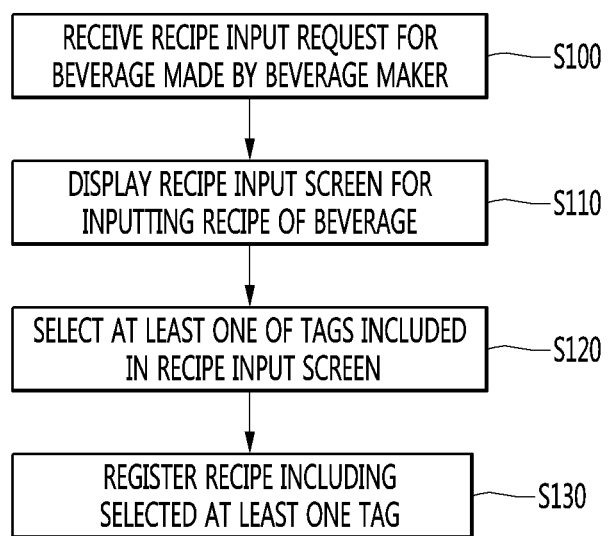
FIG. 8 is a flowchart illustrating an example of registering a recipe of a beverage, performed through the mobile terminal, according to some implementations.

FIG. 8 is a flowchart illustrating an example of registering a recipe of a beverage using one or more tags, performed through the mobile terminal. In this example, the mobile terminal 2000 registers a recipe based on one or more tags that have been selected by a user.

Referring to FIG. 8, the mobile terminal 2000 may receive a recipe input request for a beverage made by the beverage maker 1000 (S100). For example, the controller 2080 of the mobile terminal 2000 may receive a recipe input request for a beverage being made by the beverage maker 1000, or receive a recipe input request for a beverage that has been completely made by the beverage maker 1000. In some implementations, the controller 2080 may receive a recipe input request for a beverage to be made, before the beverage is made using the beverage maker 1000.

The mobile terminal 2000 may display a recipe input screen for inputting a recipe of the beverage, based on the received recipe input request (S110). The recipe input screen may correspond to a screen for inputting a name, an ingredient, a review, etc. of beverage being brewed or completely brewed. The controller 2080 may receive recipe information including a name, an ingredient, and a review of the beverage through the recipe input screen.

In some implementations, the mobile terminal 2000 may receive a selection of at least one of tags that are included in the recipe input screen (S120). For example, the controller 2080 may display a recipe input screen including a plurality of tags respectively representing information on a taste and/or an ingredient of the beverage. The tag may include a word or keyword used when specific information is searched. Each of the plurality of tags may correspond to any one word or keyword. For example, the tag may be implemented as a hash tag to which a hash symbol (#) is added, or any other suitable format that is used to indicate words or keywords associated with information to be searched.

The controller 2080 of mobile terminal 2000 may receive, from the user, an input for selecting at least one of the plurality of tags included in the recipe input screen, and select at least one tag, based on the received input.

The mobile terminal 2000 may register a recipe including the at least one tag that was selected (S130). For example, the mobile terminal 2000 may receive, from the user, an input for selecting some of the plurality of tags, and acquire recipe information of a beverage using the selected tags. The mobile terminal 2000 may then transmit the acquired recipe information to a computer, e.g., an external server, communicative with the mobile terminal 2000, thereby registering the recipe of the beverage.

FIGS. 9A to 13E illustrate various examples of user interfaces for registering a recipe or ingredient for making a beverage with the beverage-making apparatus 1000.

In particular, the examples in FIGS. 9A to 13E illustrates user interfaces at different points in time relative to a completion time of making a beverage with the beverage-making apparatus 1000. For example, FIGS. 9A to 11C illustrate user interfaces for registering a recipe of a beverage that is in a state of currently being produced by the beverage-making apparatus 1000. By contrast, FIGS. 12A to 13E illustrate examples of user interfaces for registering a recipe of a beverage that was previously produced and is being stored by the beverage-making apparatus 1000.

FIGS. 9A to 10B are diagrams illustrating examples of registering a recipe of a beverage that is in a state of being produced by the beverage-making apparatus 1000. For example, the controller 2080 of mobile terminal 2000 may provide a recipe registering function of beverage that is currently being made by the beverage making apparatus 1000.

Figure 9A:
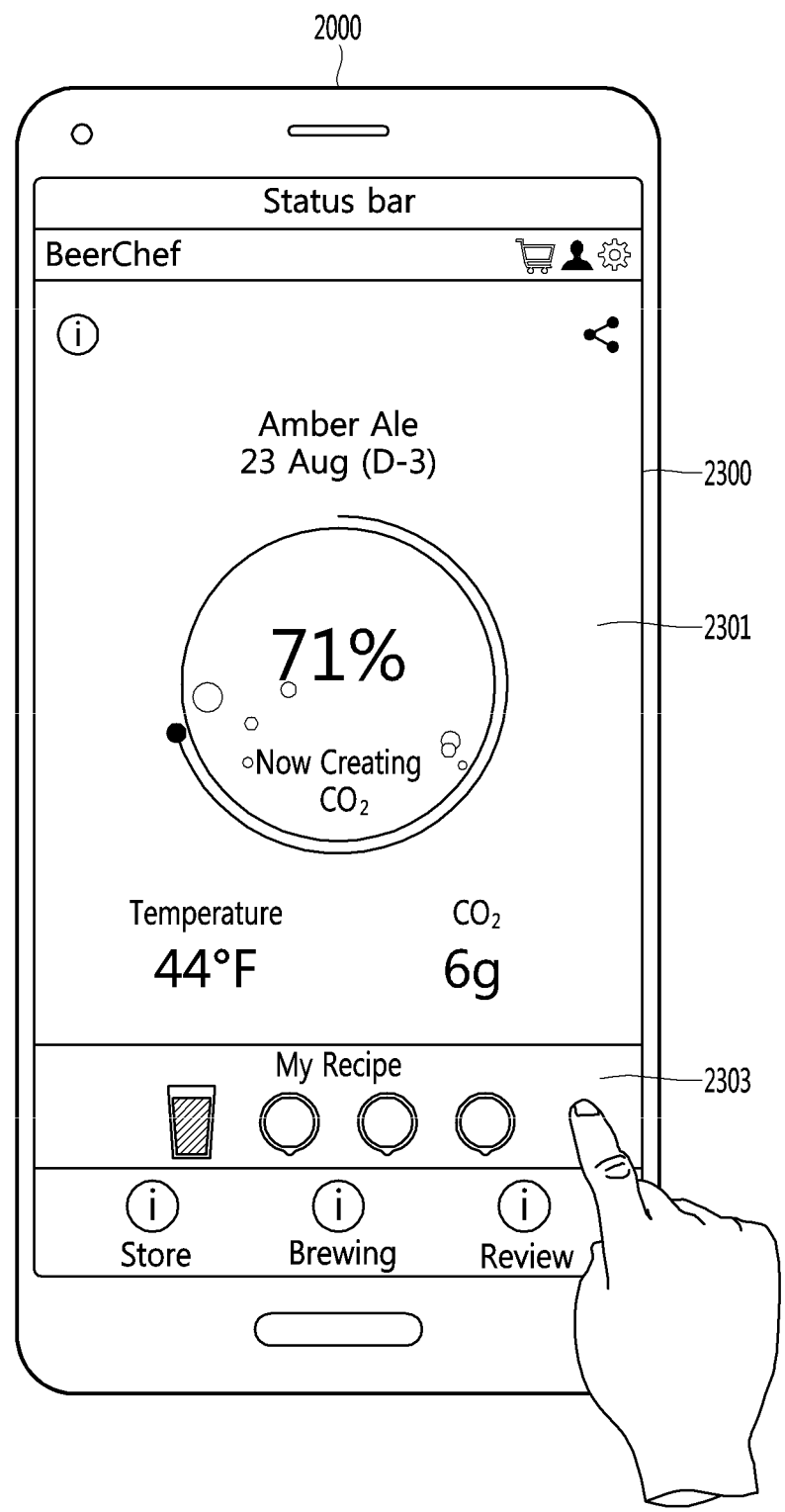
FIGS. 9A to 10B are diagrams illustrating examples of registering a recipe of a beverage being produced by the beverage-making apparatus.

Referring to FIG. 9A, the controller 2080 of mobile terminal 2000 may display, e.g., through the display unit 2051, a beverage-making state screen 2300 representing that the beverage maker 1000 is in the process of making a beverage. Specifically, the controller 2080 may receive information on a beverage-making state from the beverage maker 1000 communicative with the mobile terminal 2000, and display the beverage-making state screen 2300 including the received information.

For example, as shown in the example of FIG. 9A, the beverage-making state screen 2300 may include a beverage-making state window 2301 representing a completion date and/or time of the beverage being made, a beverage-making progress degree of the beverage, a beverage-making process of the beverage, a temperature of the beverage, a carbonic acid amount of the beverage, etc. The carbonic acid amount may refer to an amount of carbon dioxide in implementations in which carbonic acid is generated as a result of a reaction between carbon dioxide and water.

The beverage-making state screen 2300 may also include a recipe window 2303 indicating recipe information of the beverage that is currently being made, as shown in FIG. 9A. The recipe window 2303 may indicate recipe information including ingredients of the beverage that is currently being made by the beverage-making apparatus 1000.

At least some of the information displayed in recipe window 2303 may be obtained from the beverage-making apparatus 1000. As such, while a beverage is being made by the beverage-making apparatus 1000, the mobile terminal 2000 may obtain, from the apparatus 1000, information regarding one or more ingredients that are involved in the beverage-making process, and display that information in the recipe window 2303.

In such scenarios, the information regarding the currently-used ingredients may be acquired and transmitted to the mobile terminal 2000 from the beverage-making apparatus 1000 through various techniques. For example, as described in relation to FIG. 1, information regarding one or more ingredients may be acquired by the controller 109 of the beverage maker 1000 from the beverage ingredient pack 12 inserted into the beverage maker 1000, and/or from capsules containing the beverage ingredients, and/or a beverage ingredient package including the beverage ingredient pack 12 and the capsules. Such information may be acquired through a communication module, such as an NFC module or any suitable communication protocol module in the apparatus 1000. Once this information has been acquired by the beverage-making apparatus 1000, it may be transmitted to the mobile terminal 2000.

For example, if the beverage-making apparatus 1000 is a beer-making apparatus, then the information acquired from the beer brewing pack 12 may be information on wort (or malt) among the beer ingredients. In addition, the information acquired from the capsules may be information on at least one yeast, hops, and flavor additives among the beer ingredients.

The acquired information regarding the ingredients may thus be acquired by the beverage-making apparatus 1000 and communicated to the mobile terminal 2000, and then may be included in the beverage-making state window 2301 that is displayed on the mobile terminal 2000.

In the example of beer-making shown in FIG. 9A, when wort information "Amber Ale" is received from the beverage-making apparatus 1000, then the received wort information may be displayed in the state window 2301 of mobile terminal 2000. In addition, an indication that wort information has been received may be displayed in the recipe window 2303. For example, in order to indicate that the wort information has been received, the controller 2080 may display a wort icon of the recipe window 2303 differently from other icons (yeast, hop, and flavor additive icons) (e.g., color, size, etc.). In the example of FIG. 9A, the wort icon in receipt window 2303 is shaded, while the other three icons are not shaded, indicating that information regarding the wort ingredient, but not the other ingredients, has been received and input as an ingredient for the current beverage recipe being made by the apparatus 1000.

Figure 9B:
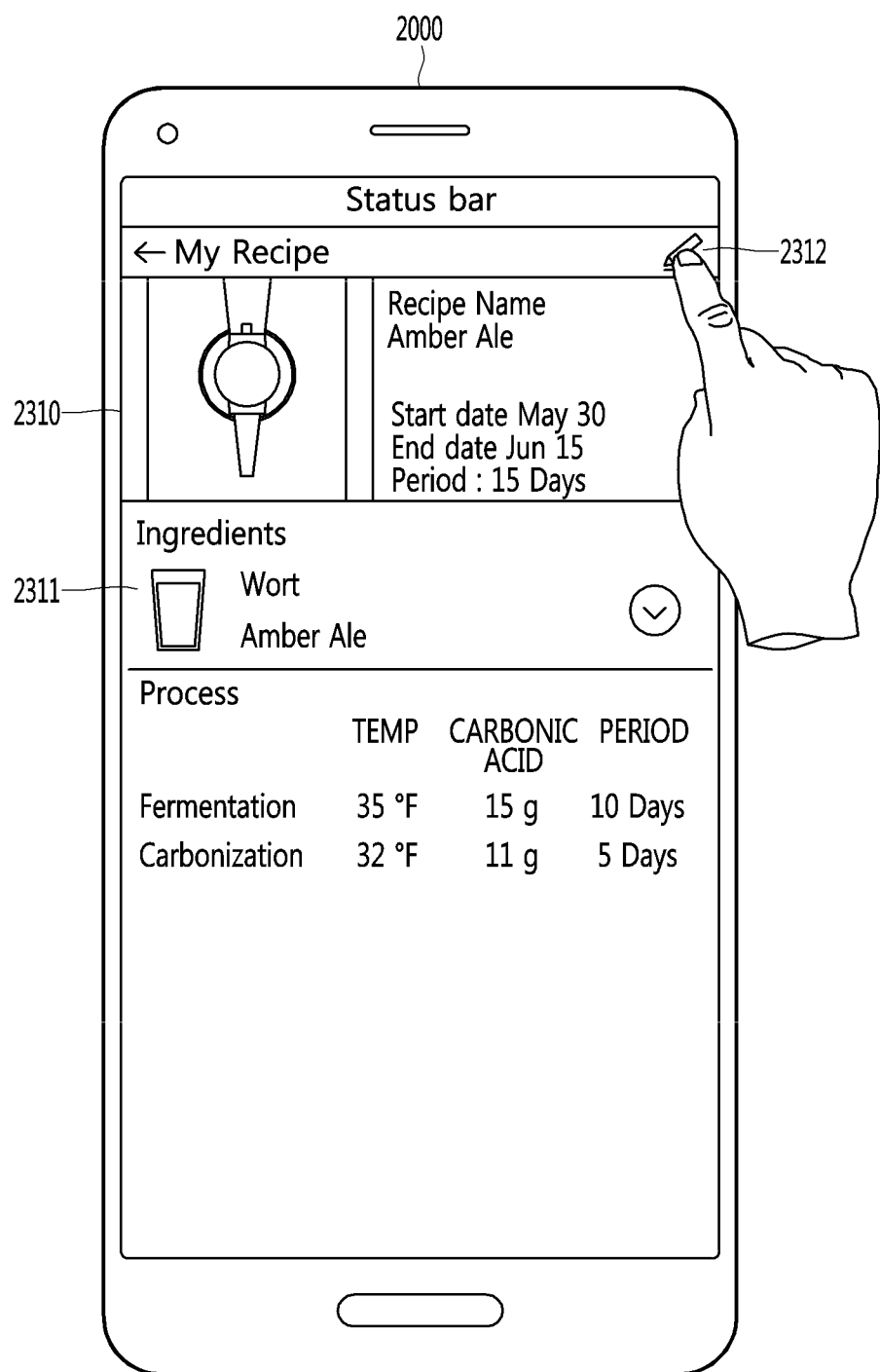

FIG. 9B illustrates an example of a user interface that is displayed by mobile terminal 2000 in response to a user selecting the recipe window 2303 of FIG. 9A.

When a user selects the recipe window 2303, then the controller 2080 may receive, e.g., from the user input unit 2023, an input indicating a selection of the recipe window 2303. The controller 2080 may then display, e.g., through the display unit 2051, a recipe input screen 2310 for inputting a recipe of the beverage being made, in response to the received input.

As shown in FIG. 9B, the recipe input screen 2310 may indicate a name of the beverage or a name of the recipe of the beverage that is currently being made in the beverage-making apparatus 1000. In some implementations, if the name of the beverage or recipe is not available, then the name of a currently-used ingredient may be displayed, as shown in FIG. 9B displaying "Amber Ale" as the wort ingredient currently being used. In addition, the recipe input screen 2310 may display other types of recipe information, such as an image of the beverage, and/or ingredients of the beverage. In some implementations, the recipe input screen 2310 may also include an ingredient window 2311 that displays a list of ingredients of the beverage. In the example of FIG. 9B, the ingredient window 2311 only displays ingredient information that was previously input or received, in this case, information regarding the wort ingredient "Amber Ale" that was received from the beverage-making apparatus 1000.

The recipe input screen 2310 may also display an editing icon 2312, which enables a user to edit information that is displayed in the recipe input screen 2310.

Figure 9C:
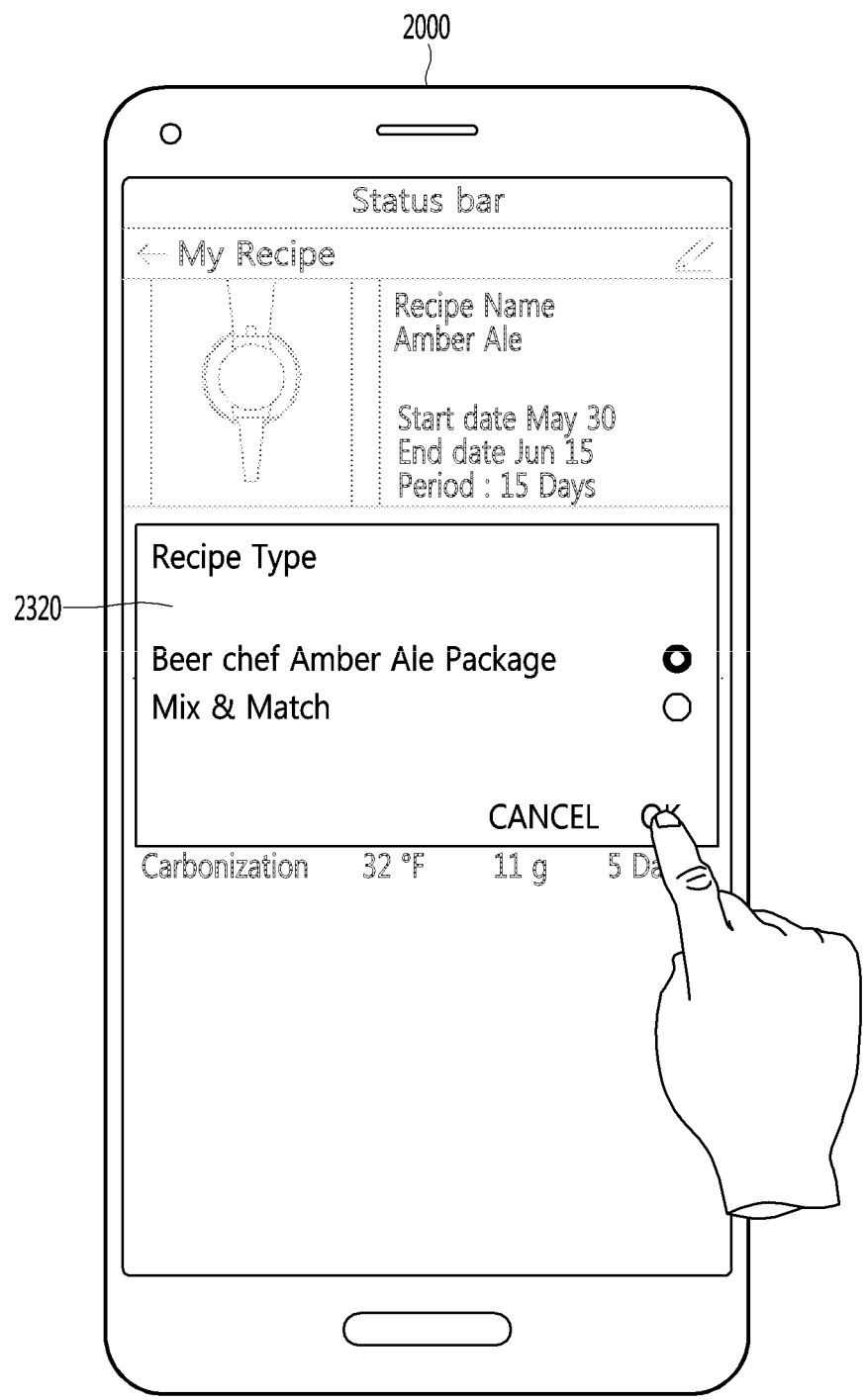

FIG. 9C illustrates an example of a user interface that is displayed by mobile terminal 2000 in response to a user selecting the editing icon 2312 of FIG. 9B.

As shown in FIG. 9C, in response to a user selecting the editing icon 2312 of FIG. 9B, the controller 2080 may provide a recipe inputting function that enables a user to input various information regarding the beverage recipe that is currently being made by the beverage-making apparatus 1000.

In some implementations, the controller 2080 may facilitate the user's input of recipe information by suggesting one or more recipes. The one or more recipes that are suggested may be recipes that include an ingredient that is known to be currently used by the beverage-making apparatus 1000. An example of such a currently-used ingredient is the wort ingredient "Amber Ale" indicated in FIGS. 9A and 9B, which was received by mobile terminal 2000 from the beverage-making apparatus 1000. Based on the wort ingredient that is known to be currently used by the beverage-making apparatus 1000, the mobile terminal 2000 may suggest one or more recipes that use that wort ingredient, e.g., "Amber Ale."

In the example of FIG. 9C, the controller 2080 displays a selection window 2320 with the beverage recipe "Amber Ale Package" that includes the ingredient that is known to be currently used by the beverage-making apparatus 1000, e.g., the wort ingredient "Amber Ale." This may enable the user to conveniently input other ingredients for a recipe based on an ingredient that is currently being used by the beverage-making apparatus 1000.

For example, if the beverage-making apparatus 1000 is used to make beer, and the wort of the beer that is currently being brewed is 'Amber Ale,' then the controller 2080 may display, through the selection window 2320, at least one recipe package that includes 'Amber Ale.' The displayed receipt package may be selected from among previously registered beer recipe packages. In addition, the example of FIG. 9C shows the selection window 2320 also displaying an item "Mix & Match" that enables the user to directly select the other ingredients that will complement the currently-used wort ingredient "Amber Ale."

Figure 10A:
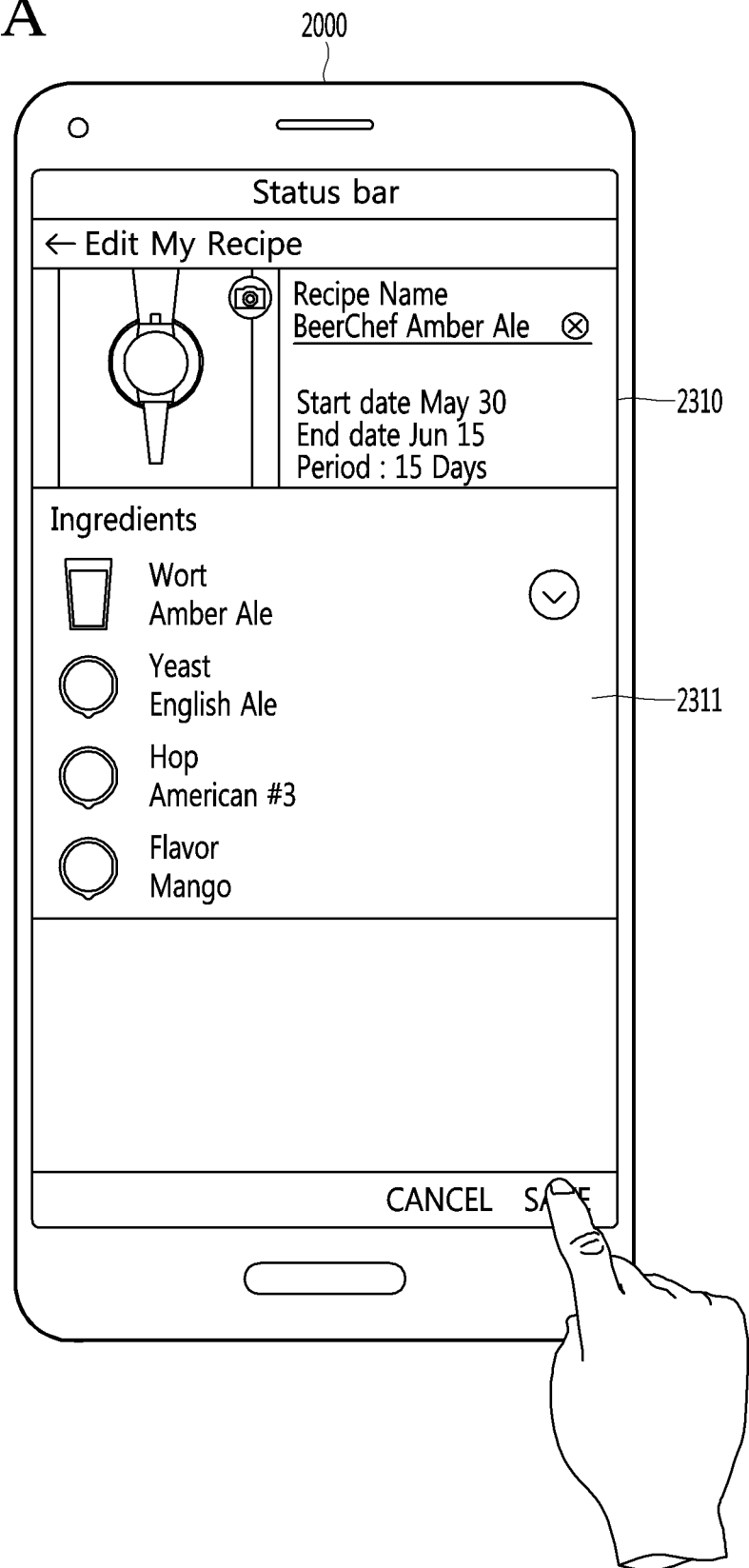

FIG. 10A illustrates an example of a user interface that is displayed by mobile terminal 2000 in response to a user selecting the "Amber Ale Package" option in the selection window 2320 of FIG. 9C. An example of selecting the "Mix & Match" option of FIG. 9C will be described later with reference to FIG. 11A.

Referring to FIG. 10A, in response to the user selecting a particular beverage recipe, such as the "Amber Ale Package" option, the controller 2080 may automatically display, on the recipe input screen, information regarding other ingredients of the beverage that is currently being made, based on the selected beverage recipe package. As an input result, for example, the controller 2080 may acquire recipe information of the beverage currently being made, and display a list of all ingredients of the beverage being made on the ingredient window 2311.

Figure 10B:
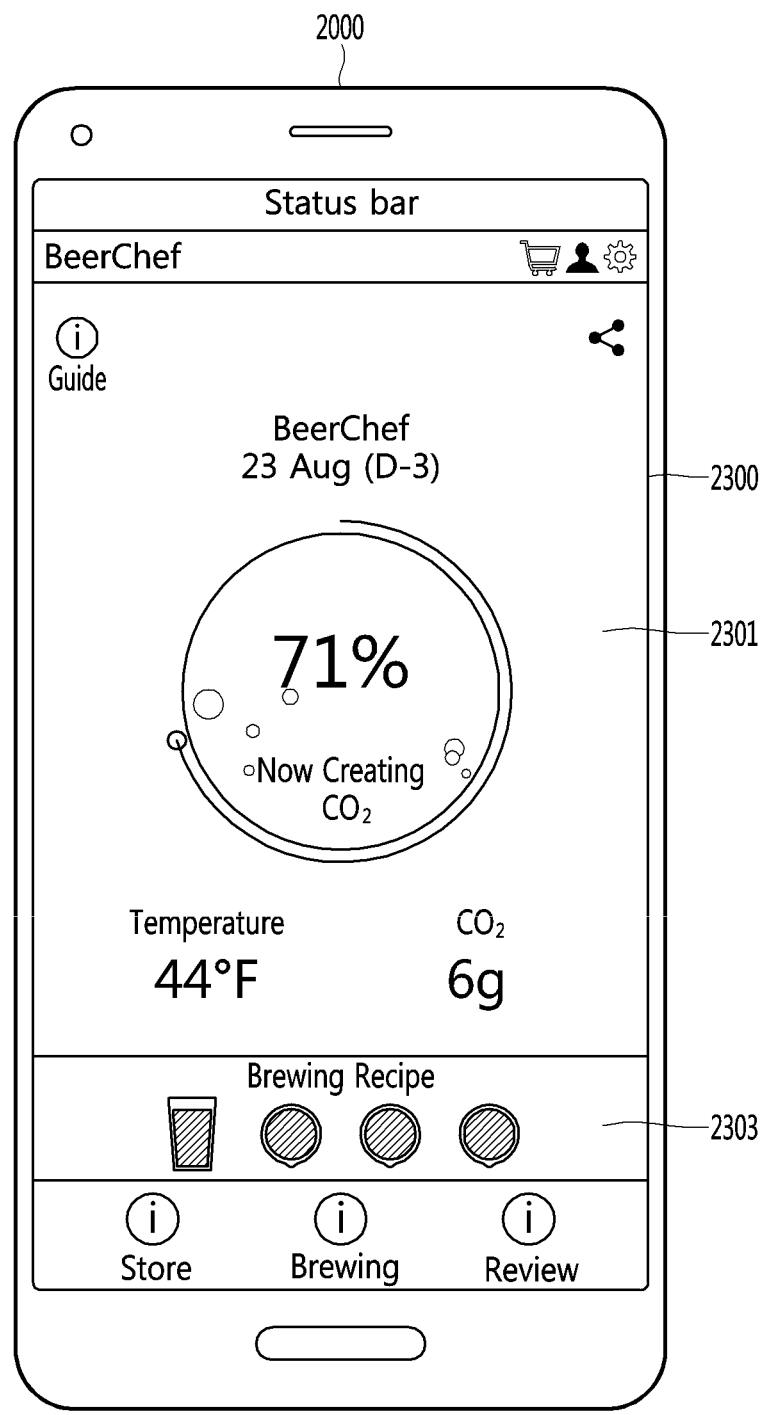

Referring to FIG. 10B, when the recipe information of the beverage currently being made in beverage-making apparatus 1000 has been registered, e.g., has been saved in a memory device and associated with the user, the controller 2080 may represent, through the recipe window 2303, that information of all ingredients have been registered. In the example shown in FIG. 10B, this is indicated by shading all four icons in the recipe window 2303.

Figure 11A:
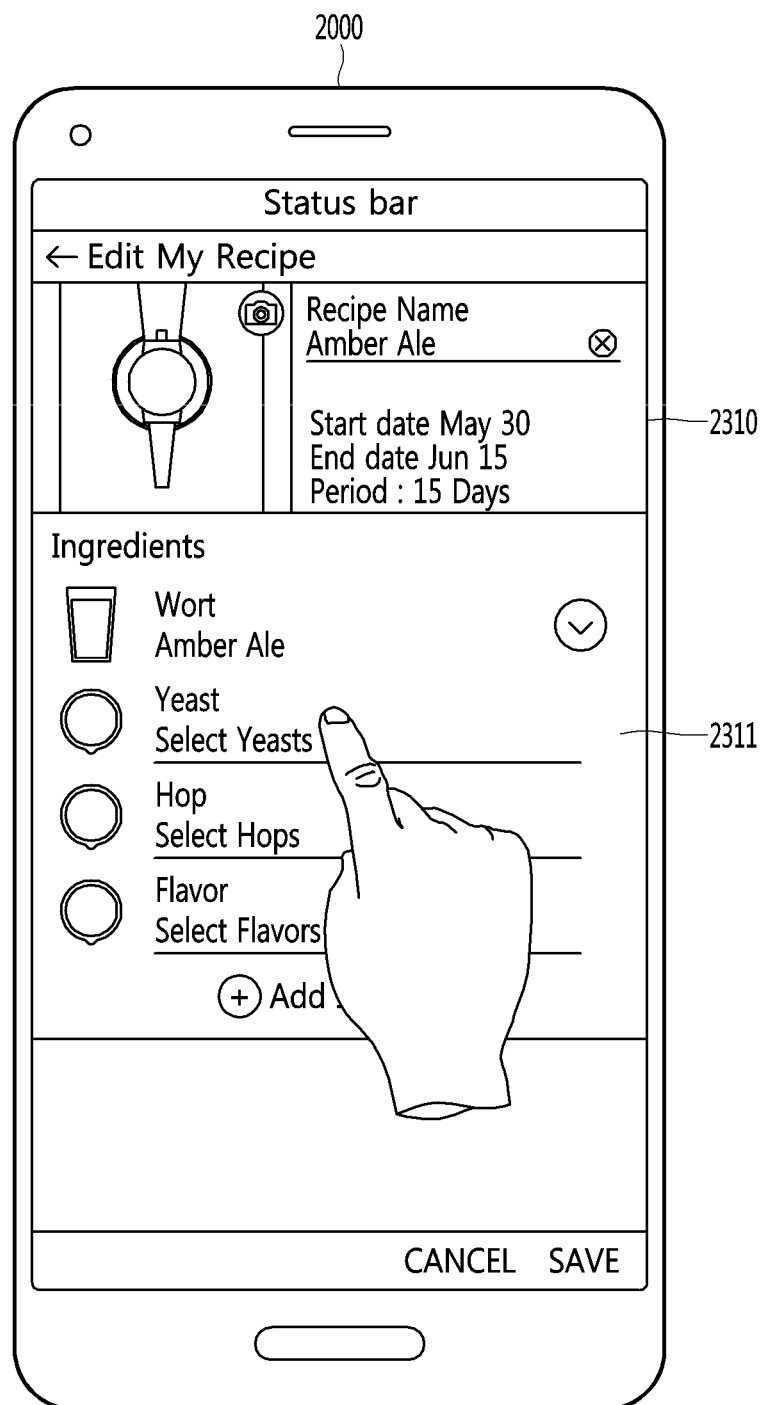
FIGS. 11A to 11C are diagrams illustrating further examples of registering a recipe of a beverage being produced by the beverage-making apparatus.
Figure 11B:
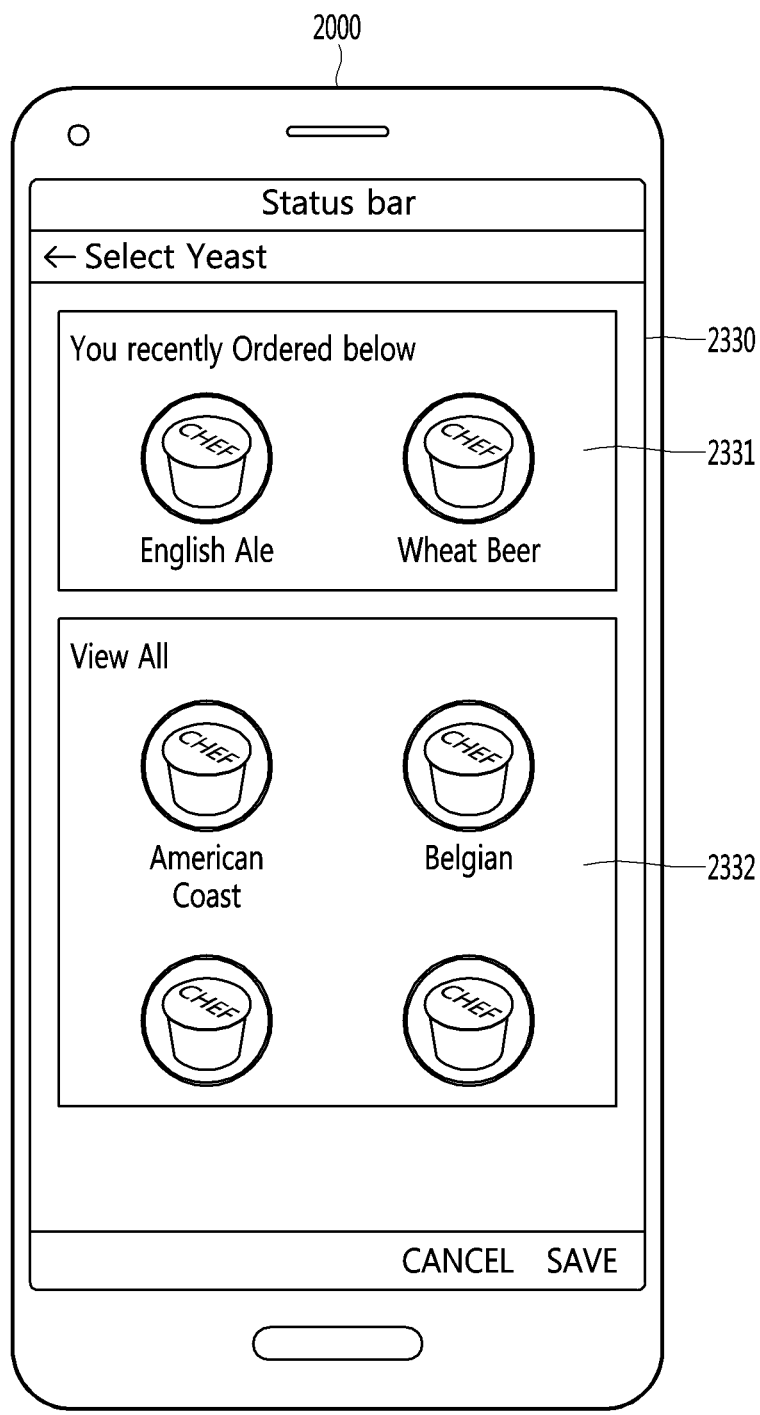
Figure 11C:
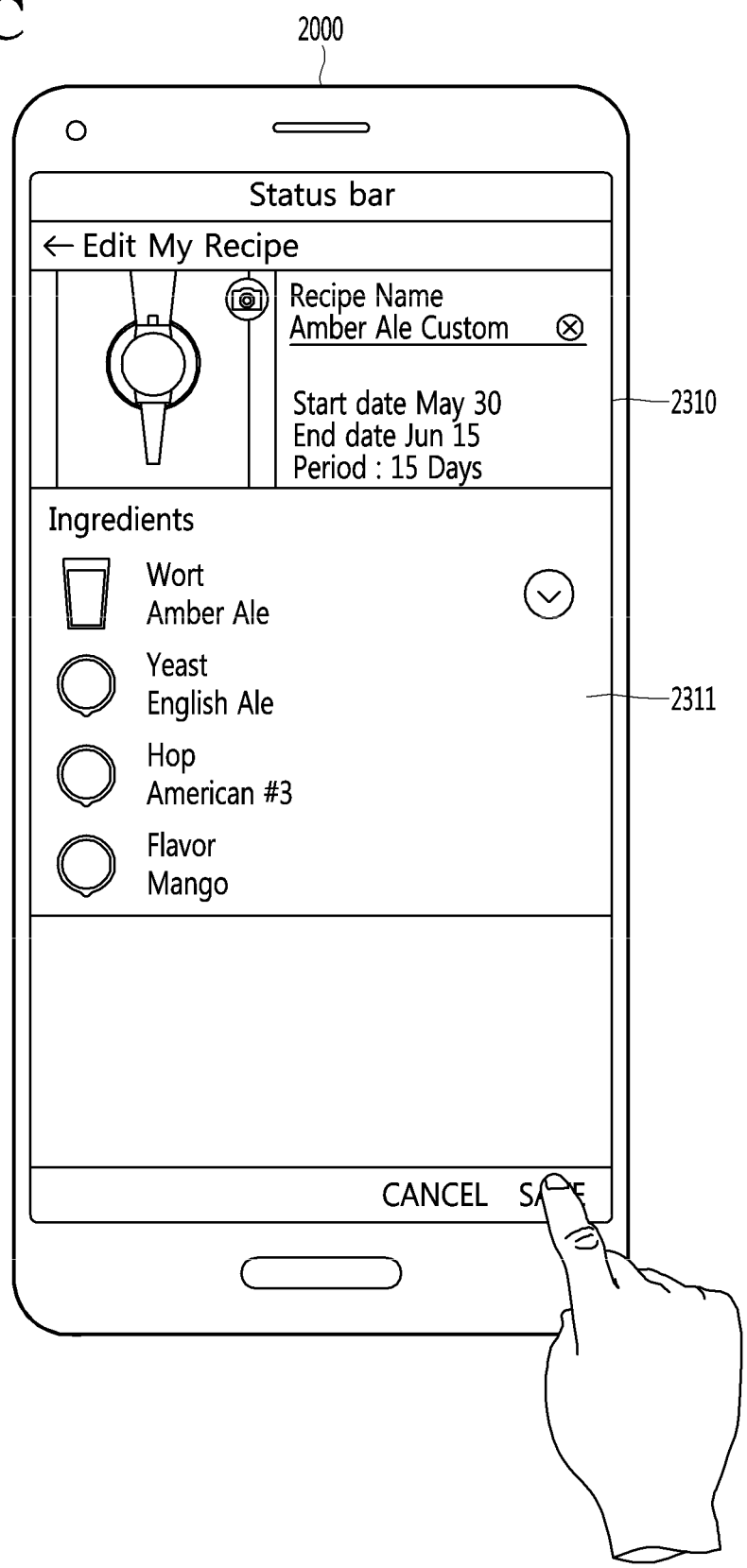

FIGS. 11A to 11C are diagrams illustrating further examples of registering a recipe of a beverage that is currently being produced by the beverage-making apparatus 1000.

FIG. 11A illustrates an example of a user interface that is displayed by mobile terminal 2000 in response to a user input selecting the "Mix & Match" option in selection window 2320 of FIG. 9C, or in response to a user input selecting the ingredient window 2311 of FIG. 9B.

In this example, the controller 2080 may receive an input for selecting the ingredient window 2311, or receive an input for selecting the item "Mix & Match" included in the selection window 2320. The controller 2080 may display the ingredient window 2311 of FIG. 9B in an extended form, based on the receive input. The extended ingredient window 2311 may display not only a list of ingredients that have been input, either manually by the user or automatically, e.g., by the terminal 2000 or via the beverage-making apparatus 1000, but also a list of ingredients that have not yet been input.

FIG. 11B illustrates an example of a user interface that is displayed by mobile terminal 2000 in response to a user selecting a particular ingredient in the extended ingredient window 2311 of FIG. 11A (e.g., selecting the "Yeast" option). The selected ingredient may be an ingredient that has not yet been input.

In particular, the controller 2080 may receive an input for selecting a first ingredient item (e.g., 'yeast') in the list of the non-input ingredients. As shown in FIG. 11B, the controller 2080 may display, e.g., through the display unit 2051, an ingredient selection screen 2330 for selecting the first ingredient, in response to the received input. As shown in the example FIG. 11B, the ingredient selection screen 2330 may display various options for the first ingredient, e.g., the yeast ingredient, that may be selected.

The ingredient selection screen 2330 may include a list of ingredients corresponding to the same category as the first ingredient. For example, the controller 2080 may display ingredients 2331 that the user has already procured, e.g., purchased, based on an ingredient procurement history, e.g., purchase history, of the user. The controller 2080 may also display a list of all ingredients 2332 that are available for the first ingredient, e.g., the yeast ingredient. Accordingly, the user can conveniently select ingredients.

FIG. 11C illustrates an example of a user interface that is displayed by mobile terminal 2000 after a user has selected various ingredients, e.g., after selecting a yeast, hop, and flavor using the interface of FIG. 11B, and returns to the interface of FIG. 11A.

The controller 2080 may register the various selected ingredients, e.g., by saving information associating the selected ingredients with the user. The controller 2080 may then display information regarding the selected ingredients in the ingredient window 2311, as shown in FIG. 11C. As information regarding all ingredients are acquired based on the received input through FIG. 11B, recipe information of the beverage that is currently being made in beverage-making apparatus 1000 can be registered.

Thus, according to the implementations that have been described in FIGS. 9A to 11C, the mobile terminal 2000 can enable a user to conveniently register a recipe for a beverage that is currently being made by the beverage-making apparatus 1000. As described above, based on one or more ingredients that have been input (e.g., directly input by the user, or automatically input through the beverage-making apparatus 1000), the mobile terminal 2000 can display a selection window for various recipe packages that enables the user to conveniently register other ingredients in the recipe. The user can therefore conveniently register ingredients of a beverage recipe that is currently being made by the beverage-making apparatus 1000 by selecting any one among recipe packages included in the displayed selection window.

The examples of FIGS. 9A to 11C have described scenarios of registering recipes for a beverage that is currently being made by the beverage-making apparatus 1000.

Hereinafter, examples of registering a recipe of a beverage that has been completely made by the beverage maker 1000 will be described with reference to FIGS. 12A to 13E.

FIGS. 12A to 13E are diagrams illustrating examples of registering a recipe of a beverage that was previously produced and is being stored by the beverage-making apparatus 1000.

Figure 12A:
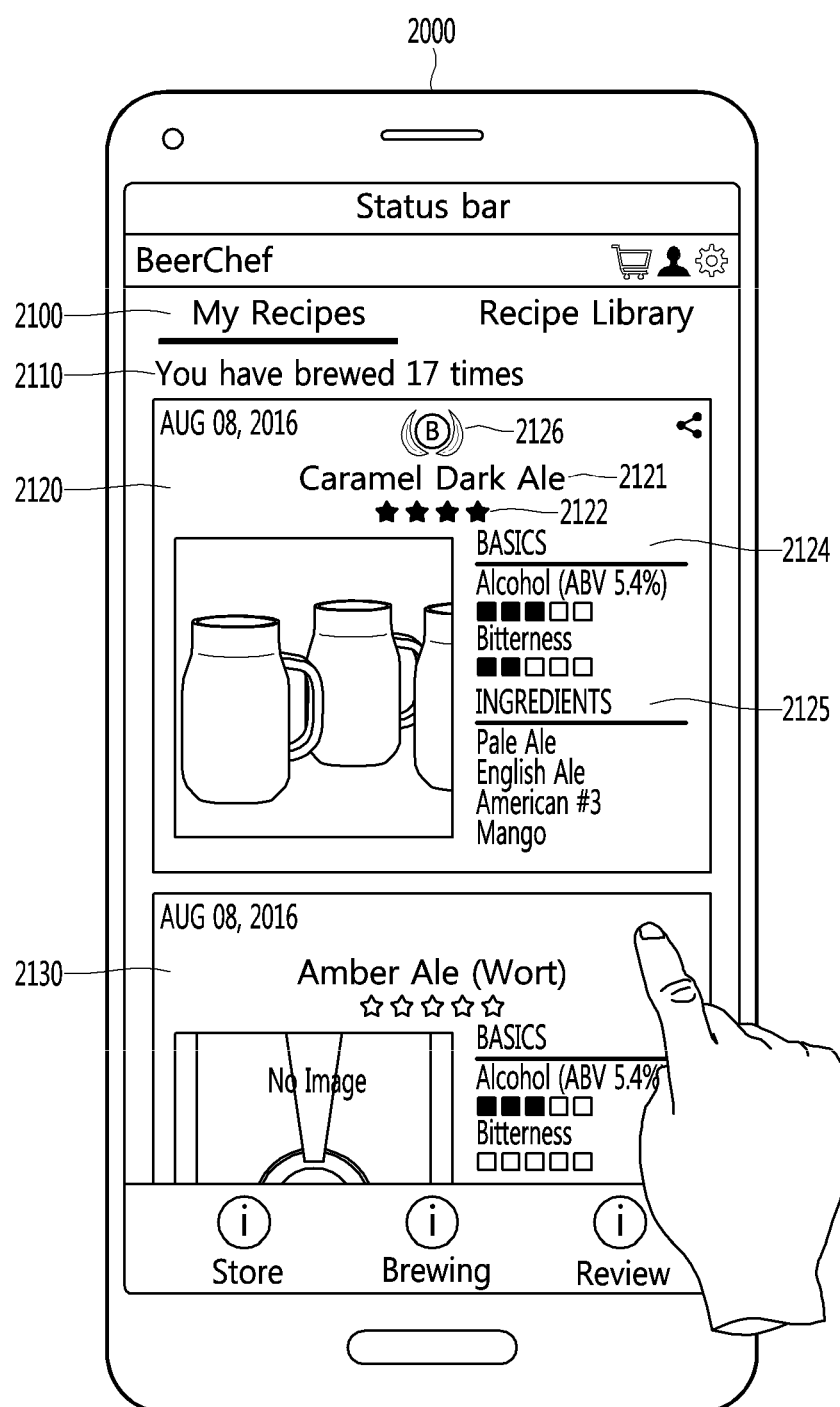
FIGS. 12A to 12C are diagrams illustrating examples of registering a recipe of a beverage produced by a beverage-making apparatus.

FIG. 12A illustrates an example of an interface including historical recipe and/or ingredient information for a particular user of a beverage-making apparatus. In some implementations, this interface may be analogous to the interface that was shown in FIG. 7A (which was for the scenario in which a beverage was currently being made by apparatus 1000).

As shown in the examine of FIG. 12A, among the lists 2120 and 2130 of the beverage included in the review screen 2100 (as described in relation to FIG. 7A), a recipe has been registered with respect to beverage corresponding to the first list 2120, but a recipe has not been registered with respect to beverage corresponding to the second list 2130. Instead, the second list 2130 shows an ingredient (e.g., the wort ingredient "Amber Ale").

Figure 12B:
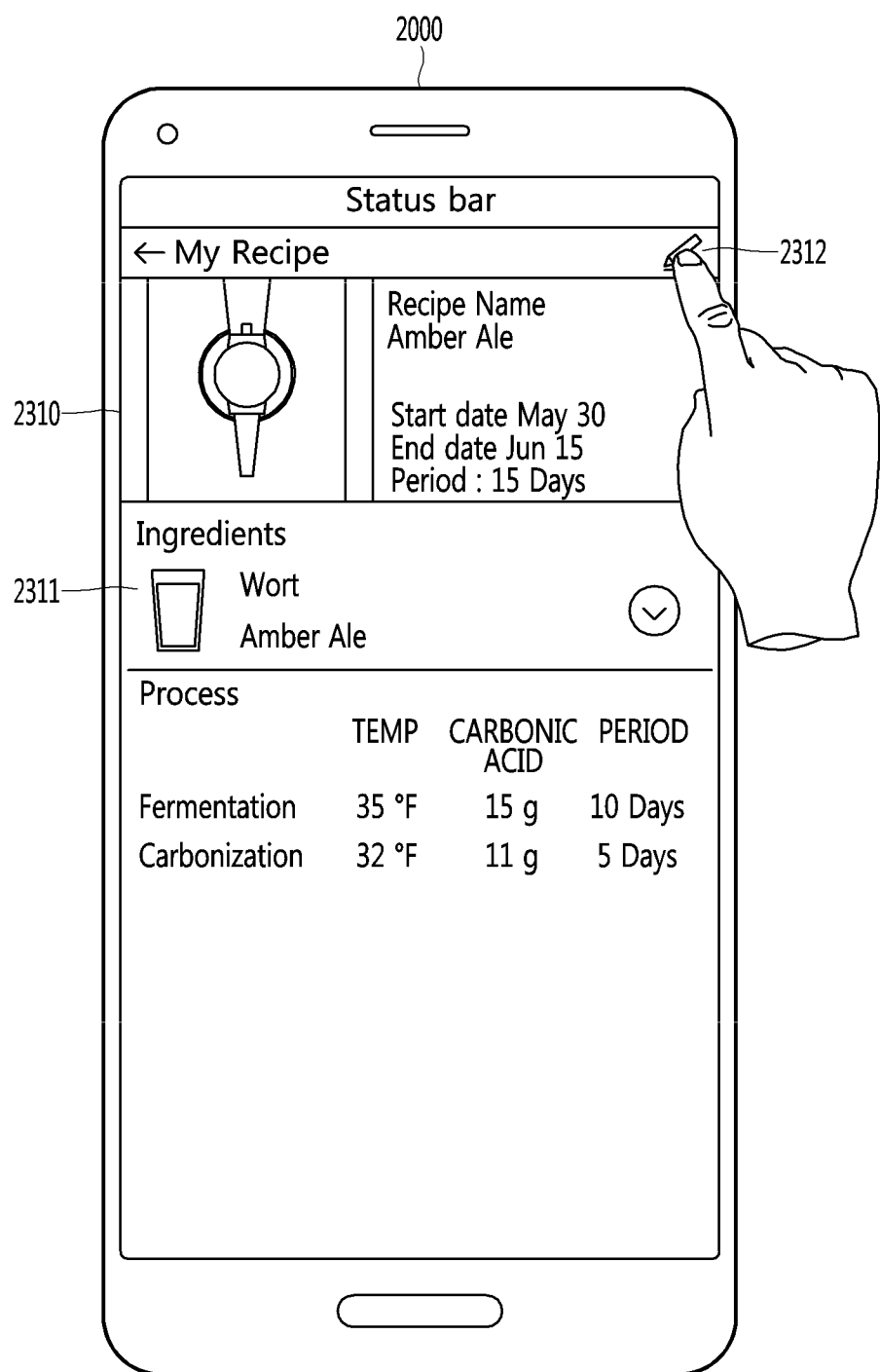

FIG. 12B illustrates an example of a user interface that is displayed by mobile terminal 2000 in response to a user selecting the second list 2130 of FIG. 12A. In particular, the mobile terminal 2000 may display a recipe input screen 2310 that is analogous to the recipe input screen of FIG. 9B (which was for the scenario in which a beverage was currently being made by apparatus 1000).

Referring to FIG. 12B, the controller 2080 may receive an input for selecting the second list 2130 of the review screen 2100 in FIG. 12A, and may display, e.g., through the display unit 2051, a recipe input screen 2310 for inputting a recipe of beverage corresponding to the second list 2130, based on the received input. The controller 2080 may receive an input for selecting an editing icon 2312 included in the recipe input screen 2310, and provide a recipe inputting function in response to the received input.

Upon receiving the user's selection of editing icon 2312 in FIG. 12B, the controller 2080 may display an interface for inputting recipe information, which will be described later in relation to FIG. 13A.

Figure 12C:
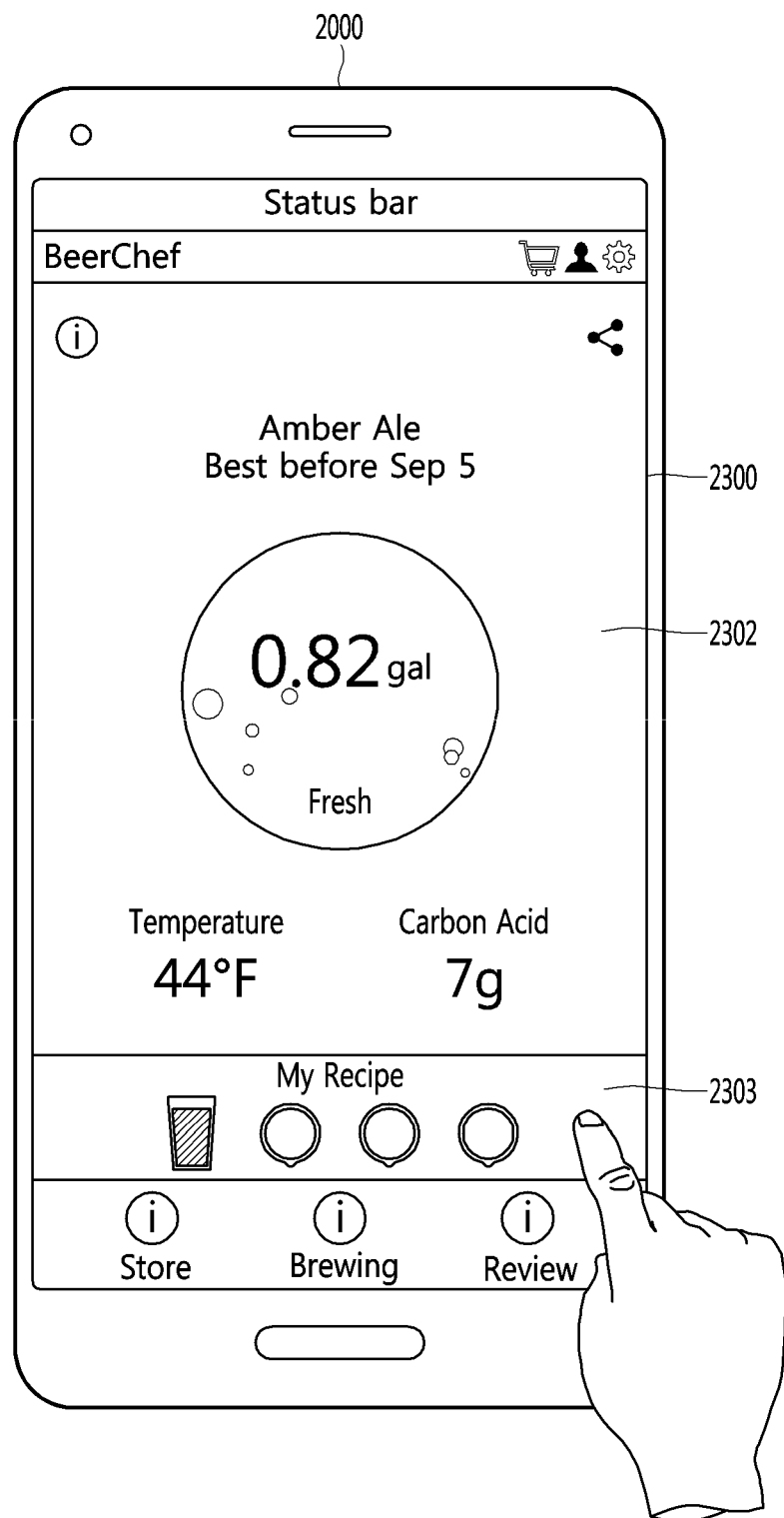

FIG. 12C illustrates an example of a user interface that is displayed by mobile terminal 2000 indicating a state of a beverage that was previously made and is currently being stored in the beverage-making apparatus 1000. This interface may be analogous to the interface of FIG. 9A (which indicated a state of a beverage that was currently being made by apparatus 1000).

Referring to FIG. 12C, the controller 2080 may display, e.g., through the display unit 2051, a beverage storage screen 2300 including storage information of the beverage that was previously made and is being stored in the beverage maker 1000. For example, the beverage storage screen 2300 may include a storage state window 2302 indicating various information of the beverage that is being stored, such as a remaining amount of beverage made and being stored, a drinkable term of the beverage, a freshness degree of the beverage, a temperature of the beverage, a carbonic acid amount of the beverage, etc. In addition, the beverage storage screen 2300 may include information regarding some or all of ingredients of the beverage that is being stored.

The beverage storage screen 2300 may include a recipe window 2303 indicating recipe information of the beverage that was previously made by the beverage-making apparatus 1000. In some implementations, the recipe window 2303 shown in FIG. 12C may be analogous to the recipe window 2303 shown in FIG. 9A (which was described for the scenario of a beverage currently being made by the apparatus 1000).

The controller 2080 may receive an input for selecting the recipe window 2303, e.g., through the user input unit 2023. In order to register a recipe of the beverage that was made, the controller 2080 may display the recipe input screen 2310 that was shown in FIG. 12B, in response to the received input.

Figure 13A:
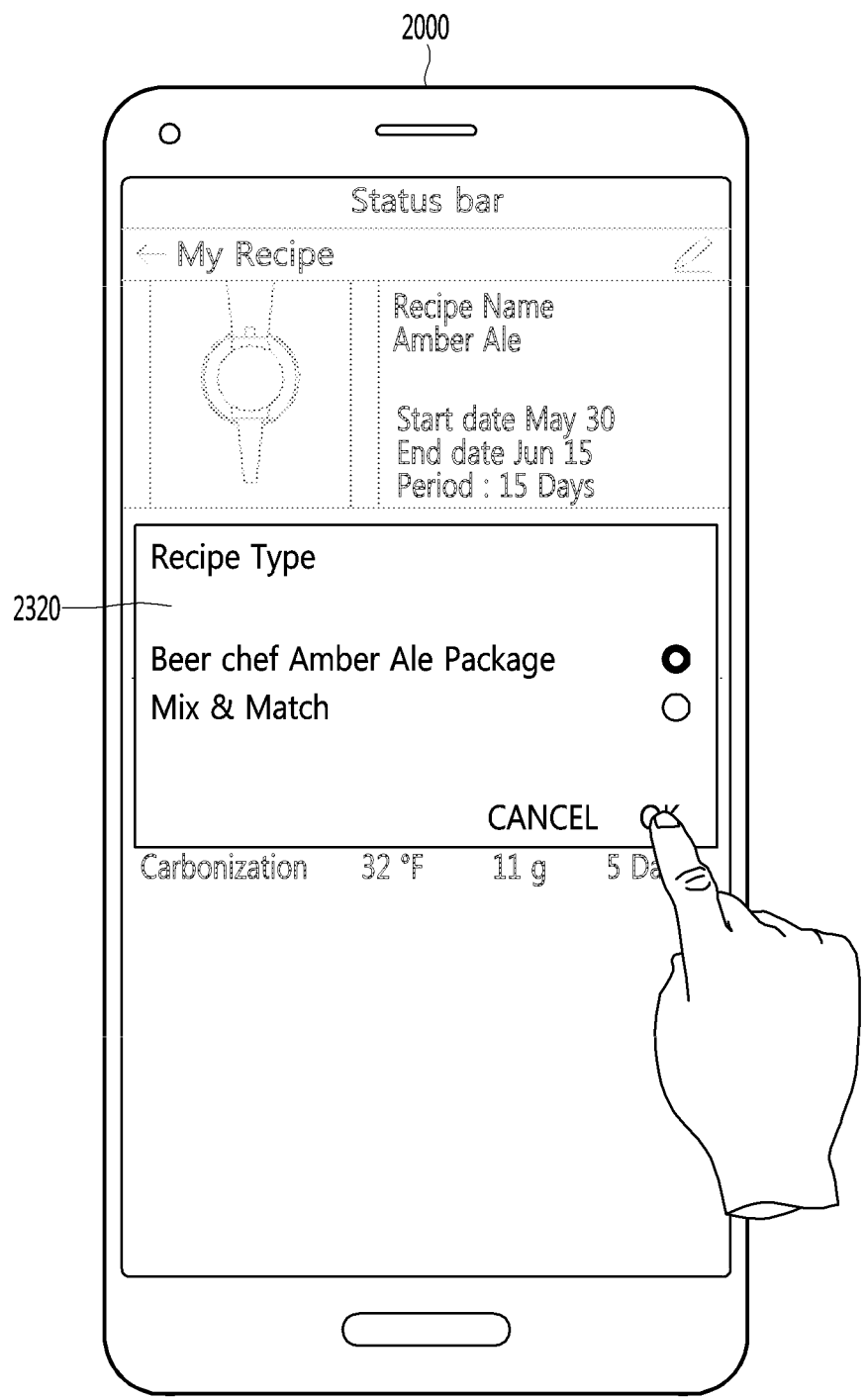
FIGS. 13A to 13E are diagrams illustrating examples of registering a recipe of a beverage produced by a beverage-making apparatus.

FIG. 13A illustrates an example of a user interface that is displayed by mobile terminal 2000 in response to a user selecting the editing icon 2312 of FIG. 12B. This interface may be analogous to the interface of FIG. 9B (which was described for the scenario of a beverage that is currently being made by the apparatus 1000).

The controller 2080 may receive an input for selecting the editing icon 2312, and provide a recipe inputting function in response to the received input. In particular, as shown in FIG. 13A, the controller 2080 may display a selection window 2320 that displays at least one beverage recipe package including a currently input ingredient so as to allow the user to conveniently input the other ingredients based on the currently input ingredient. For example, when the wort of beverage that is currently being stored is 'Amber Ale,' the controller 2080 may display, through the selection window 2320, at least one recipe package including 'Amber Ale' among previously registered beverage recipe packages. In addition, the selection window 2320 may include an item "Mix & Match" for allowing the user to directly select each of the ingredients.

When any one recipe package included in the selection window 2320, the controller 2080 may automatically acquire information on the ingredients of the brewed beverage, based on the selected recipe package. In some implementations, the controller 2080 may acquire information on the ingredients of the beverage that is currently being stored, e.g., using techniques analogous to those described with relation to FIGS. 11A and 11B.

Figure 13B:
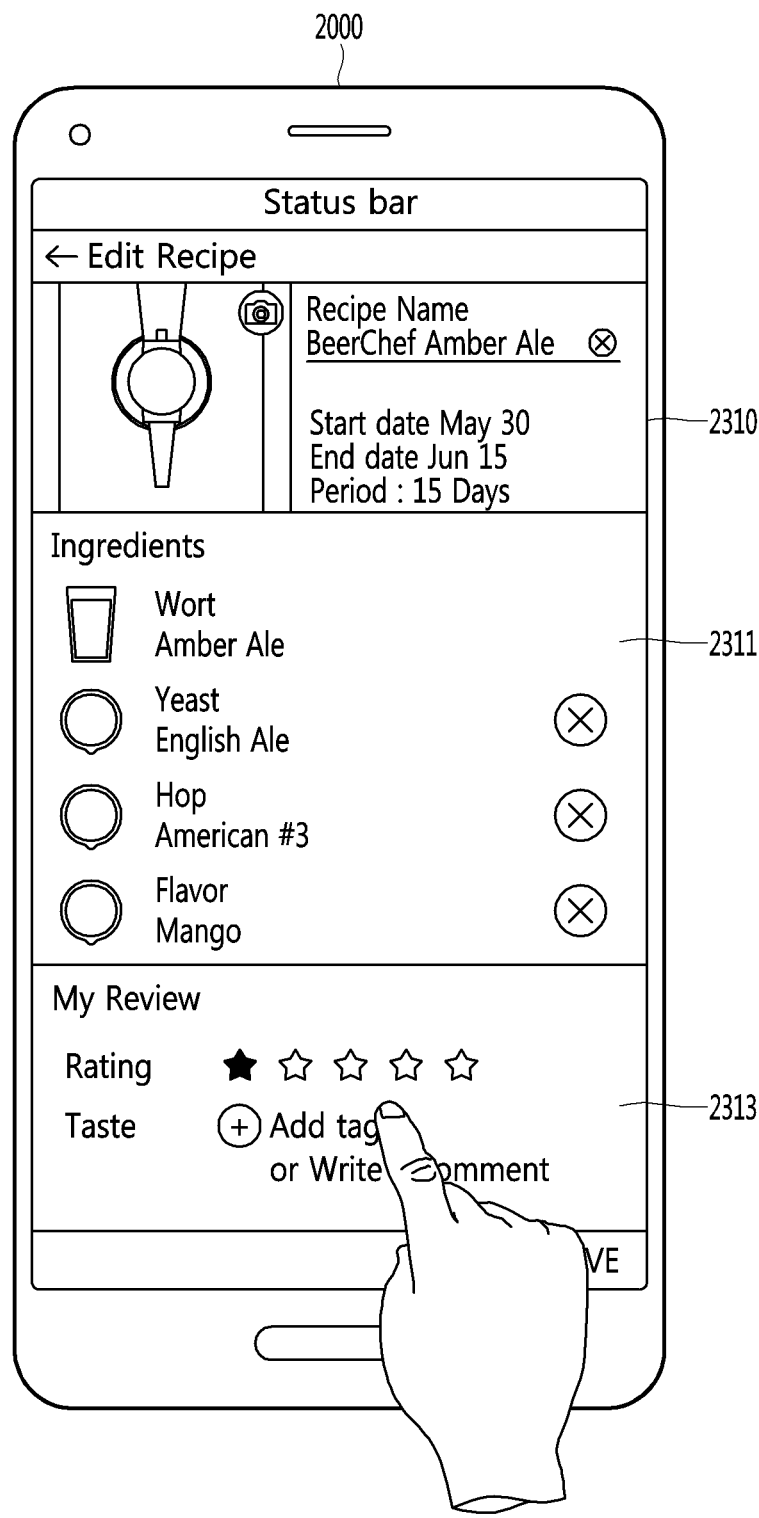

FIG. 13B illustrates an example of a user interface that is displayed by mobile terminal 2000 in response to a user selecting the "Amber Ale Package" option in the selection window 2320 of FIG. 13A.

Referring to FIG. 13B, the controller 2080 may display, e.g., through the display unit 2051, a recipe input screen 2310 including an ingredient window 2311 that displays the acquired information of the ingredients. The controller 2080 may also display a review input window 2313 for inputting a review of the beverage that was previously made. The user may input an evaluation of the beverage, a taste of the beverage, etc., using the review input window 2313.

Figure 13C:
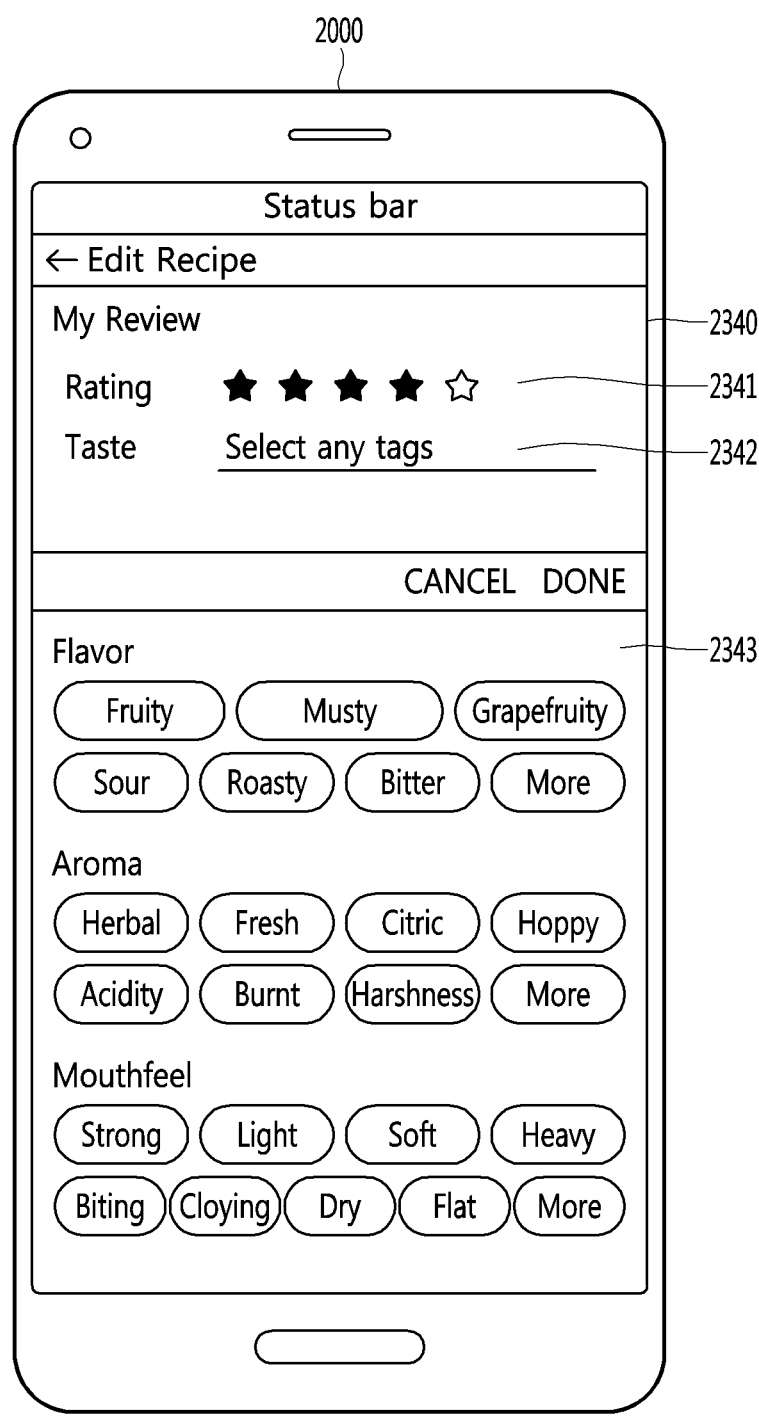

FIG. 13C illustrates an example of a user interface that is displayed by mobile terminal 2000 in response to a user selecting the review input window 2313 of FIG. 13B.

Referring to FIG. 13C, the controller 2080 may display, e.g., through the display unit 2051, a review input screen 2340 for inputting a review of the beverage. The controller 2080 may receive from the user, for example, grade information 2341 on the beverage that was made, or taste information 2342 on the beverage that was made, using the review input screen 2340.

Particularly, in some implementations, the controller 2080 may display a plurality of tags 2343 related to taste of beverage so as to allow the user to conveniently input the taste information 2342 regarding the beverage that was previously made. For example, the plurality of tags 2343 may include tags related to flavor, tags related to aroma, and tags related to mouthfeel. In some implementations, the tags may be based on a standardized format, e.g., based on the Beer Judge Certification Program (BJCP) style guide for beers. In addition, each tag may be generated based on terms (kinds of flavor, aroma, and mouthfeel), e.g., as used in the BJCP style guide, or be generated based on terms commonly used when users evaluate the beverage.

Figure 13D:
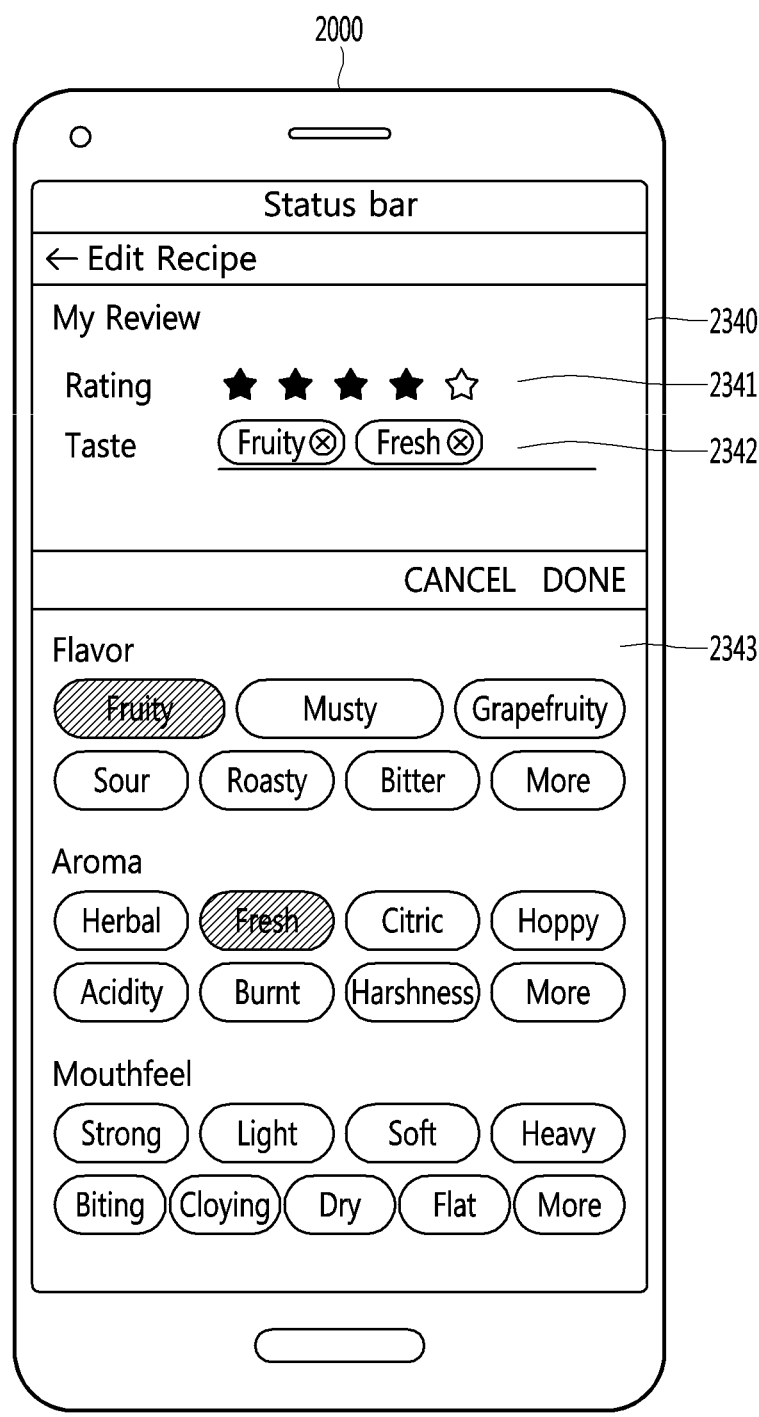

FIG. 13D illustrates an example of a user interface that is displayed by mobile terminal 2000 after a user has selected various inputs in the review input screen 2340 of FIG. 13C.

Referring to FIG. 13D, the controller 2080 may receive an input for selecting at least some of the plurality of tags 2343, and select the at least some tags, based on the received input. For example, when tags "Fruity" and "Fresh" are selected, the controller 2080 may input the selected tags as the taste information 2342.

Figure 13E:
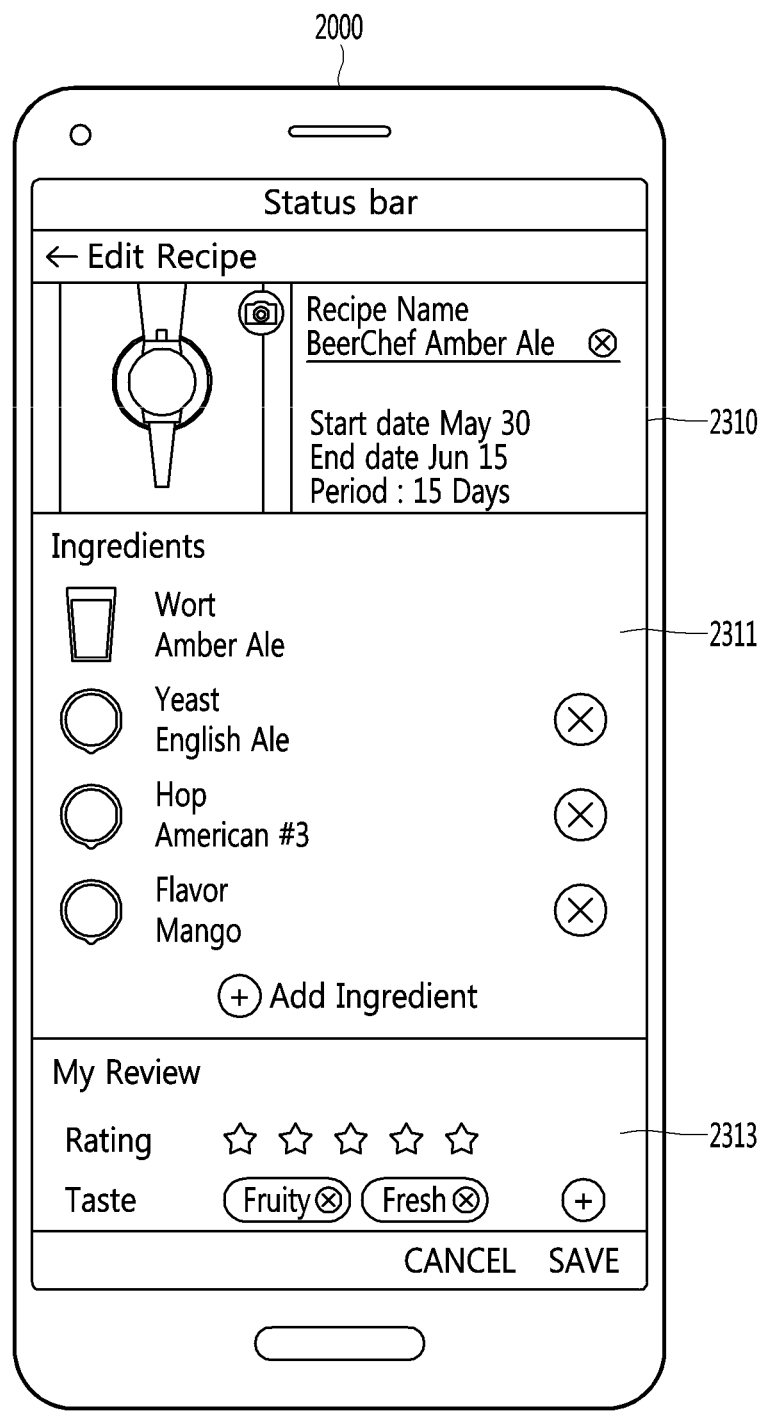

FIG. 13E illustrates an example of a user interface that is displayed by mobile terminal 2000 after the inputting of the review of the beverage through the review input screen 2340 is completed. In this example, the controller 2080 displays review information (e.g., grade information and taste information) input through the review input window 2313 of the recipe input screen 2310.

As such, according to implementations described above with relation to FIGS. 12A to 13E, the mobile terminal 2000 may enable a user to conveniently register recipes for beverages that were previously made by the beverage maker 1000. In particular, the user can conveniently register not only ingredient information constituting the recipe of the beverage but also review information on the beverage. In some implementations, taste information included in the registered review information regarding the beverage can be used as a search means in a recipe searching operation of the mobile terminal 2000, which will be described later.

FIGS. 14A to 14D are diagrams illustrating examples of registering a recipe of a beverage to be produced, prior to the beverage being produced using the beverage-making apparatus 1000.

Figure 14A:
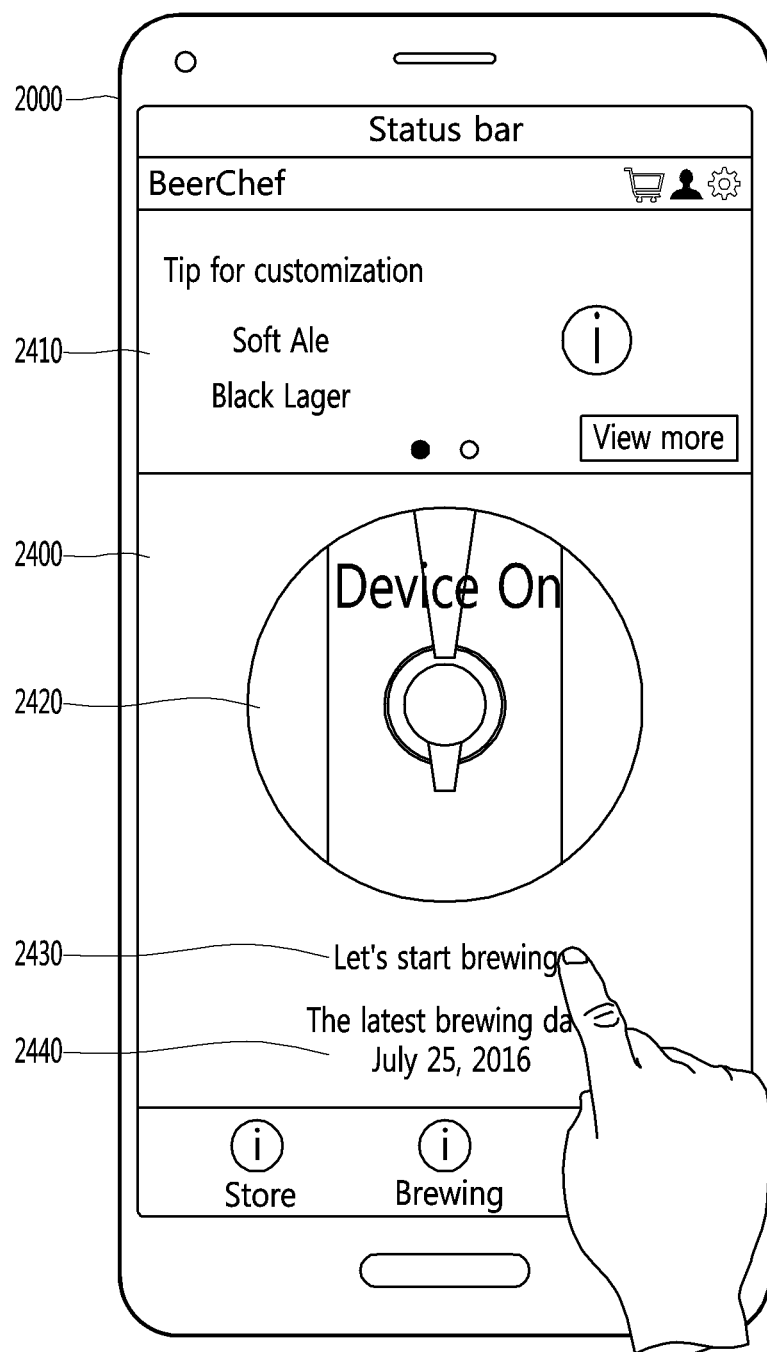
FIGS. 14A to 14D are diagrams illustrating examples of registering a recipe of a beverage to be produced, prior to the beverage being produced using a beverage-making apparatus.

Referring to FIG. 14A, the controller 2080 may display an information screen 2400 for displaying information related to a state of the beverage maker 1000 before a beverage is made using the beverage maker 1000.

For example, the information screen 2400 may include a beverage-making guide window 2410 for providing guides or tips for making the beverage, a state window 2420 representing a state of the beverage maker 1000, a start menu 2430 for starting the beverage making processor, and beverage-making history information 2440.

For example, when the user is ready to make a beverage using the beverage maker 1000, the user may perform an input operation of selecting the start menu 2430. The controller 2080 may receive an input for selecting the start menu 2430 through the user input unit 2023.

Figure 14B:
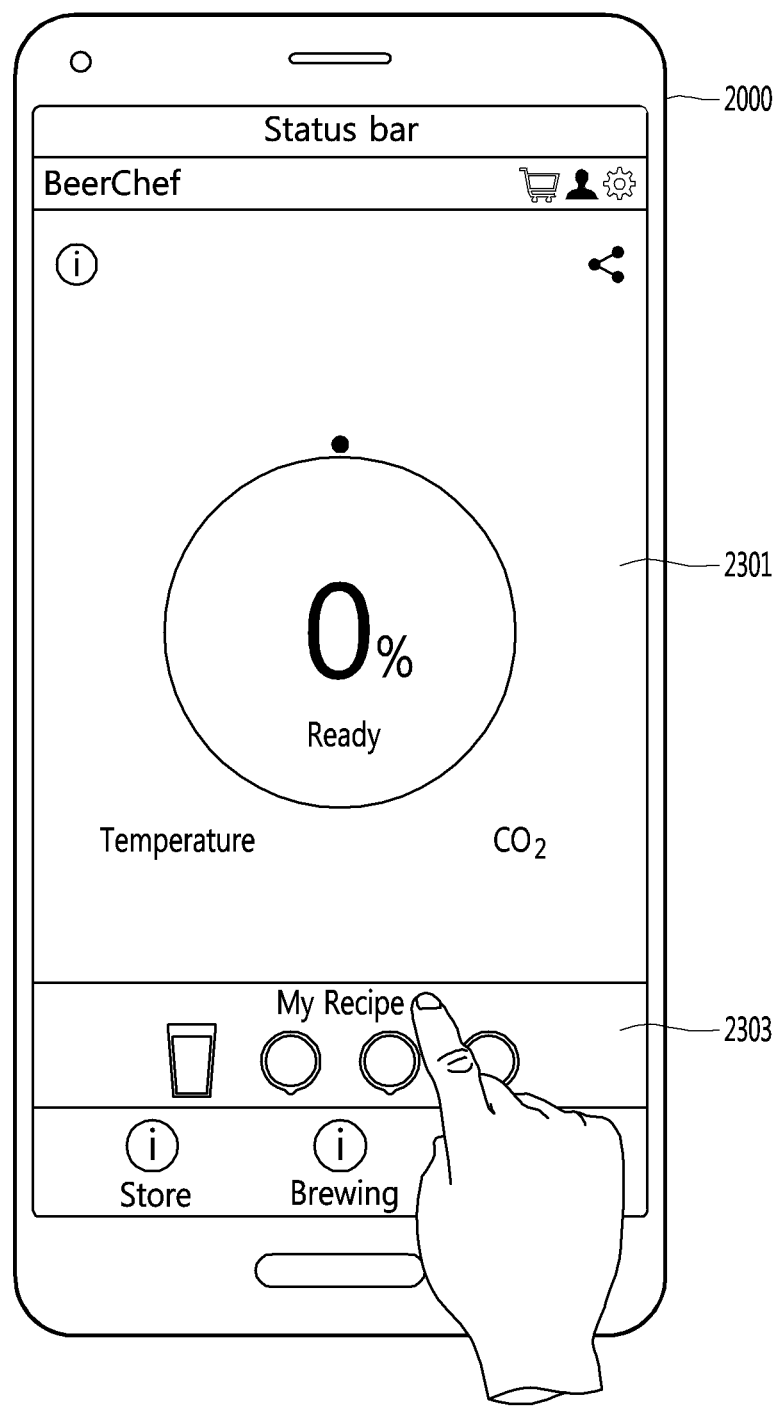

Referring to FIG. 14B, the controller 2080 may display a state screen 2300 through the display unit 2051, in response to the input for selecting the start menu 2430. If the beverage-making process has not been started yet, then information regarding the beverage to be made may not be displayed on a state window 2301 of the state screen 2300. In addition, ingredient icons of a recipe window 2303 may be displayed in an empty form.

For example, when the user is ready to register recipe information on the beverage to be made, the user may perform an input operation of selecting the recipe window 2303 displayed on the state screen 2300. The controller 2080 may receive an input for selecting the recipe window 2303 through the user input unit 2023.

Figure 14C:
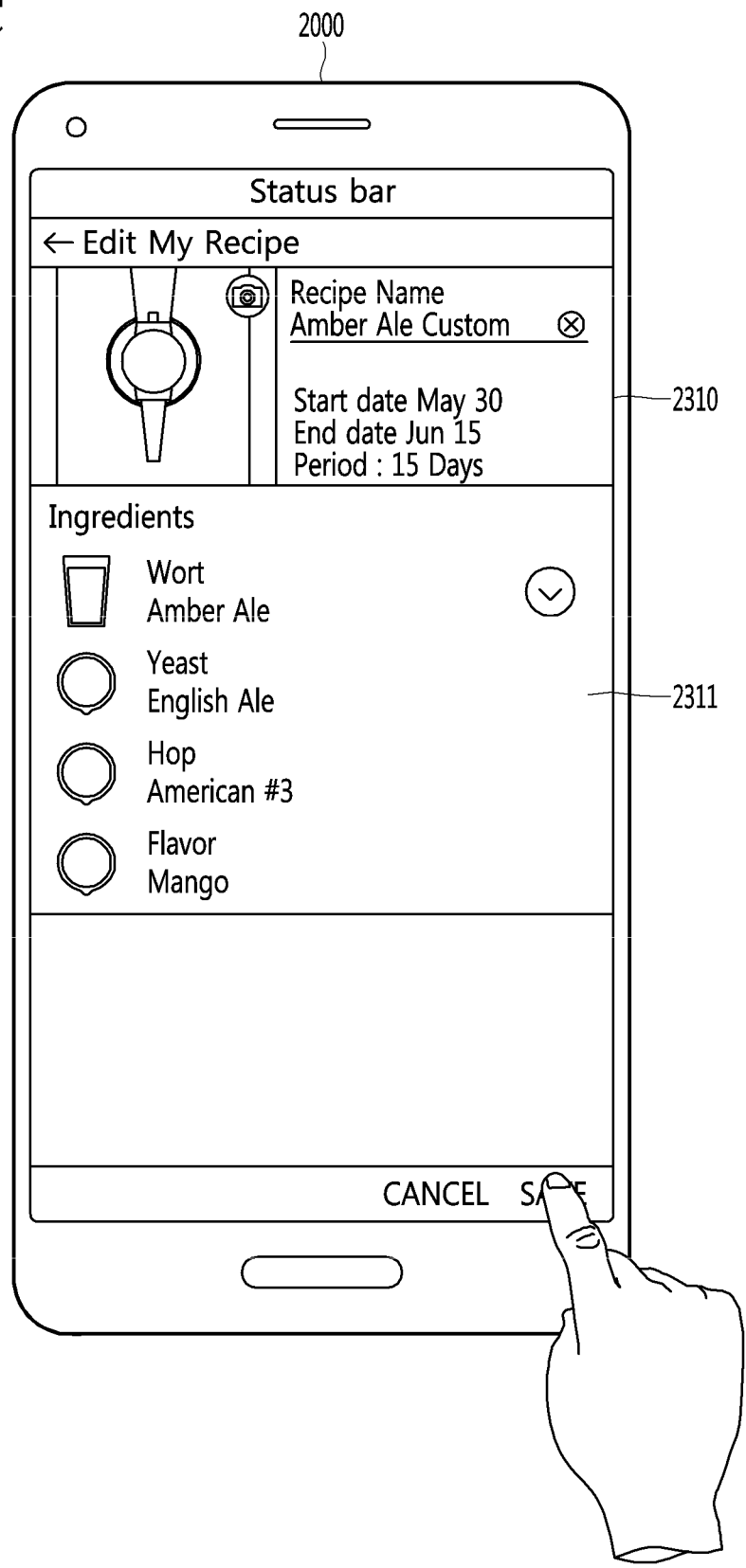

Referring to FIG. 14C, the controller 2080 may display a recipe input screen 2310 through the display unit 2051 in response to the input for selecting the recipe window 2303. The recipe input screen 2310 has been described in FIG. 9B.

Figure 14D:
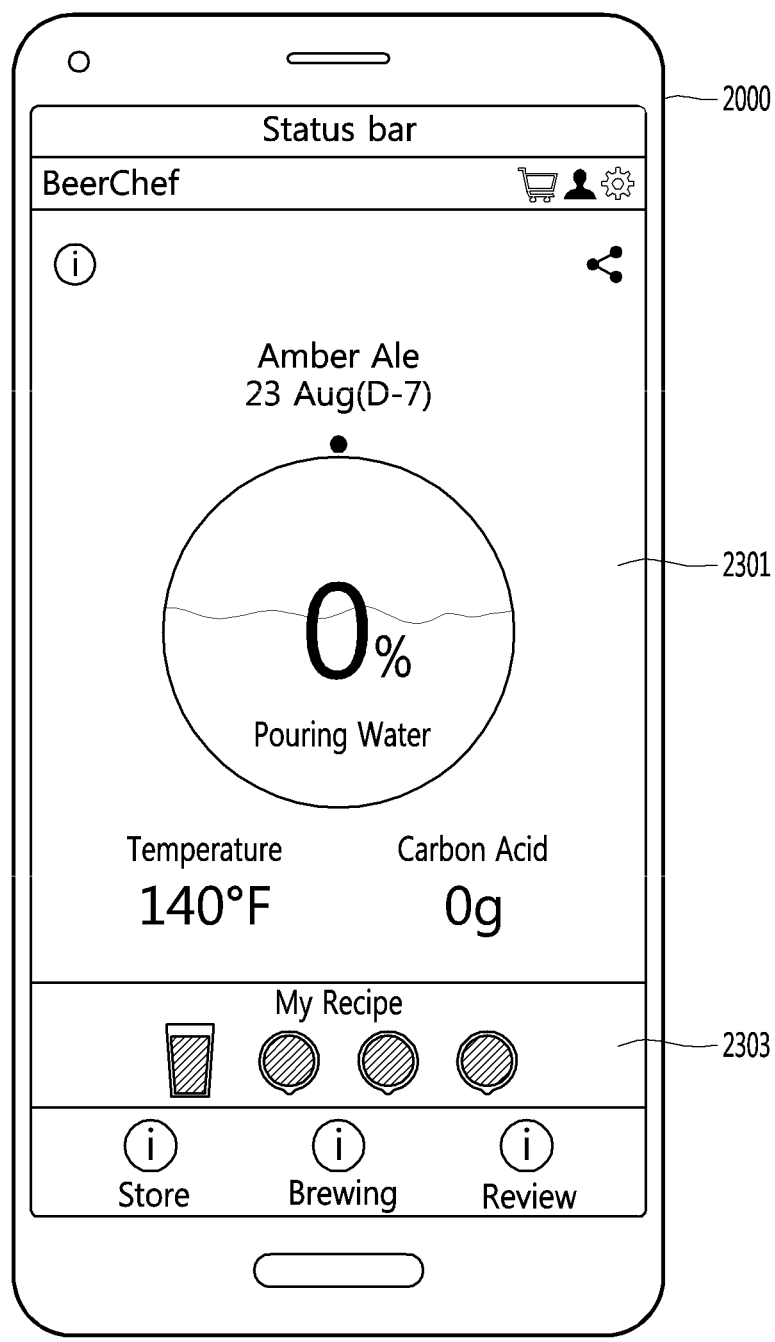

Referring to FIG. 14D, when information regarding ingredients of the beverage to be made is input through the recipe input screen 2310, the controller 2080 may indicate that the information regarding the ingredients of the beverage to be made has been registered through the recipe window 2303 displayed on the state screen 2300. For example, as shown in FIG. 14D, the controller 2080 may indicate that the information regarding the ingredients of the beverage to be made has been registered by distinguishing colors of the ingredient icons included in the recipe window 2303 from those of FIG. 14B.

As such, according to the implementations of FIGS. 14A to 14D, a user can easily register a recipe of a beverage to be made, not only during the beverage-making process or after the beverage-making process, but also before the beverage-making process.

Figure 15:
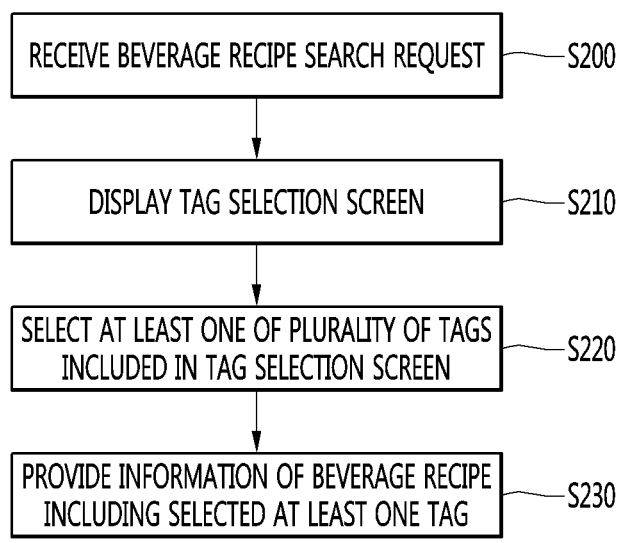
FIG. 15 is a flowchart illustrating an example of searching recipes of a beverage, performed through the mobile terminal.

FIG. 15 is a flowchart illustrating an example of searching recipes of a beverage, performed through the mobile terminal 2000.

Referring to FIG. 15, the mobile terminal 2000 may receive a beverage recipe search request (S200). The beverage recipe search request may include a taste-based search request and an ingredient-based search request.

The mobile terminal 2000 may display a tag selection screen through the display unit 2051, in response to the received beverage recipe search request (S210).

For example, if the beverage recipe search request is the taste-based search request, then the tag selection screen may include a plurality of tags related to taste information of the beverage. As another example, if the beverage recipe search request is the ingredient-based search request, then the tag selection screen may include a plurality of tags respectively representing ingredient names of the beverage.

The mobile terminal 2000 may select at least one of the plurality of tags included in the tag selection screen (S220). For example, the controller 2080 may receive, e.g., through the user input unit 2023, an input for selecting at least one of the plurality of tags, and select the at least one tag based on the received input.

The mobile terminal 2000 may provide, as a search result, information of a beverage recipe including the selected at least one tag.

The controller 2080 may search the information of the beverage recipe including the selected at least one tag from the server connected to the mobile terminal 2000. The controller 2080 may provide, as a search result, a beverage recipe entirely including the selected at least one tag or a beverage recipe partially including the selected at least one tag.

The implementation shown in FIG. 15 will be described in more detail with reference to FIGS. 16A to 17D.

FIGS. 16A to 16F are diagrams illustrating examples of searching recipes of a beverage, performed through the mobile terminal.

Figure 16A:
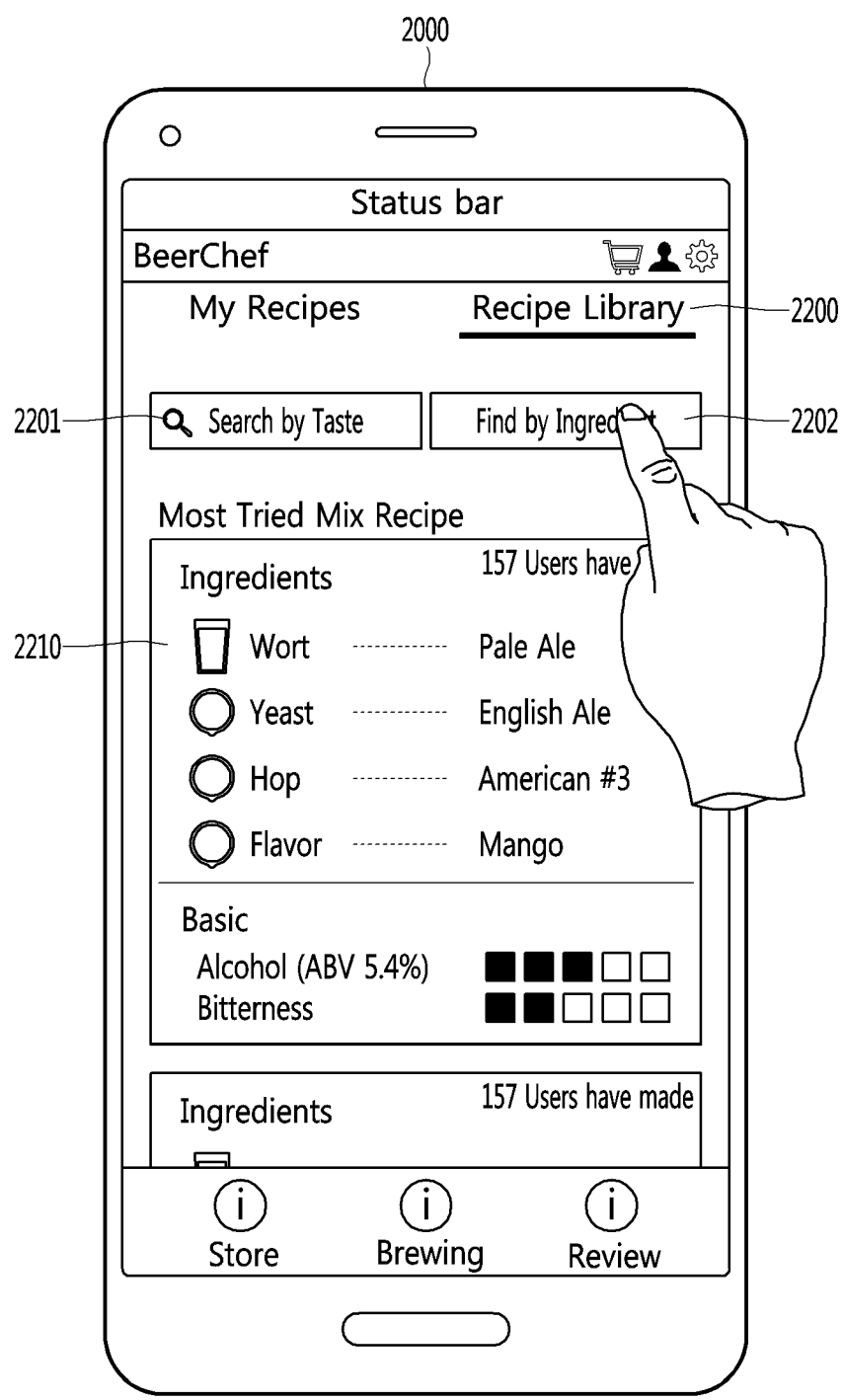
FIGS. 16A to 16F are diagrams illustrating examples of searching recipes of a beverage, performed through the mobile terminal.

Referring to FIG. 16A, the controller 2080 may display a recipe search screen 2200 as described in FIG. 7B, e.g., through the display unit 2051. The controller 2080 may receive an input for selecting an ingredient-based search menu 2202 from a taste-based search menu 2201 and the ingredient-based search menu 2202, which are included in the recipe search screen 2200.

Figure 16B:
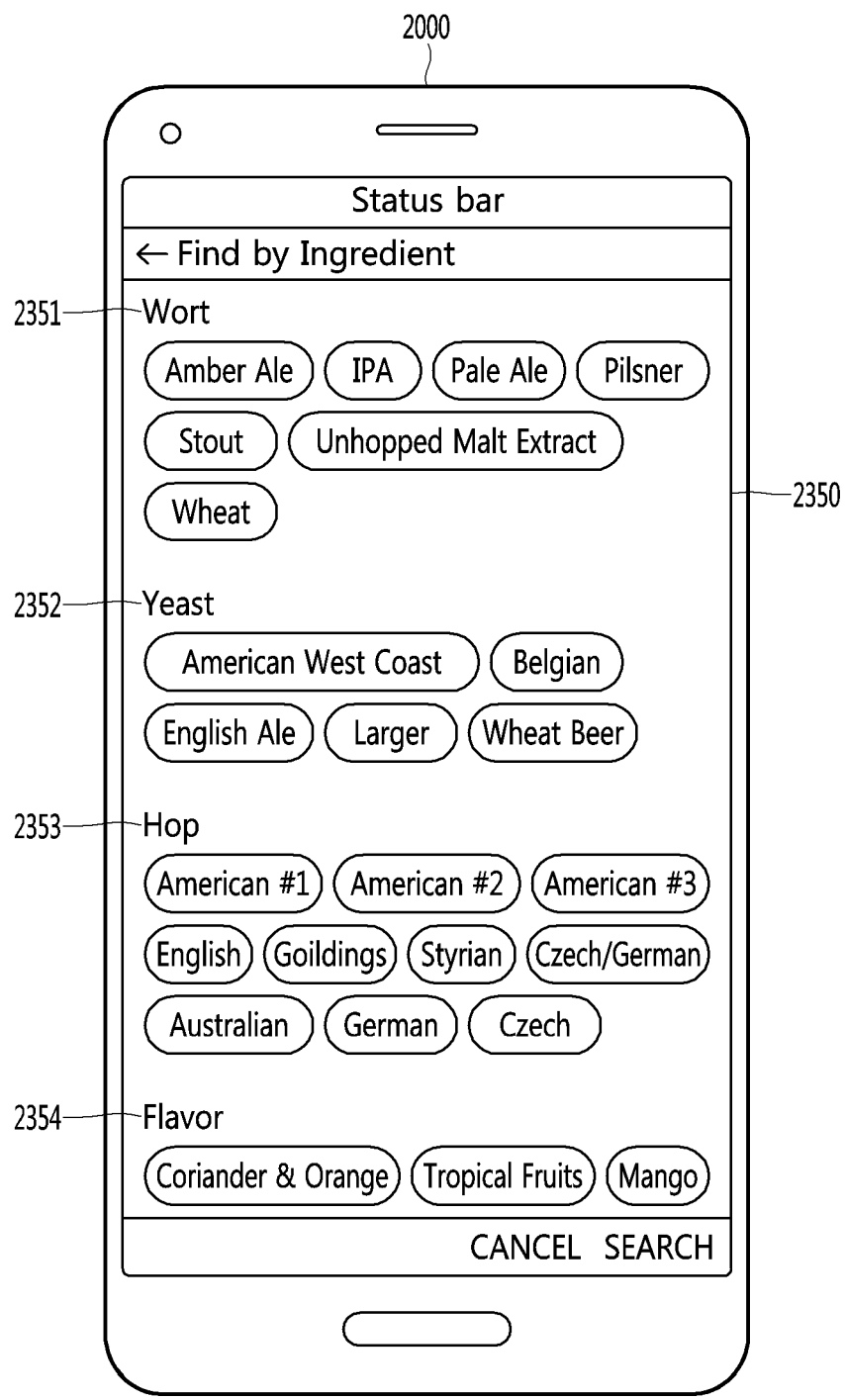

Referring to FIG. 16B, the controller 2080 may display, e.g., through the display unit 2051, a tag selection screen 2350 including a plurality of tags representing ingredient names of beverage, in response to the input for selecting the ingredient-based search menu 2202.

For example, if the beverage-making apparatus 1000 is a beer-making apparatus, then ingredients of the beer may be divided into categories of wort, yeast, hops, and flavor additives. In such scenarios, the tag selection screen 2350 may display the plurality of tags to be divided according to the categories. As shown in the example of FIG. 16B, the controller 2080 may display the tag selection screen 2350 divided into tags having an ingredient name corresponding to a wort category 2351, tags having an ingredient name corresponding to a yeast category 2352, tags having an ingredient name corresponding to a hop category 2353, and tags having an ingredient name corresponding to a flavor additive category 2354.

Figure 16C:
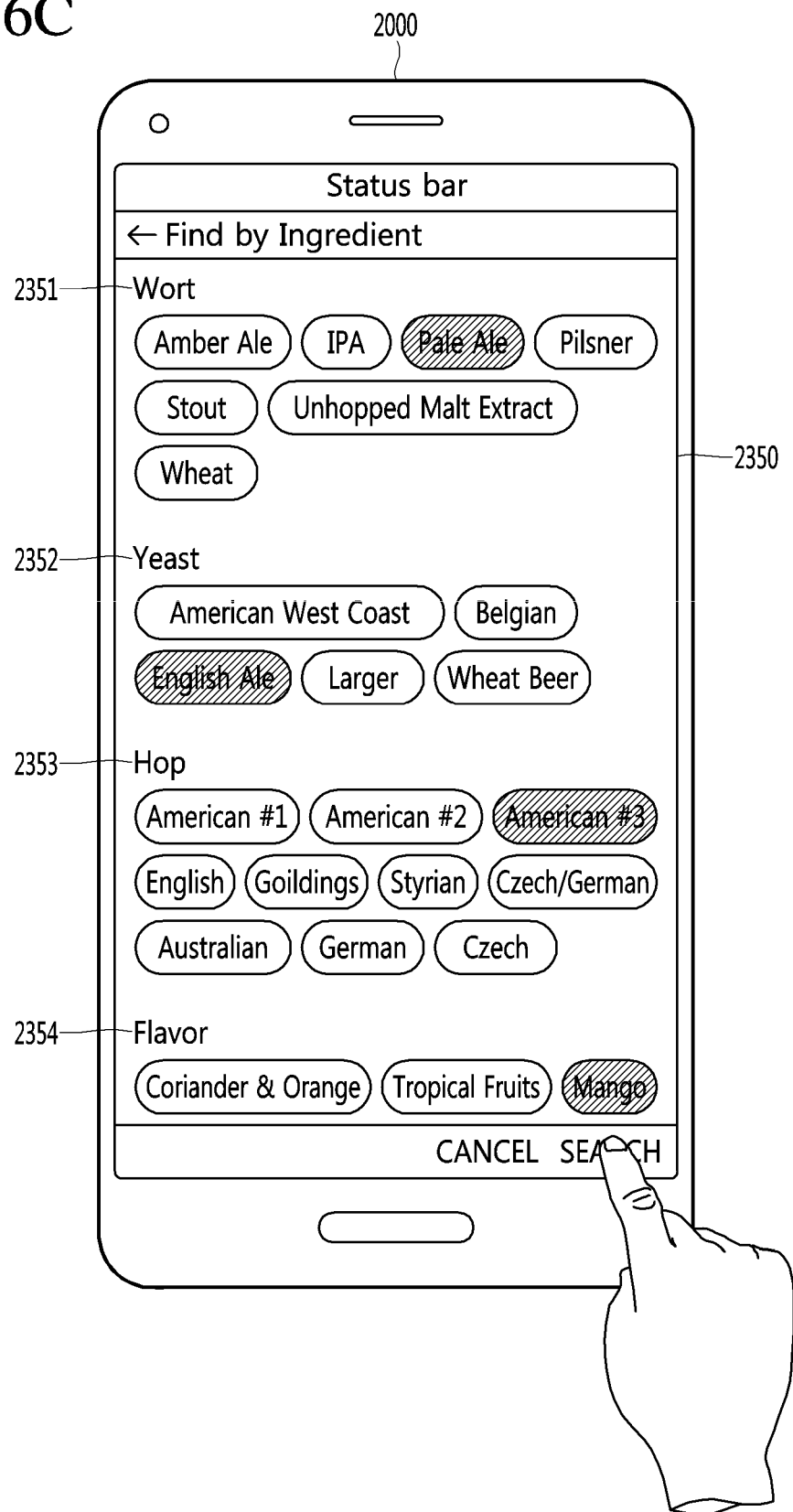

Referring to FIG. 16C, the controller 2080 may receive an input for selecting at least one of the plurality of tags, based on the displayed tag selection screen 2350. The controller 2080 may select at least one tag as a tag for searching a beverage recipe, in response to the received input. For example, when a tag 'Pale Ale' included in the wort category 2351, a tag 'English Ale' included in the yeast category 2352, a tag 'American #3' included in the hop category 2353, and a tag 'Mango' included in the flavor additive category 2354 are selected, the controller 2080 may perform a beverage recipe searching operation using the selected tags.

Figure 16D:
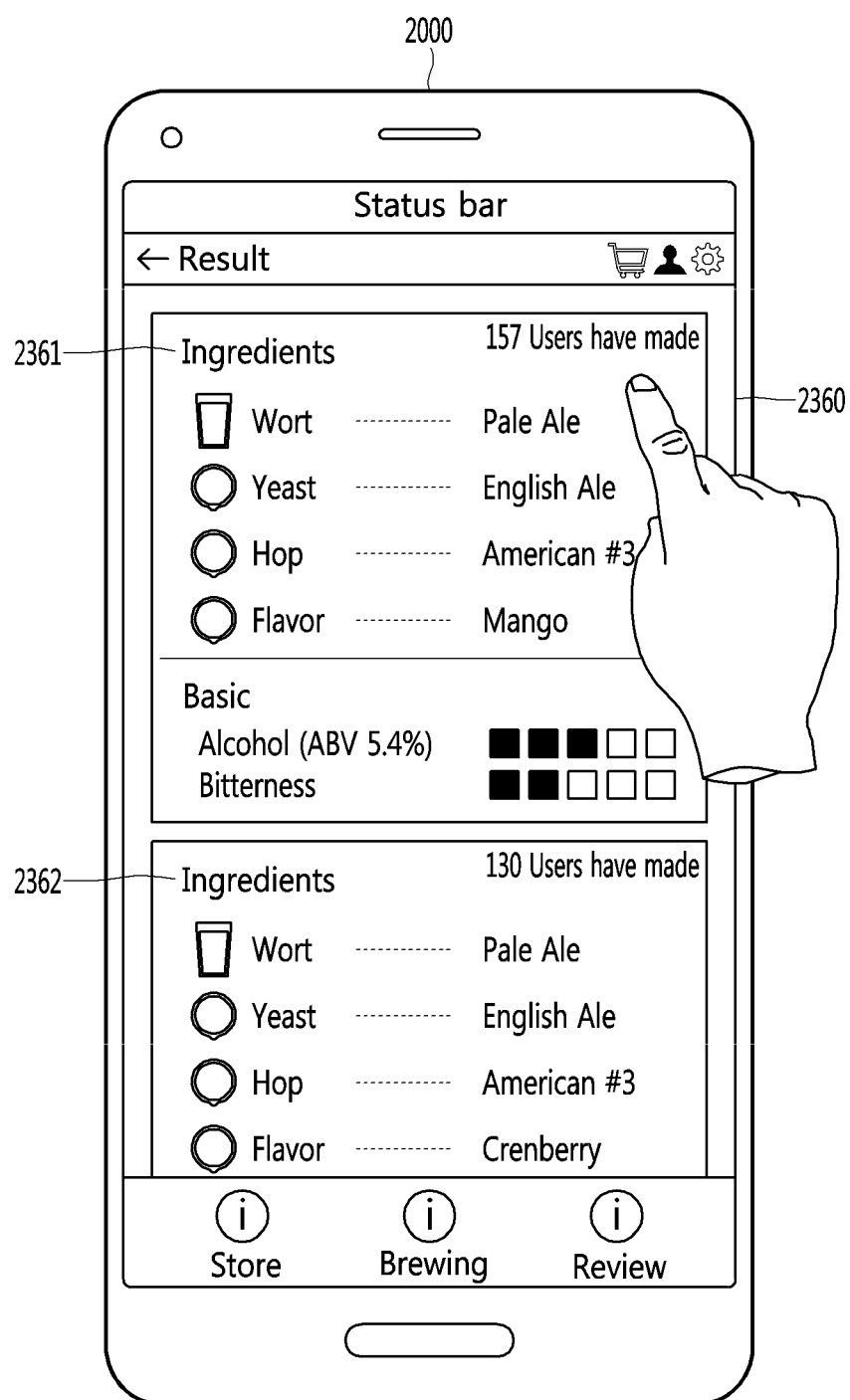

Referring to FIG. 16D, the controller 2080 may display, through the display unit 2051, a search result screen 2360 according to the beverage recipe searching operation. The search result screen 2360 may include all of the tags selected in FIG. 16C, or include beverage recipe information 2361 and 2362 including some of the selected tags.

In relation to the beverage recipe searching operation, when a plurality of tags are selected, the controller 2080 may search a beverage recipe including all of the selected tags, or may search a beverage recipe including only some of the selected tags.

The controller 2080 may acquire information of each of at least one beverage recipe including at least some of the selected tags. The controller 2080 may display at least one beverage recipe information 2361 and 2362, acquired through the search result screen 2360. In some implementations, the controller 2080 may display beverage recipe information in an order based on the number of tags among the selected tags appear in the recipe, for example, in a decreasing order. As shown in FIG. 16D, first beverage recipe information 2361 may include all of the tags selected in FIG. 16C, and second beverage recipe information 2362 may include only some of the selected tags.

Figure 16E:
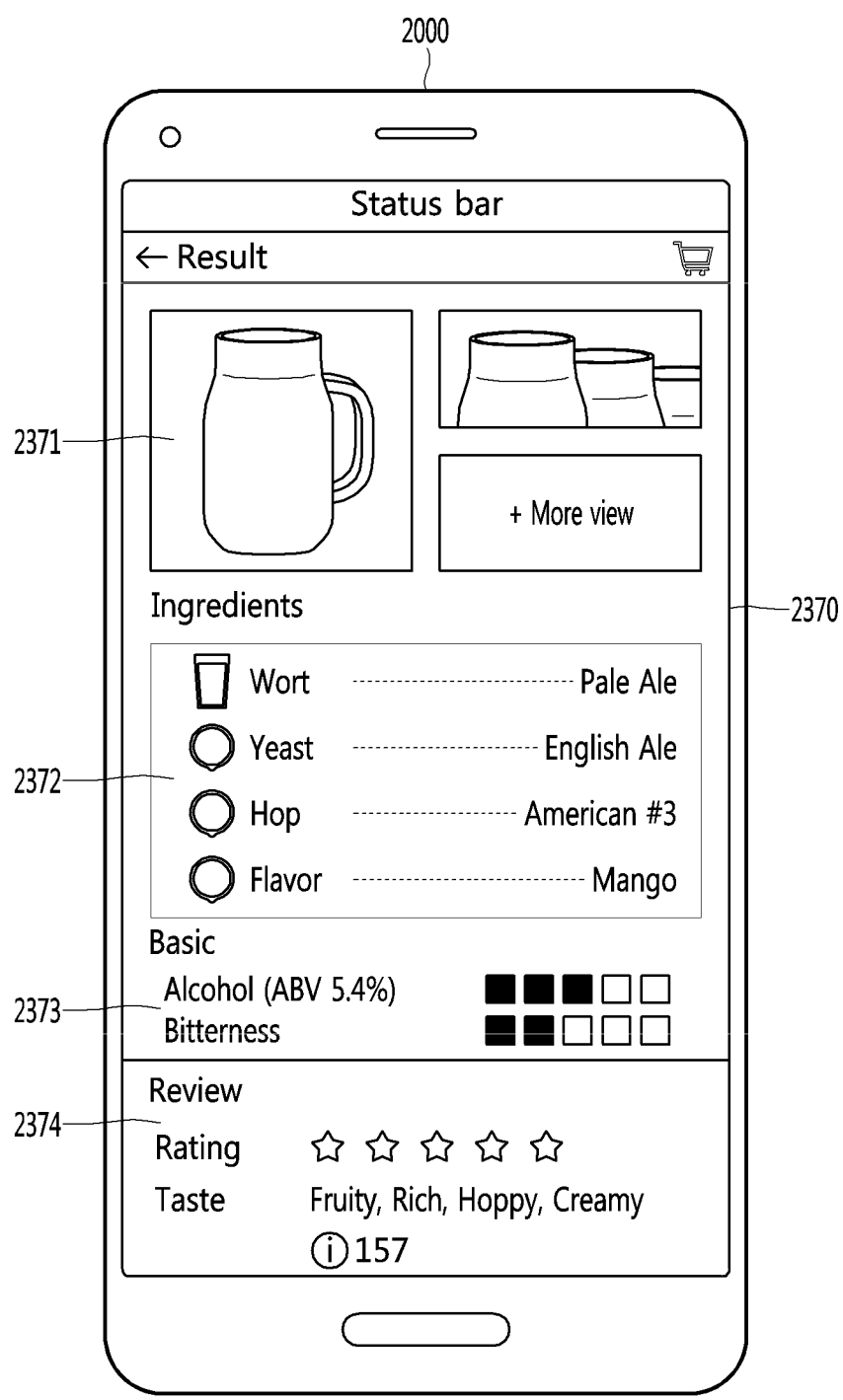
Figure 16F:
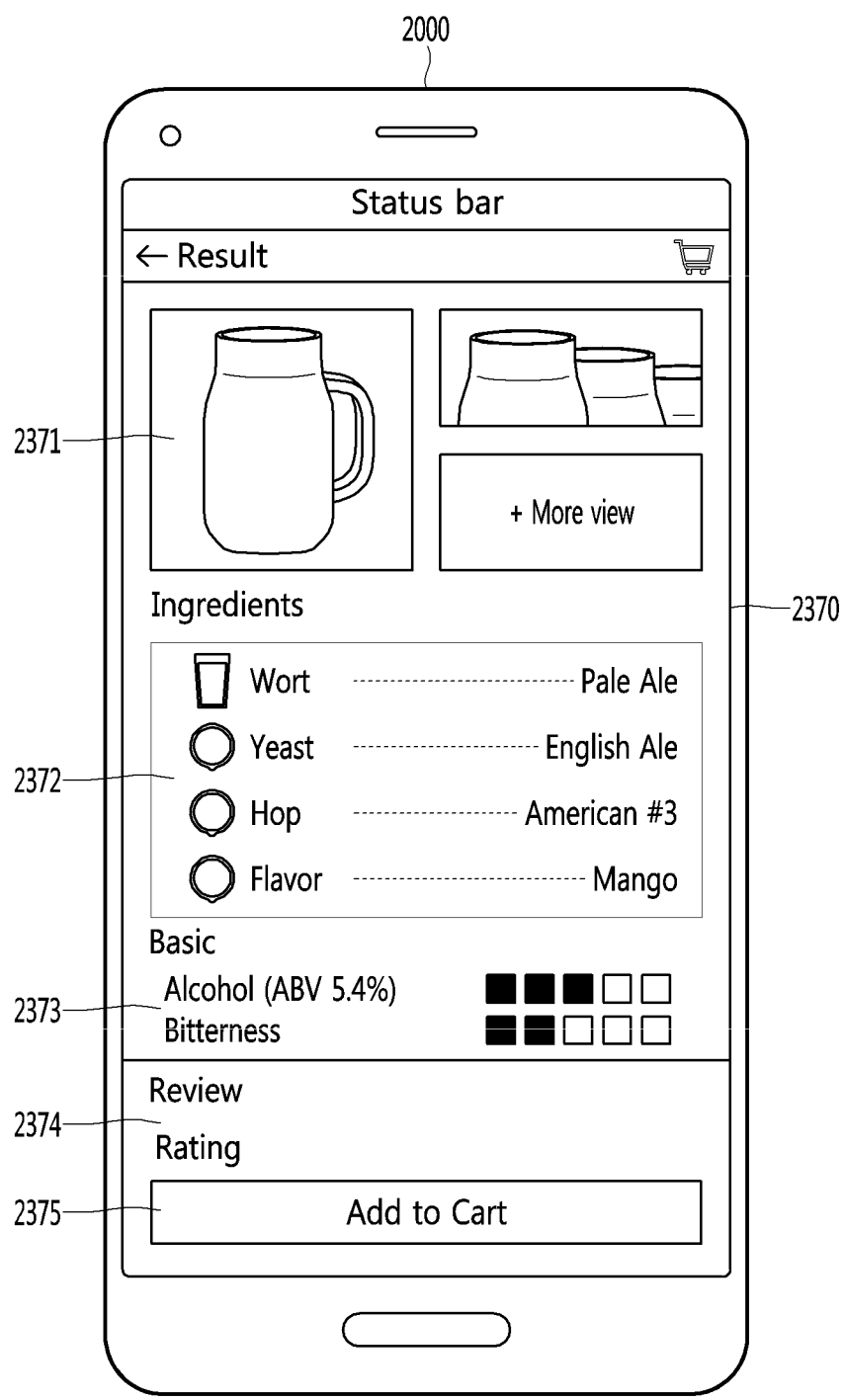

Referring to FIGS. 16E and 16F, the controller 2080 may receive an input for selecting the first beverage recipe information 2361 from the beverage recipe information 2361 and 2362 included in the search result screen 2360. The controller 2080 may display a detailed information screen 2370 including a first beverage recipe and detailed information on a first beverage brewed using the first beverage recipe, in response to the received input.

For example, the detailed information screen 2370 may include a review image 2371 of the first beverage brewed using the first beverage recipe, ingredient information 2372 included in the first beverage recipe, basic characteristic information 2373 of the first beverage, and review information 2374 on the first beverage. In addition, the detailed information screen 2370 may further display a purchase menu 2375 for purchasing ingredients included in the first beverage recipe. The user can conveniently purchase ingredients of the searched beverage recipe, using the displayed purchase menu 2375.

FIGS. 17A to 17D are diagrams illustrating further examples of searching recipes of a beverage, performed through the mobile terminal 2000.

Figure 17A:
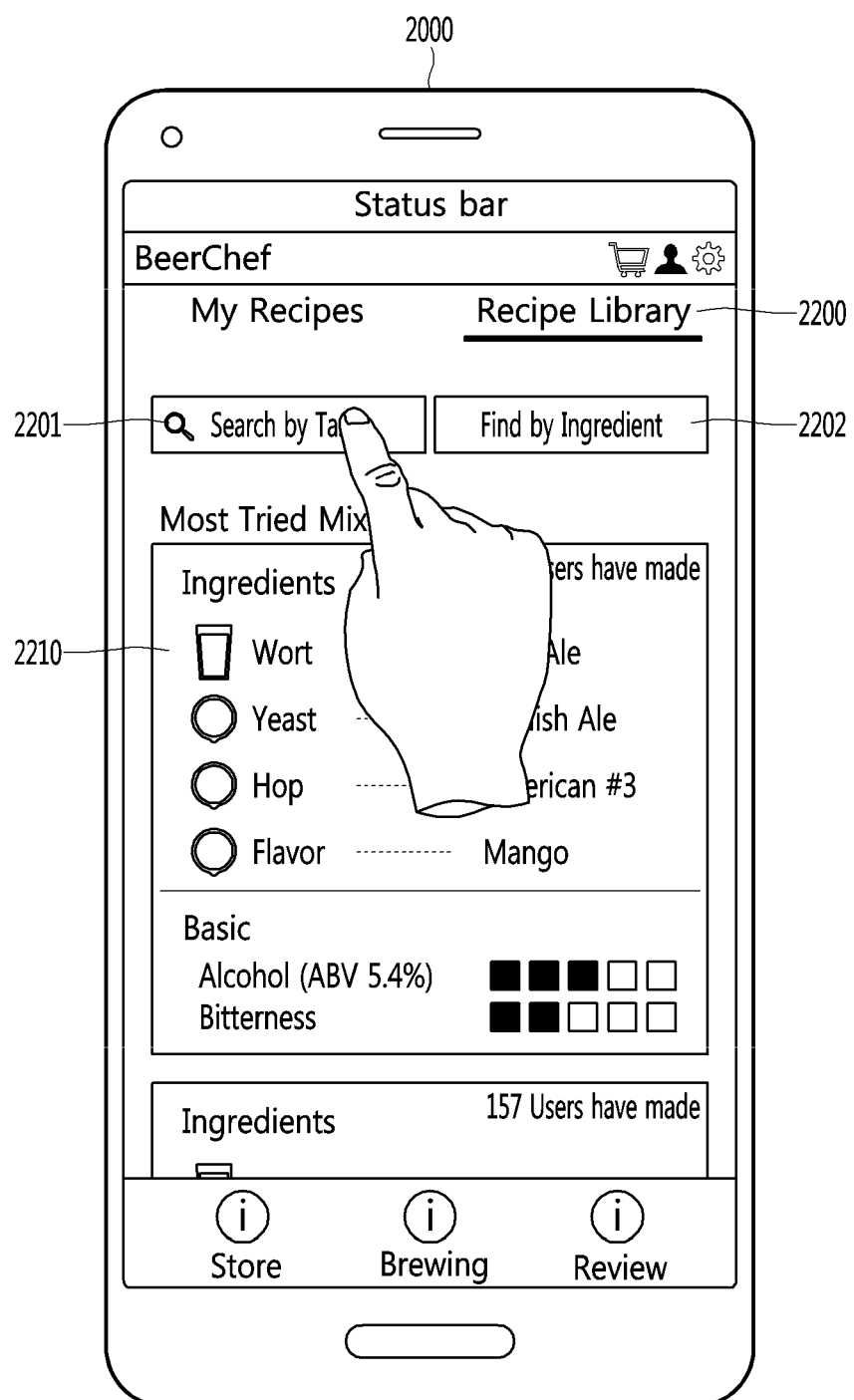
FIGS. 17A to 17D are diagrams illustrating further examples of searching recipes of a beverage, performed through the mobile terminal.
Figure 17B:
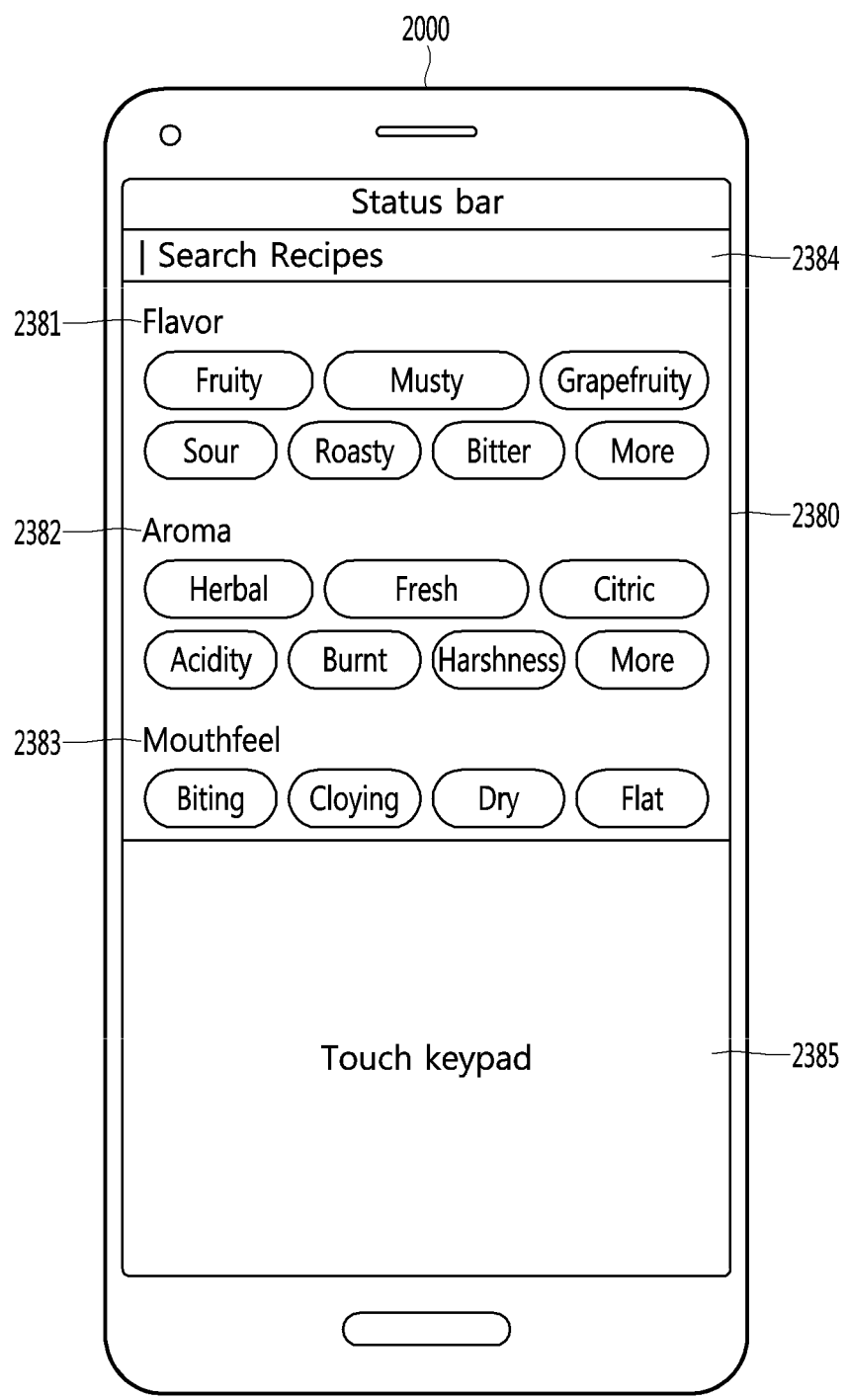

Referring to FIGS. 17A and 17B, the controller 2080 may receive an input for selecting a taste-based search menu 2201 included in a recipe search screen 2200. The controller 2080 may display, through the display unit 2051, a tag selection screen 2380 including a plurality of tags representing taste of beverage, in response to the received input.

For example, when the taste of beverage is divided into categories of flavor, aroma, and mouthfeel, the tag selection screen 2380 may display the plurality of tags to be divided according to the categories. As shown in FIG. 17B, the controller 2080 may display a tag selection screen 2380 divided into tags having an ingredient name corresponding to a flavor category 2381, tags having an ingredient name corresponding to an aroma category 2382, and tags having an ingredient name corresponding to a mouthfeel category 2383.

In some implementations, the controller 2080 may display a keypad 2385 for directly receiving a word related to the taste of beverage from the user, separately from the tags included in the tag selection screen 2380. The controller 2080 may receive a word using the keypad 2385, and display the received word in a search condition input window 2384.

Figure 17C:
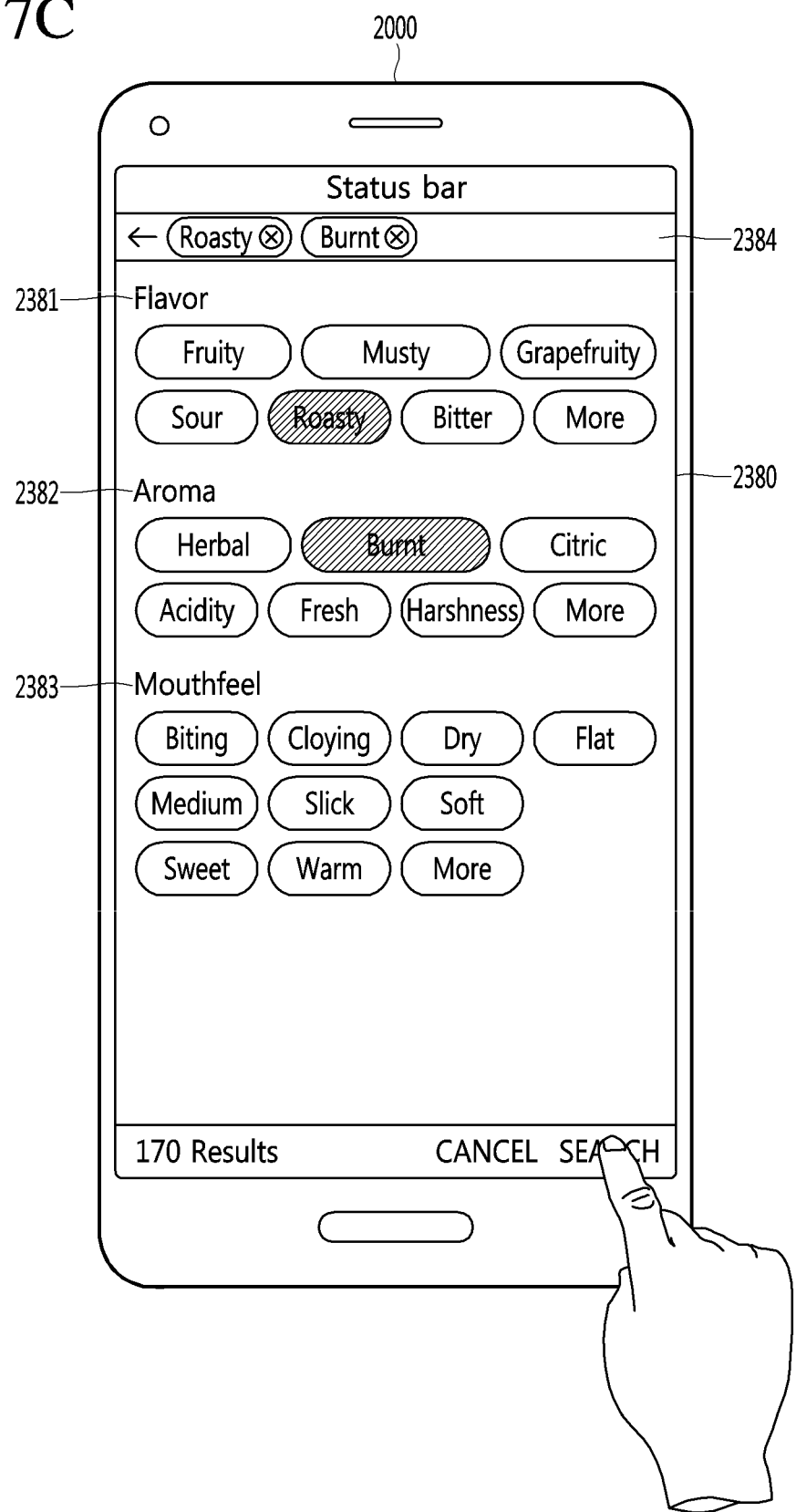

Referring to FIG. 17C, the controller 2080 may receive an input for selecting at least one of the tags included in the tag selection screen 2380. The controller 2080 may select the at least one tag as a tag for searching a beverage recipe, in response to the received input. In some implementations, the controller 2080 may display the selected at least one tag on the search condition input window 2384. For example, when a tag 'Roasty' included in the flavor category 2381 and a tag 'Burnt' included in the aroma category 2382 are selected, the controller 2080 may perform the beverage recipe searching operation using the selected tags.

In relation to taste-based recipe search, the controller 2080 may acquire information on a beverage recipe including taste information having at least some of the selected tags, based on taste information included in review information of each of beverage recipes registered to the server.

Figure 17D:
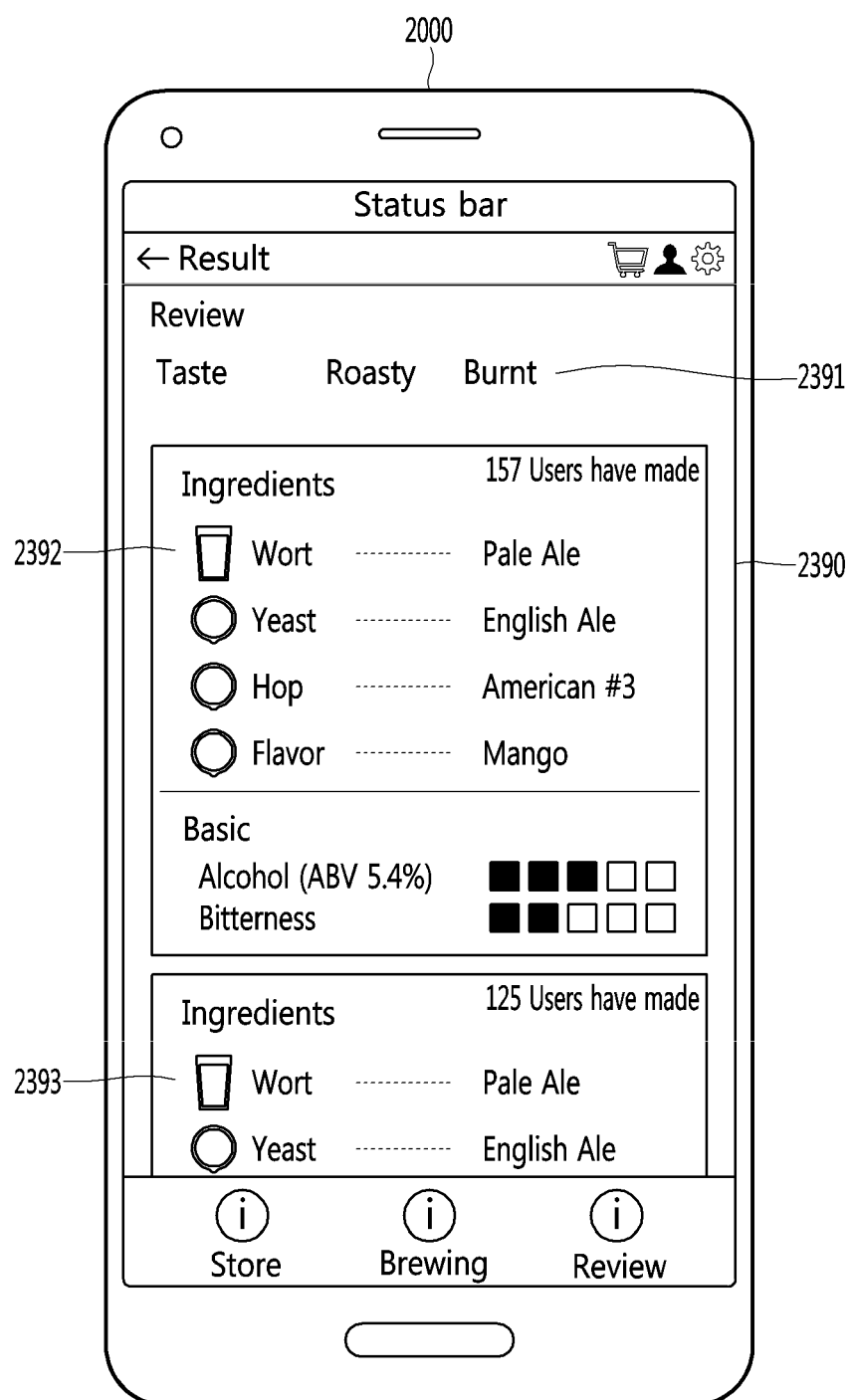

Referring to FIG. 17D, the controller 2080 may display a search result screen 2390 according to the beverage recipe searching operation. The search result screen 2390 may include beverage recipe information 2392 and 2393 including all of the tags selected in FIG. 17C or including only some of the selected tags. Analogous to what was described above in relation to FIG. 16D, the controller 2080 may display the beverage recipe information in an order based on a number of tags among the selected tags that appear in the recipe, or example in a decreasing order.

In addition, analogous to what was described above in relation to FIGS. 16E and 16F, the controller 2080 may receive an input for selecting any one of the beverage recipe information 2392 and 2393 included in the search result screen 2390. The controller 2080 may provide detailed information on the selected beverage recipe information, in response to the received input.

As such, according to implementations that have been described above in relation to FIGS. 15 to 17D, the mobile terminal 2000 can enable a user to conveniently search for a beverage recipe using tags. Accordingly, the user can conveniently search a beverage recipe by selecting a tag having a desired search condition or a desired search word. Further, the mobile terminal 2000 can provide a procurement function e.g., a purchasing function, to enable the user to conveniently procure, e.g., purchase, ingredients of the searched beverage recipe.

Figure 18:
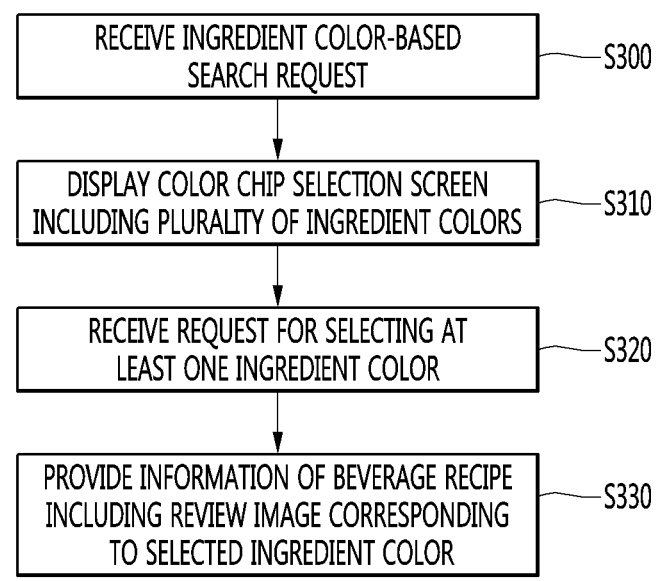
FIG. 18 is a flowchart illustrating another example of searching recipes of a beverage, performed through the mobile terminal.

FIG. 18 is a flowchart illustrating another example of searching recipes of a beverage, performed through the mobile terminal 2000. Although the example of FIG. 18 illustrates an example of making beer, implementations may be applied to any suitable type of beverage-making apparatus 1000.

Referring to FIG. 18, the mobile terminal 2000 may receive an ingredient (e.g., wort) color-based search request as a beverage recipe search request (S300). In general, a color of the beverage may be determined based on a color of an ingredient (e.g., wort in the example of beer-making). However, there may be scenarios in which a user does not exactly know the name of the ingredient. Therefore, the mobile terminal 2000 may provide the user with a color of the beverage as a search condition.

The mobile terminal 2000 may display, e.g., through the display unit 2051, a color chip selection screen including a plurality of ingredient colors, in response to the received request (S110). For example, the color chip selection screen may include a name of the ingredient corresponding to each of the colors.

The mobile terminal 2000 may receive a request for selecting at least one ingredient color among the plurality of displayed ingredient colors (S320), and provide information of a beverage recipe including a review image corresponding to the selected ingredient color (S330).

For example, as shown in FIG. 16E, beverage recipe information may include a review image of the beverage that results from the selected ingredient. The mobile terminal 2000 may acquire information of at least one beverage recipe having a review image corresponding to the selected ingredient color, based on the review image included in beverage recipe information of each of beverage recipes, e.g., that are registered to a server.

In some implementations, the controller 2080 may determine a name of the ingredient from the selected ingredient color, and acquire information of beverage recipes including the corresponding ingredient as an ingredient, based on the determined name of ingredient.

As such, according to the implementation shown in FIG. 18, the mobile terminal 2000 may enable a user to conveniently search for a desired recipe of a beverage using a color of the beverage as a search condition, even if the user does not exactly know the name of recipe or ingredients.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet).

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

The processes and operations described herein, such as those that generate and operate the user interfaces, may be executed entirely by a user's mobile terminal (e.g., mobile terminal 2000) executing an installed application, or may be executed entirely by a server system that remotely hosts the application, or may be executed by any combination of user-side and server-side processing.

The foregoing implementations are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be implemented in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a wireless communication unit configured to communicate with a beverage-making apparatus, wherein the beverage-making apparatus includes a fermentation tank, a refrigeration cycle apparatus that cools the fermentation tank, a heater that heats the fermentation tank, a communication interface, and a controller that controls the communication interface to transmit a beverage-making state to the mobile terminal;
a display unit; and
at least one processor configured to:
receive the beverage-making state from the beverage-making apparatus through the wireless communication unit; and
control the display unit to display a screen indicating the received beverage-making state; and
an input unit configured to receive a recipe input request for inputting information about a recipe of a beverage for the beverage-making apparatus, wherein the at least one processor is further configured to:
in response to the recipe input request, display a recipe input interface for inputting the information about the recipe of the beverage; and
based on displaying the recipe input interface, receive recipe information for the beverage through the displayed recipe input interface, wherein
the wireless communication unit is configured to communicate with at least one computer that stores a plurality of recipe information for the beverage-making apparatus;
the at least one processor is further configured to:
receive, through a user input unit, a recipe search request;
display, through the display unit, a selection interface in response to the received recipe search request;
receive an input for selecting at least one characteristic among a plurality of characteristics displayed in the selection interface; and
display a first recipe information stored on the at least one computer that includes at least some of the at least one characteristic that was selected, based on the received input,
wherein the plurality of characteristics corresponds to a plurality of tags, and the selected at least one characteristic corresponds to at least one tag among the plurality of tags, and
wherein the at least one processor is configured to:
search the plurality of recipe information stored on the at least one computer for at least one recipe information that includes the selected at least one tag; and
display, through the display unit, the first recipe information comprising the at least some of the at least one tag, based on a result of the search.

2. The mobile terminal of claim 1, wherein the at least one processor is further configured to:
receive the recipe input request while the beverage-making apparatus is making the beverage; and
receive, through the recipe input interface, the recipe information for the beverage by receiving information regarding at least one of a name of the beverage, a recipe name, an image related to the beverage, or at least one ingredient included in a recipe for the beverage.

3. The mobile terminal of claim 2, wherein the at least one processor is configured to:
based on at least one first ingredient that was previously input for the beverage, display, through the display unit, a selection interface displaying at least one recipe package, wherein a first recipe package among the at least one recipe package comprises information regarding at least one first ingredient and information regarding at least one second ingredient, other than the at least one first ingredient, for the beverage; and based on a selection of the first recipe package among the at least one recipe package displayed in the selection interface, input the at least one second ingredient to the recipe input interface.

4. The mobile terminal of claim 3, wherein the information regarding the at least one first ingredient that was previously input for the beverage comprises:
information that was previously acquired by the mobile terminal from the beverage-making apparatus indicating that the at least one first ingredient was included in a beverage ingredient pack accommodated in the beverage-making apparatus when the beverage was made.

5. The mobile terminal of claim 1, wherein the at least one processor is further configured to:
receive the recipe input request after the beverage-making apparatus finishes making the beverage; and
receive, through the recipe input interface, the recipe information for the beverage comprising information regarding a recipe and information regarding at least one review of the beverage.

6. The mobile terminal of claim 5, wherein the information regarding the at least one review of the beverage comprises taste information regarding the beverage, and
wherein the at least one processor is further configured to:
display a plurality of tags related to a plurality of tastes of the beverage;
receive an input for selecting at least one tag among the displayed plurality of tags; and
input, as the taste information, the at least one tag that was selected, based on the received input.

7. The mobile terminal of claim 1, wherein the at least one processor is configured to transmit the received recipe information to at least one computer that is communicative with the mobile terminal.

8. The mobile terminal of claim 1, wherein the at least one processor is configured to:
based on the recipe search request being an ingredient-based search request:
display, through the display unit, the selection interface displaying a plurality of tags, each tag representing a corresponding ingredient for the beverage; and
search the plurality of recipe information stored on the at least one computer for at least one recipe information that comprises a respective ingredient corresponding to each tag of the selected at least one tag among the plurality of tags.

9. The mobile terminal of claim 1, wherein the at least one processor is configured to:
based on the recipe search request being a taste-based search request:
display, through the display unit, the selection interface displaying a plurality of tags, each tag representing a corresponding taste of the beverage; and
search the plurality of recipe information stored on the at least one computer for at least one recipe information that comprises a respective taste information corresponding to each tag of the selected at least one tag among the plurality of tags.

10. The mobile terminal of claim 1, wherein the at least one processor is configured to display, through the display unit, a plurality of second recipe information, each second recipe information comprising at least some of the selected at least one characteristic, and
wherein the plurality of recipe information are displayed in an order based on a number of characteristics, among the selected at least one characteristic, included in each of the plurality of recipe information.

11. The mobile terminal of claim 1, wherein the at least one processor is configured to:
based on the recipe search request being an ingredient color-based search request:
display the selection interface displaying a plurality of ingredient colors as the plurality of characteristics;
receive the input for selecting at least one ingredient color among the plurality of displayed ingredient colors; and
display, through the display unit, the first recipe information that corresponds to the selected ingredient color.

12. The mobile terminal of claim 11, wherein each of the plurality of recipe information stored on the at least one computer comprises a review image of a corresponding beverage for the respective recipe information, and
wherein the at least one processor is configured to:
acquire a first recipe information having a review image corresponding to the selected ingredient color; and
display, through the display unit, the acquired first recipe information.

13. At least one non-transitory computer-readable recording medium encoded with at least one computer program comprising instructions that, when executed, operate to cause a mobile terminal communicative with a beverage-making apparatus to perform operations comprising:
receiving a beverage-making state from the beverage-making apparatus, wherein the beverage-making apparatus includes a fermentation tank, a refrigeration cycle apparatus that cools the fermentation tank, a heater that heats the fermentation tank, a communication interface, and a controller that controls the communication interface to transmit a beverage-making state to the mobile terminal;
displaying a screen indicating the received beverage-making state;
receiving a recipe input request for inputting information about a recipe of a beverage for the beverage-making apparatus;
displaying a recipe input interface for inputting the information about the recipe of the beverage;
based on displaying the recipe input interface, receiving recipe information for the beverage through the displayed recipe input interface; and
transmitting the received recipe information to at least one computer that is communicative with the mobile terminal,
wherein the operations comprise:
communicating with at least one computer that stores a plurality of recipe information for the beverage-making apparatus;
receiving, through a user input unit, a recipe search request;
displaying a selection interface in response to the received recipe search request;
receiving an input for selecting at least one characteristic among a plurality of characteristics displayed in the selection interface; and
displaying a first recipe information stored on the at least one computer that includes at least some of the at least one characteristic that was selected, based on the received input,
wherein the plurality of characteristics corresponds to a plurality of tags, and the selected at least one characteristic corresponds to at least one tag among the plurality of tags, and
wherein the operations comprise:

searching the plurality of recipe information stored on the at least one computer for at least one recipe information that includes the selected at least one tag; and displaying the first recipe information comprising the at least some of the at least one tag, based on a result of the search.

14. The at least one non-transitory computer-readable recording medium of claim 13, wherein receiving the recipe input request comprises receiving the recipe input request for a beverage that is being made by the beverage-making apparatus, and wherein the recipe information comprises at least one of a name of the beverage, a recipe name, an image related to the beverage, or at least one ingredient included in a recipe for the beverage.

15. The at least one non-transitory computer-readable recording medium of claim 13, wherein receiving the recipe input request comprises receiving a recipe input request for a beverage that has been completely made by the beverage-making apparatus, and wherein receiving the recipe information comprises receiving the information regarding a recipe and information regarding at least one review of the completely made beverage.

16. The at least one non-transitory computer-readable recording medium of claim 15, wherein receiving the information regarding the at least one review of the beverage comprises:

displaying a plurality of tags corresponding to a plurality of tastes of the beverage;

receiving an input for selecting at least one tag among the displayed plurality of tags; and receiving, as the information regarding the at least one review, taste information corresponding to the selected at least one tag.

\* \* \* \* \*